United States Patent
Papke et al.

(10) Patent No.: US 10,843,799 B2
(45) Date of Patent: Nov. 24, 2020

(54) CONTOURED CLASS DIVIDER

(71) Applicant: B/E Aerospace, Inc., Winston-Salem, NC (US)

(72) Inventors: Robert Papke, Camano Island, WA (US); Shawn Claflin, Seattle, WA (US); Jefferey McKee, Duvall, WA (US); Trevor Skelly, Mercer Island, WA (US); Mario Diliani, Snohomish, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 215 days.

(21) Appl. No.: 15/720,615

(22) Filed: Sep. 29, 2017

(65) Prior Publication Data

US 2018/0022457 A1    Jan. 25, 2018

Related U.S. Application Data

(63) Continuation-in-part of application No. 15/291,863, filed on Oct. 12, 2016, now Pat. No. 10,676,194.
(Continued)

(51) Int. Cl.
*B64D 11/00* (2006.01)
*B64D 11/06* (2006.01)

(52) U.S. Cl.
CPC ...... *B64D 11/0023* (2013.01); *B64D 11/0606* (2014.12)

(58) Field of Classification Search
CPC ............ B64D 11/0023; B64D 11/0606; B64D 11/003; B64D 11/0619; B64D 11/0627; B60R 21/06
See application file for complete search history.

(56) References Cited

U.S. PATENT DOCUMENTS

| | | | | |
|---|---|---|---|---|
| 2,268,927 A | * | 1/1942 | Demme | A47F 7/163 211/45 |
| 3,423,121 A | * | 1/1969 | Lipkin | B60R 21/06 296/24.4 |

(Continued)

FOREIGN PATENT DOCUMENTS

| | | |
|---|---|---|
| DE | 10322611 B3 | 8/2004 |
| DE | 10 2005 009 750 A1 | 9/2006 |

(Continued)

OTHER PUBLICATIONS

International Search Report and Written Opinion on International Application PCT/US2018/053617 dated Dec. 10, 2018. 19 pages.
(Continued)

*Primary Examiner* — Medhat Badawi
(74) *Attorney, Agent, or Firm* — Locke Lord LLP

(57) ABSTRACT

A contoured class divider for dividing an aircraft cabin includes a panel positioned between an aft seat and a forward seat, the panel having a convex contour closely matching an aft-facing contour of a seatback of the forward seat and configured to enhance space utilization. The contoured class divider may include multiple panel portions that are coupled together and articulate relative to one another. The contoured class divider may include an articulation system to articulate the panel portions with respect to one another from a first position (normal operation) to a second position (emergency landing). The contoured class divider may provide up to an additional 12 inches of space which can be used to reduce seat pitch (and thereby enhance passenger comfort) or increase the number of rows of seats on a given aircraft.

19 Claims, 57 Drawing Sheets

Related U.S. Application Data which is a continuation-in-part of application No. 15/153,104, filed on May 12, 2016, now Pat. No. 10,370,106.

(60) Provisional application No. 62/317,706, filed on Apr. 4, 2016, provisional application No. 62/481,244, filed on Apr. 4, 2017.

(56) References Cited

U.S. PATENT DOCUMENTS

| | | | | |
|---|---|---|---|---|
| 3,703,310 | A * | 11/1972 | Lystad | B60N 2/3011 296/10 |
| 4,597,549 | A * | 7/1986 | Ryan | B64C 1/10 160/127 |
| 4,861,103 | A * | 8/1989 | Vallee | B64D 25/04 297/216.2 |
| 4,899,962 | A * | 2/1990 | Mueller | B64D 25/00 160/354 |
| 5,133,587 | A * | 7/1992 | Hadden, Jr. | B60N 2/4214 297/146 |
| 5,165,626 | A * | 11/1992 | Ringger | B64D 11/0023 16/282 |
| 5,306,066 | A * | 4/1994 | Saathoff | B60J 5/0451 188/377 |
| 5,320,308 | A * | 6/1994 | Bilezikjian | B60N 2/2227 244/122 R |
| 5,338,090 | A * | 8/1994 | Simpson | B60N 2/4221 297/216.2 |
| 5,340,059 | A * | 8/1994 | Kanigowski | B64D 25/00 244/118.5 |
| 5,344,210 | A * | 9/1994 | Marwan | B64D 25/04 297/216.2 |
| 5,350,144 | A * | 9/1994 | Lary | A45D 20/12 248/183.1 |
| 5,393,013 | A * | 2/1995 | Schneider | B64D 11/0023 160/351 |
| 5,445,861 | A * | 8/1995 | Newton | B32B 3/12 428/116 |
| 5,482,230 | A * | 1/1996 | Bird | B64C 1/10 244/118.5 |
| 5,531,499 | A * | 7/1996 | Vecchio | B60R 13/0206 188/377 |
| 5,573,304 | A * | 11/1996 | Glockl | A47C 3/023 248/626 |
| 5,577,358 | A * | 11/1996 | Franke | B64D 11/0023 244/118.5 |
| 5,649,721 | A * | 7/1997 | Stafford | B60R 21/04 244/118.5 |
| 5,716,026 | A * | 2/1998 | Pascasio | B64D 11/00 105/315 |
| 5,788,185 | A * | 8/1998 | Hooper | B64D 11/0619 244/118.6 |
| 5,816,534 | A * | 10/1998 | Schumacher | B64D 11/0023 244/119 |
| 5,836,547 | A * | 11/1998 | Koch | B60N 2/4221 244/122 R |
| 5,839,757 | A * | 11/1998 | von Lange | B60R 21/06 280/749 |
| 5,876,064 | A * | 3/1999 | Ament | B60R 21/06 280/749 |
| 6,158,771 | A * | 12/2000 | Nusser | B60R 13/0225 280/752 |
| 6,234,526 | B1 * | 5/2001 | Song | B60R 21/04 280/751 |
| 6,245,408 | B1 * | 6/2001 | Bitzer | F16F 7/121 428/118 |
| 6,264,238 | B1 * | 7/2001 | MacDonald | B60R 21/04 280/751 |
| 6,340,171 | B1 * | 1/2002 | Hirth | B60R 21/213 280/730.2 |
| 6,523,779 | B1 * | 2/2003 | Michel | B64D 11/0023 244/118.5 |
| 6,588,705 | B1 * | 7/2003 | Frank | B64C 1/1469 244/118.5 |
| 6,672,662 | B1 * | 1/2004 | Balk | B60N 2/3013 297/238 |
| 6,692,069 | B2 * | 2/2004 | Beroth | A47C 1/0352 244/118.6 |
| 6,698,819 | B1 * | 3/2004 | Mozer | B60R 21/04 180/90 |
| 6,758,507 | B2 * | 7/2004 | Tarahomi | B29D 99/0089 293/109 |
| 6,780,488 | B2 * | 8/2004 | Holemans | B29C 70/086 156/242 |
| 6,808,206 | B2 * | 10/2004 | Yata | B60R 21/04 280/751 |
| 7,083,146 | B2 * | 8/2006 | Hiesener | B64D 11/00 244/118.5 |
| 7,213,882 | B2 * | 5/2007 | Dryburgh | A47C 1/0352 297/354.13 |
| 7,287,796 | B2 * | 10/2007 | Coles | B60R 5/044 160/370.23 |
| 7,905,451 | B2 * | 3/2011 | Schotte | B64D 11/0023 244/118.6 |
| 7,975,963 | B2 * | 7/2011 | Merz | B64C 1/062 244/118.1 |
| 8,091,939 | B2 * | 1/2012 | Forsyth | B60R 21/12 280/749 |
| 8,590,838 | B2 * | 11/2013 | Cook | B64D 11/02 244/118.6 |
| 8,960,602 | B2 * | 2/2015 | Neumann | B64D 11/0023 244/118.5 |
| 9,199,740 | B2 * | 12/2015 | Ehlers | B64D 11/0691 |
| 9,327,836 | B2 * | 5/2016 | Weitzel | B64D 11/06 |
| 9,352,839 | B2 * | 5/2016 | Gehret | B60R 21/207 |
| 9,428,132 | B2 * | 8/2016 | Obadia | B60R 21/20 |
| 9,511,867 | B2 * | 12/2016 | Schliwa | B64D 11/0691 |
| 9,650,146 | B2 * | 5/2017 | Boenning | B64D 11/06 |
| 9,718,552 | B2 * | 8/2017 | Zheng | B64D 11/0648 |
| 9,868,528 | B2 * | 1/2018 | Mayer | B64D 11/0023 |
| 10,011,058 | B2 * | 7/2018 | Sutton | B60N 2/7017 |
| 10,059,423 | B2 * | 8/2018 | Smithson | B32B 1/00 |
| 10,106,187 | B1 * | 10/2018 | Farrar | B62B 7/123 |
| 10,358,173 | B2 * | 7/2019 | Gussen | B60R 21/026 |
| 2003/0094837 | A1 * | 5/2003 | Williamson | B60N 3/004 297/163 |
| 2006/0006704 | A1 * | 1/2006 | Skelly | B60N 2/62 297/188.08 |
| 2007/0138780 | A1 * | 6/2007 | Beki | B60R 21/13 280/756 |
| 2007/0222266 | A1 * | 9/2007 | Lucci | A47C 1/121 297/331 |
| 2009/0200422 | A1 * | 8/2009 | Johnson | B64D 11/0023 244/118.5 |
| 2009/0242149 | A1 * | 10/2009 | Breuer | B60P 3/36 160/368.1 |
| 2010/0078985 | A1 * | 4/2010 | Mahoney | B32B 3/10 297/446.1 |
| 2010/0255919 | A1 * | 10/2010 | Kelly | A47D 13/105 472/118 |
| 2011/0062283 | A1 * | 3/2011 | Breuer | B64D 11/00 244/118.5 |
| 2012/0292967 | A1 * | 11/2012 | Cailleteau | A47C 7/446 297/311 |
| 2013/0248651 | A1 * | 9/2013 | Burrows | B64D 11/0023 244/118.5 |
| 2014/0014774 | A1 * | 1/2014 | Pozzi | B64D 11/06 244/118.6 |
| 2014/0124623 | A1 * | 5/2014 | Chandler | B64D 11/0023 244/118.5 |
| 2014/0124624 | A1 * | 5/2014 | Jacobsen | B64D 11/0023 244/118.5 |
| 2014/0138986 | A1 * | 5/2014 | Tsuneyama | B62D 25/163 296/187.09 |
| 2014/0158826 | A1 * | 6/2014 | Young | B64D 11/02 244/118.5 |
| 2014/0175219 | A1 * | 6/2014 | Young | B64D 11/0023 244/118.5 |

(56) References Cited

U.S. PATENT DOCUMENTS

| | | | | |
|---|---|---|---|---|
| 2014/0375090 | A1* | 12/2014 | Wegenka | B60N 2/242 297/188.09 |
| 2015/0035340 | A1* | 2/2015 | Lussan | B64D 11/06 297/463.1 |
| 2015/0284084 | A1* | 10/2015 | Mayer | B64D 11/0023 244/118.5 |
| 2015/0284085 | A1* | 10/2015 | McKee | B64D 11/02 244/118.5 |
| 2015/0287564 | A1* | 10/2015 | Benke | H01H 85/306 337/5 |
| 2016/0198864 | A1* | 7/2016 | Yang | A47D 9/00 5/655 |
| 2016/0296419 | A1* | 10/2016 | Paulussen | A61H 31/006 |
| 2016/0297525 | A1* | 10/2016 | Walton | B64D 11/0023 |
| 2016/0304204 | A1* | 10/2016 | McKee | B64D 11/003 |
| 2017/0021929 | A1* | 1/2017 | McKee | B64D 11/02 |
| 2017/0021933 | A1* | 1/2017 | Pozzi | B64D 11/0636 |
| 2017/0129608 | A1* | 5/2017 | Reams | B64D 11/0624 |
| 2017/0267350 | A1* | 9/2017 | Heidtmann | B64D 11/0023 |
| 2017/0267353 | A1* | 9/2017 | McIntosh | B64D 11/0606 |
| 2017/0283060 | A1* | 10/2017 | Papke | B64D 11/0023 |
| 2017/0283061 | A1* | 10/2017 | Papke | B64D 11/0023 |
| 2017/0283065 | A1* | 10/2017 | Papke | G09F 19/22 |
| 2018/0022457 | A1* | 1/2018 | Papke | B64D 11/0023 244/118.6 |
| 2018/0222589 | A1* | 8/2018 | Papke | B64D 11/0606 |

FOREIGN PATENT DOCUMENTS

| | | |
|---|---|---|
| EP | 0 361 717 A1 | 4/1990 |
| EP | 1 698 552 A1 | 9/2006 |
| EP | 2 113 427 A2 | 11/2009 |
| EP | 2 727 836 A2 | 5/2014 |
| EP | 3 219 555 A1 | 9/2017 |
| EP | 3 219 601 A1 | 9/2017 |
| FR | 2877281 A1 | 5/2006 |
| WO | WO-93/01088 A1 | 1/1993 |
| WO | WO-2018/071596 A1 | 4/2018 |

OTHER PUBLICATIONS

International Search Report and Written Opinion on International Patent Application No. PCT/US2016/032061 dated Dec. 7, 2016. 11 pages.

International Search Report and Written Opinion on International Patent Application No. PCT/US2017/056222 dated Feb. 26, 2018. 12 pages.

U.S. Office Action on U.S. Appl. No. 15/153,104 dated Sep. 20, 2018. 18 pages.

International Search Report and Written Opinion on International Patent Application No. PCT/US2018/025891 dated Jun. 1, 2018. 10 pages.

* cited by examiner

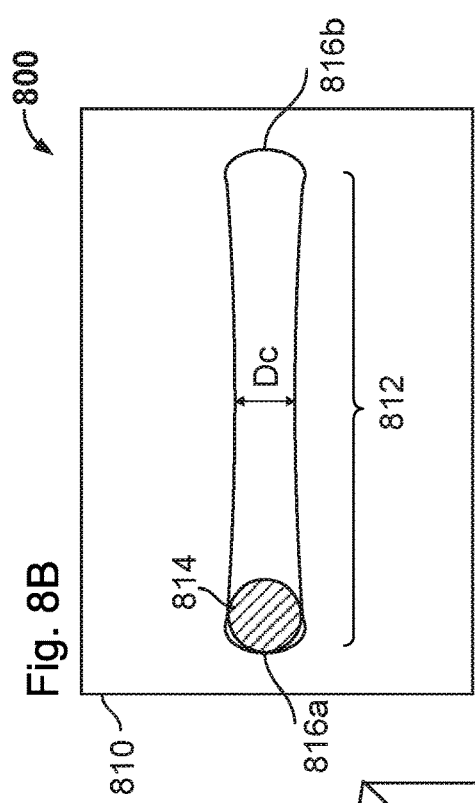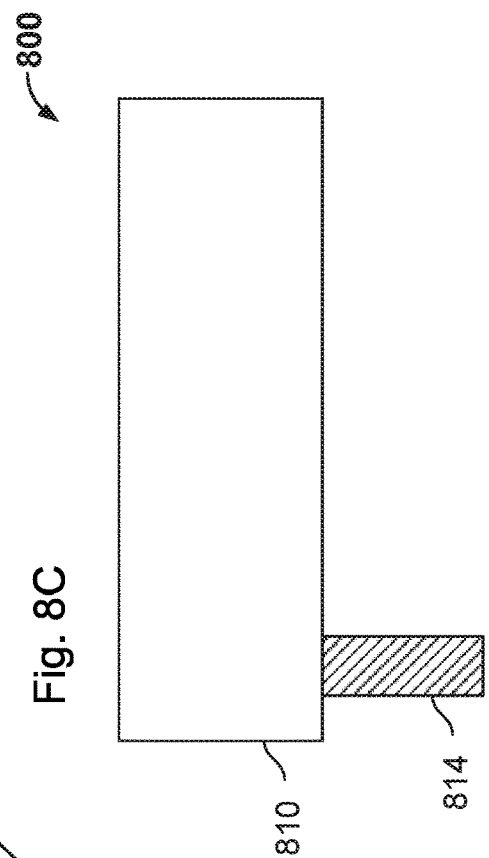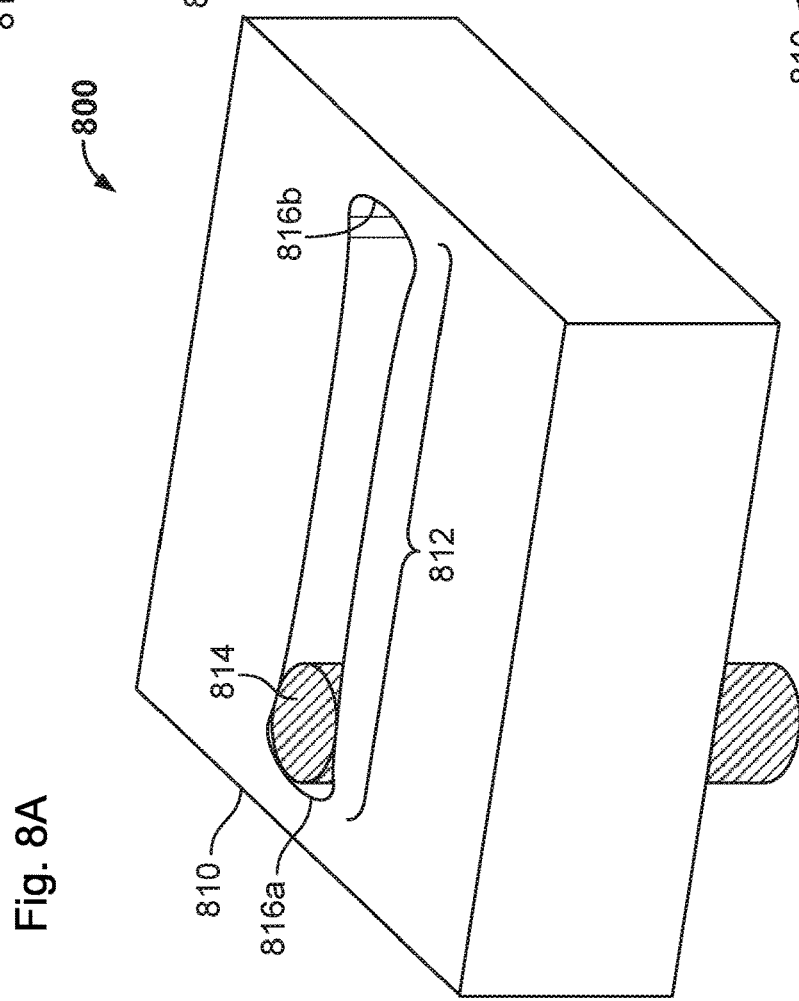

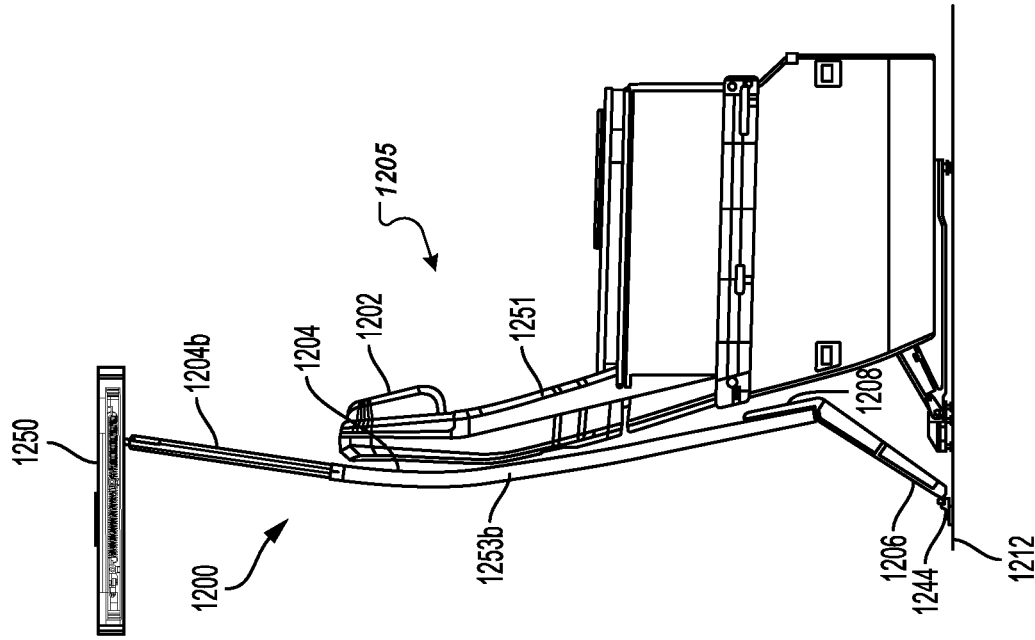
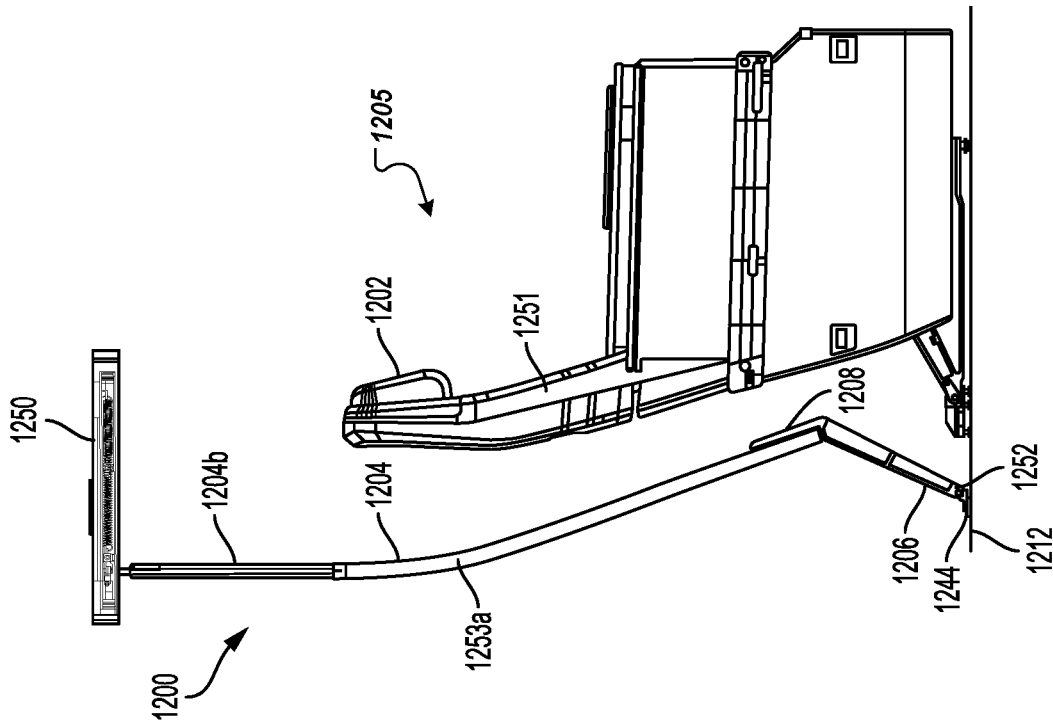
FIG. 12A
FIG. 12B

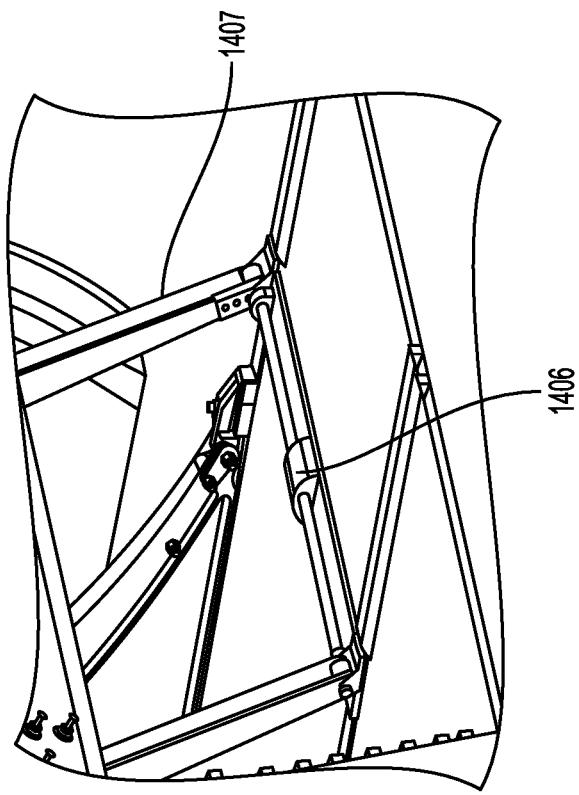
FIG. 14C
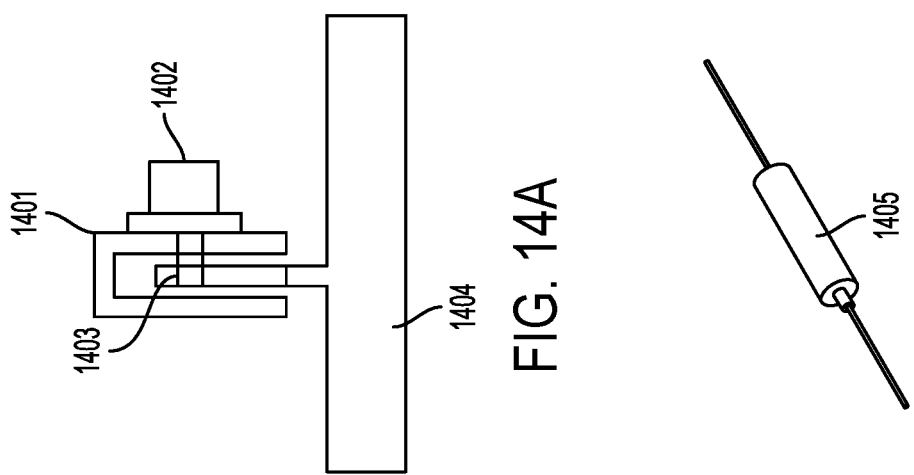
FIG. 14A
FIG. 14B

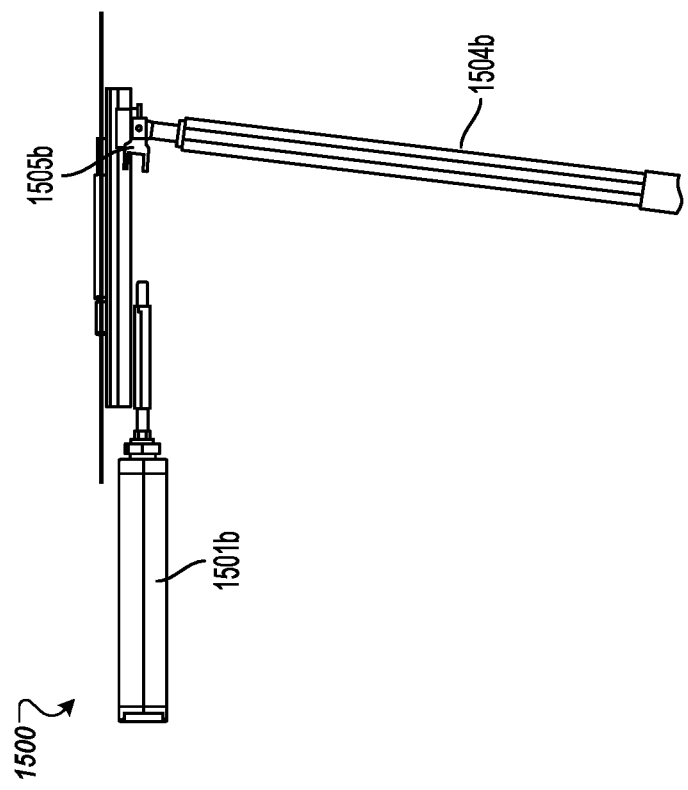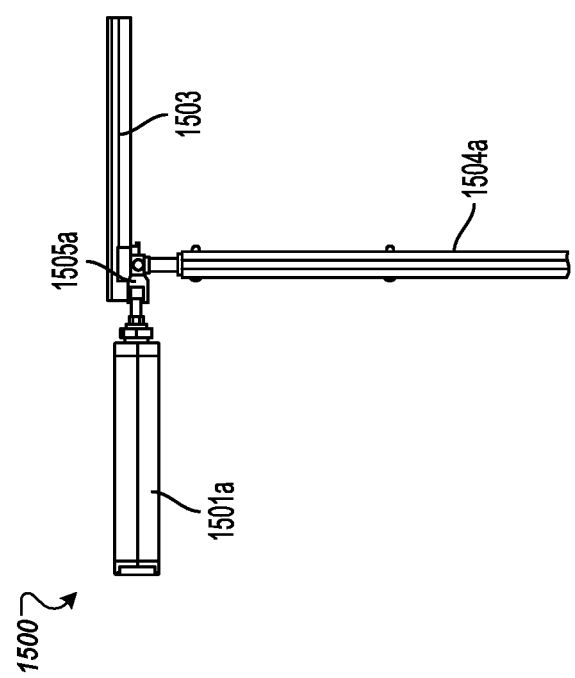
FIG. 15

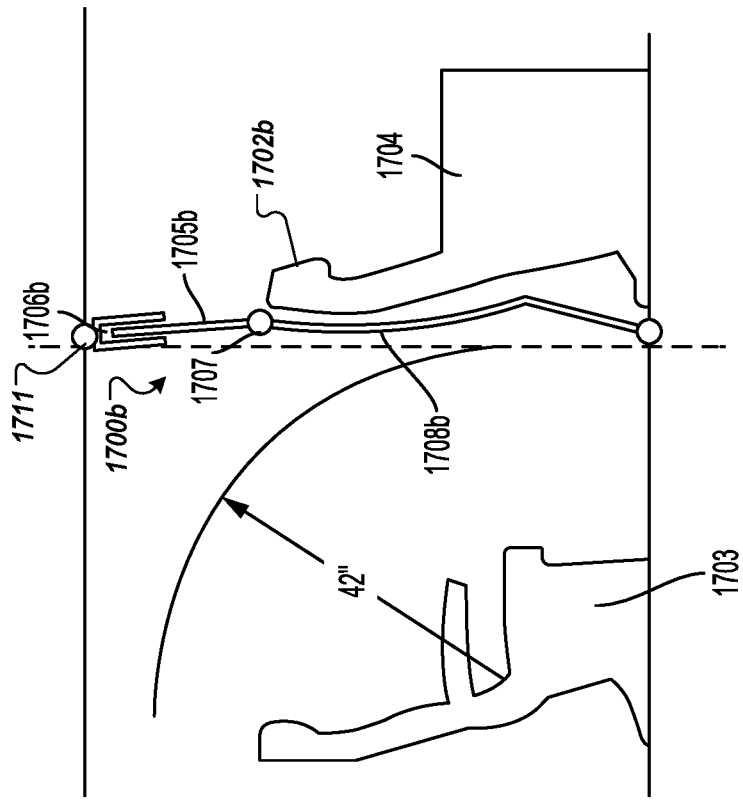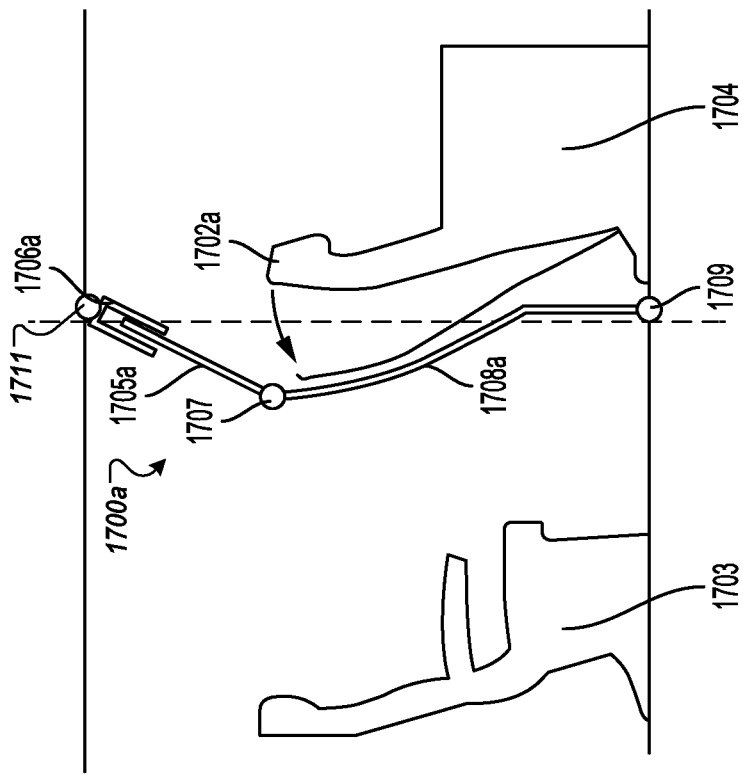
FIG. 17

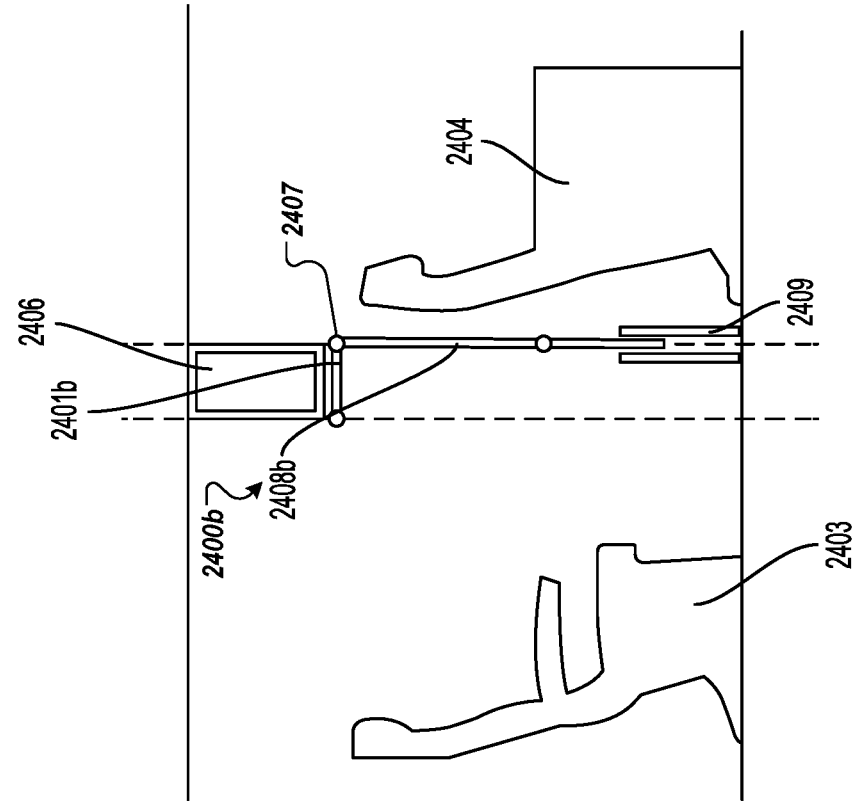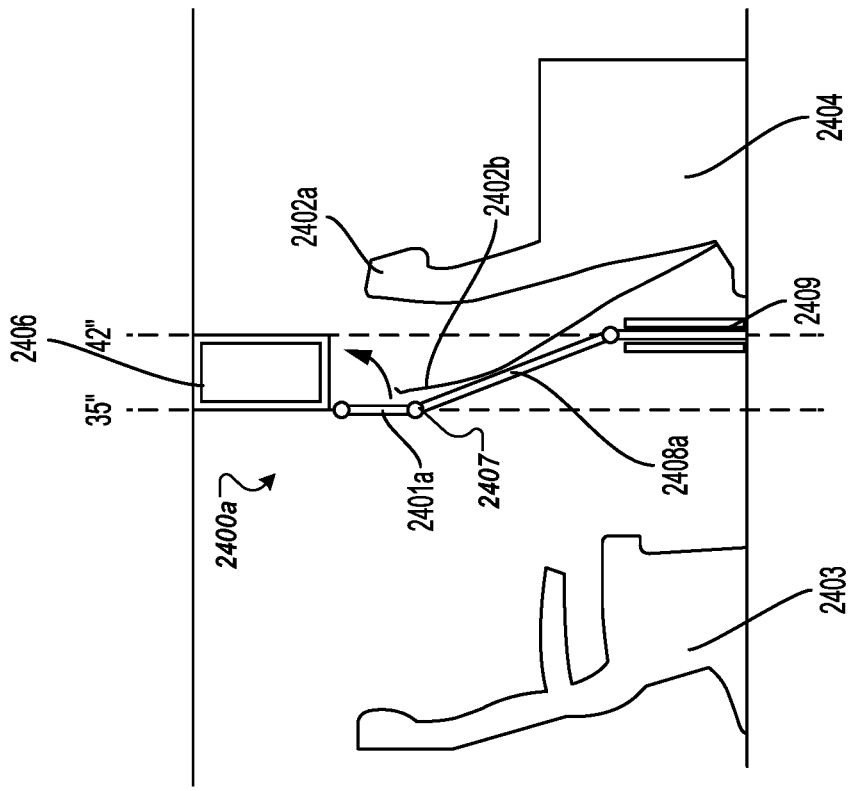
FIG. 24

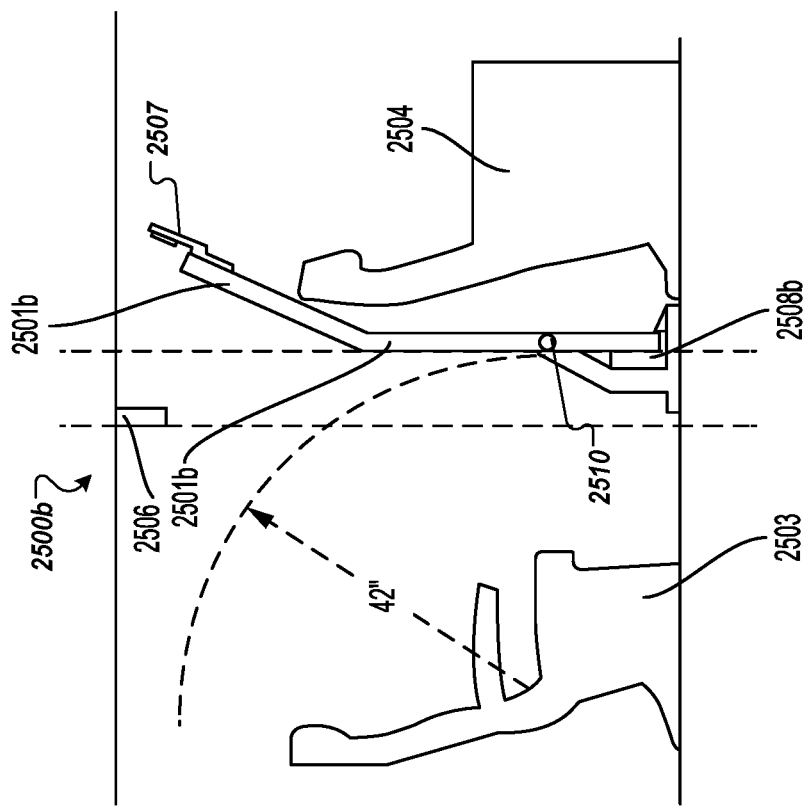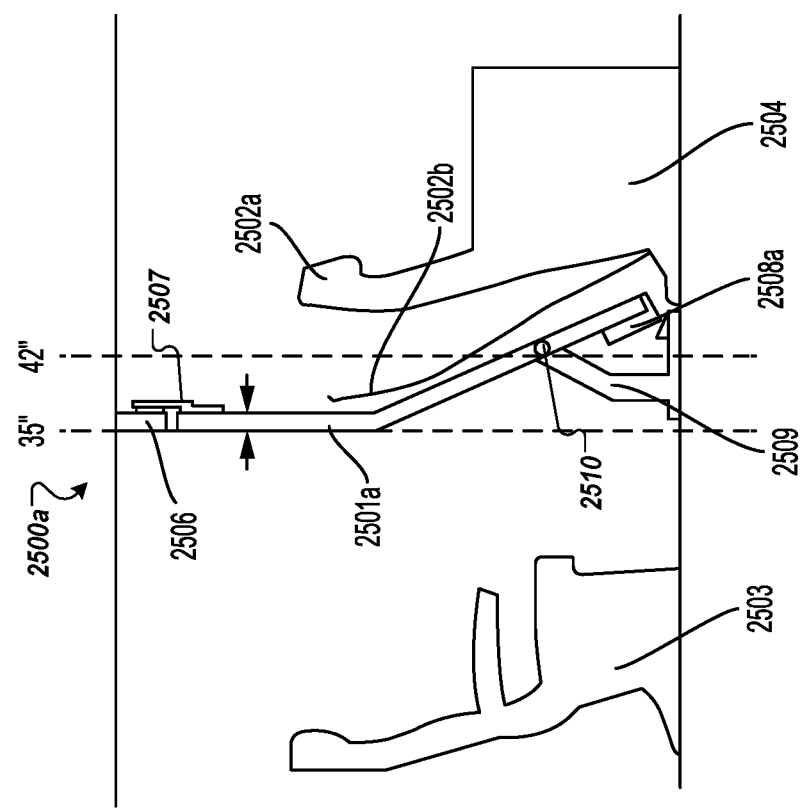
FIG. 25

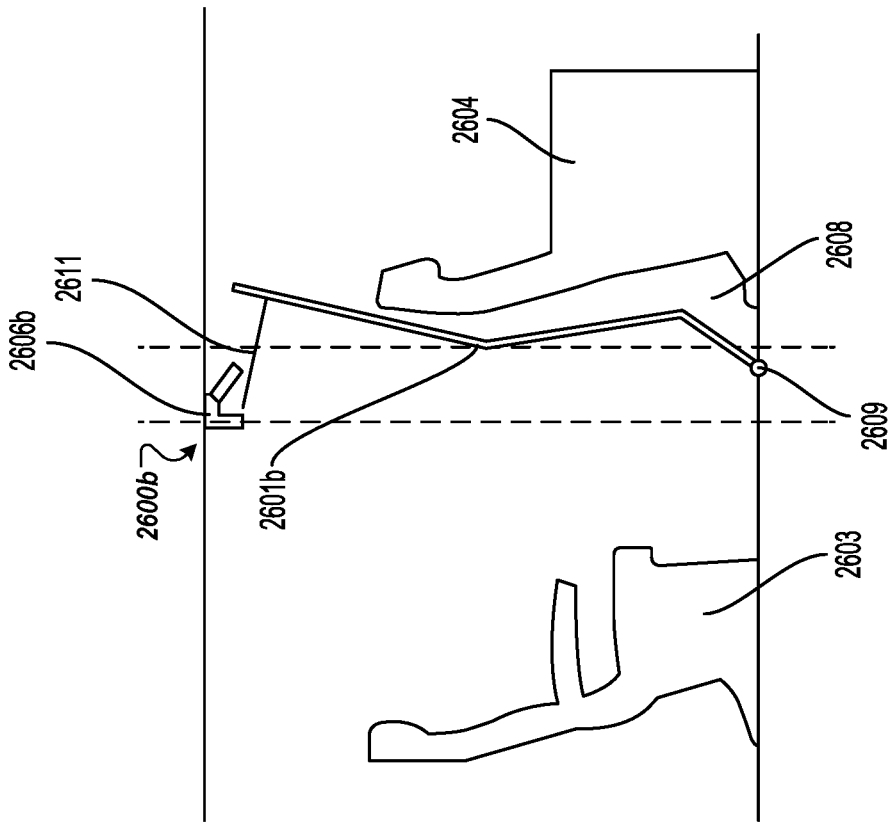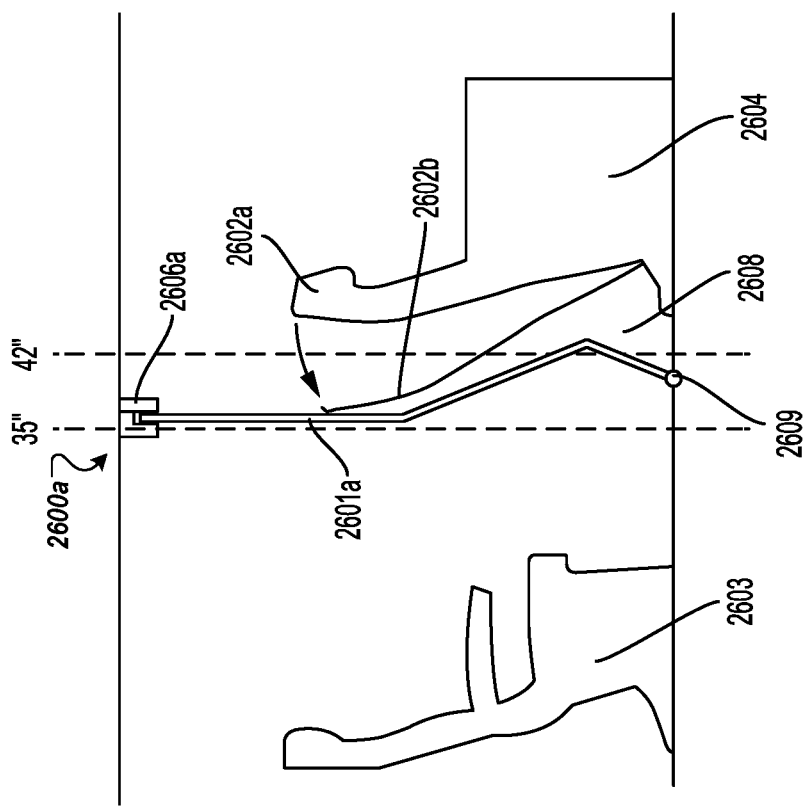
FIG. 26

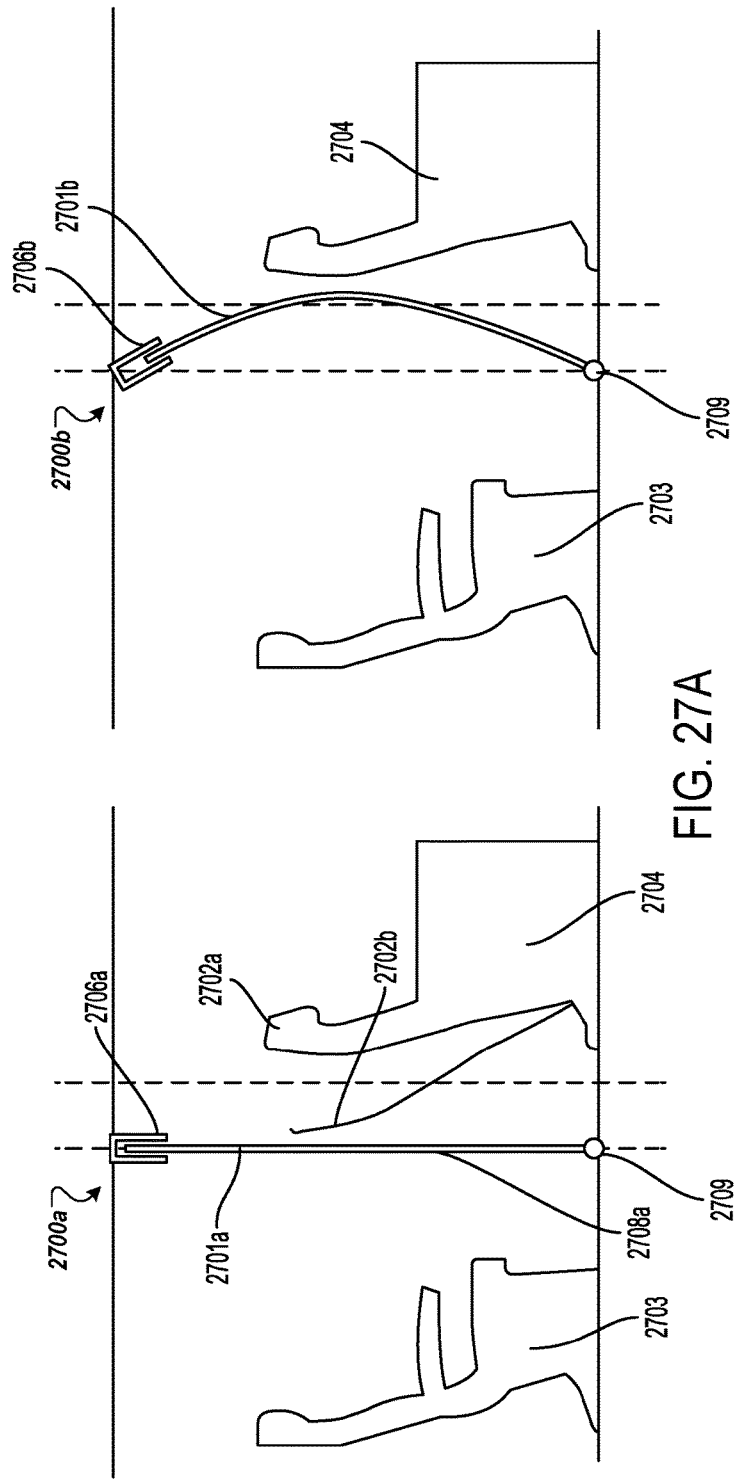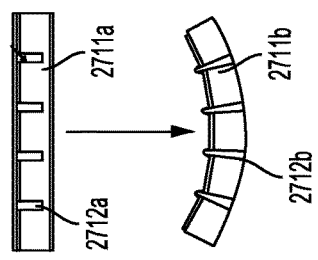
FIG. 27A
FIG. 27B

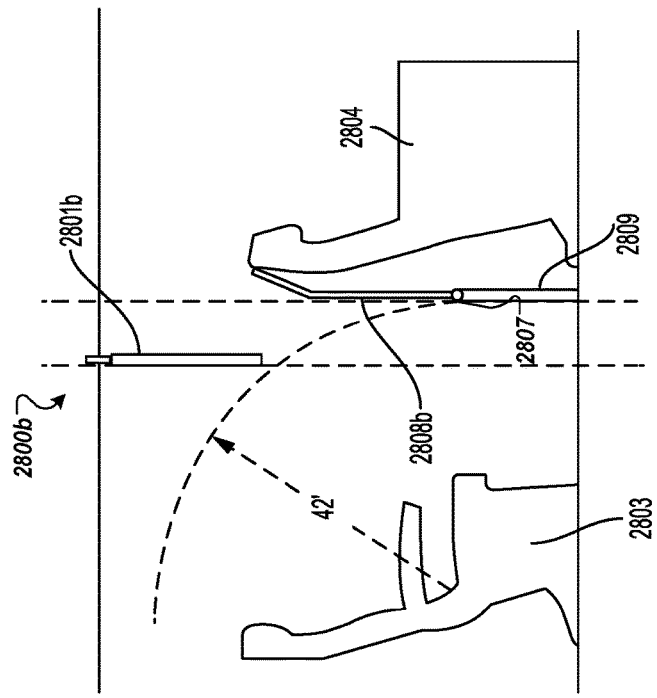
FIG. 28A
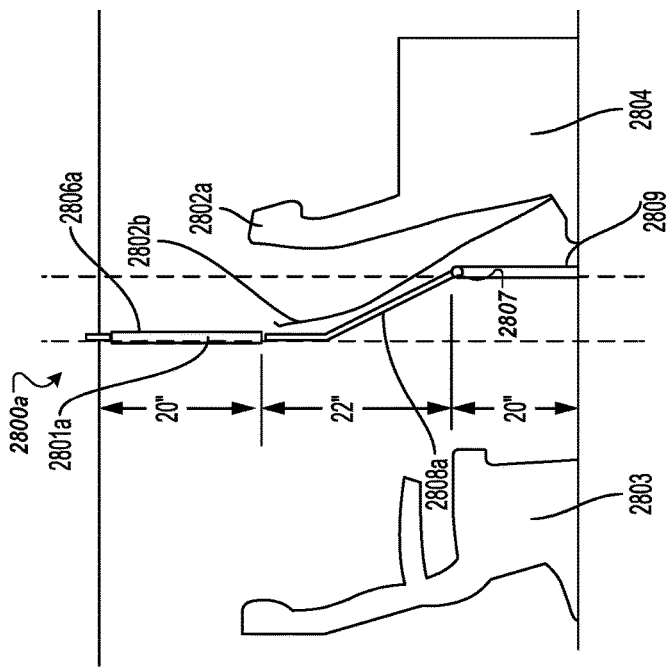
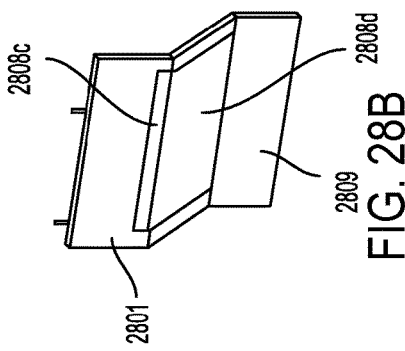
FIG. 28B

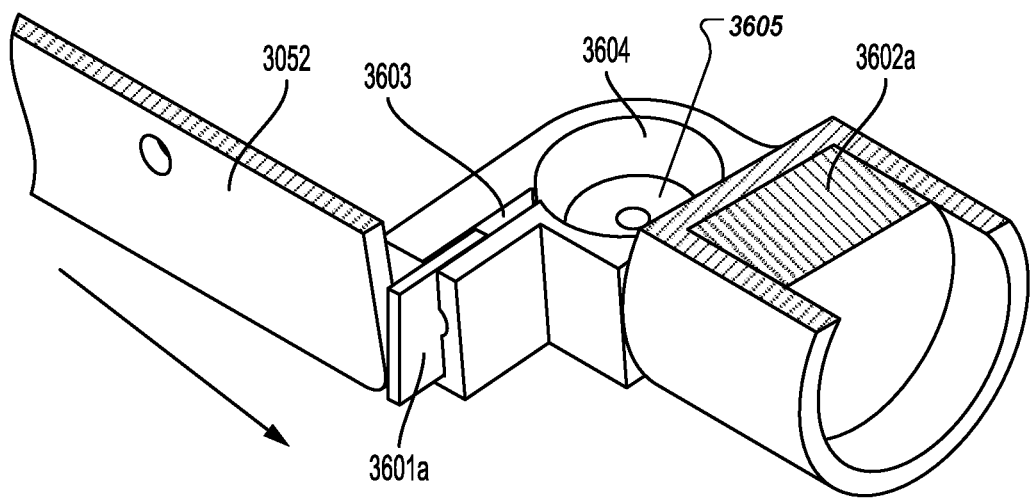
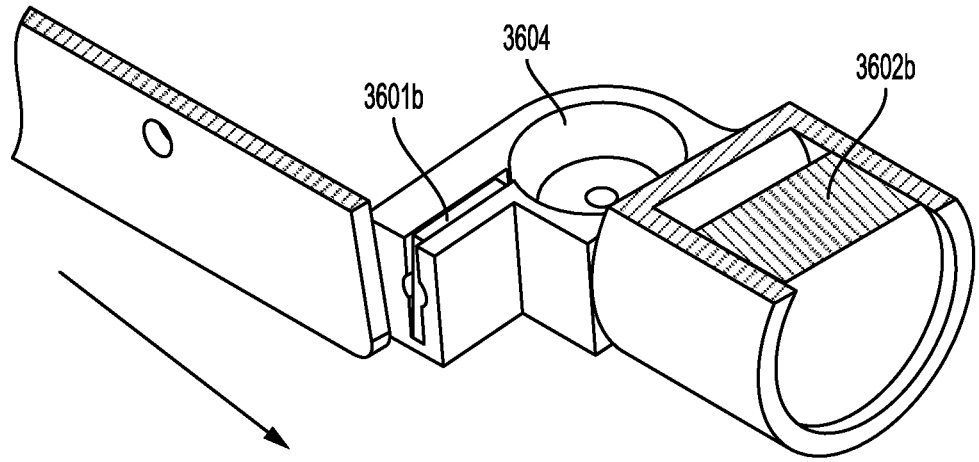
FIG. 36

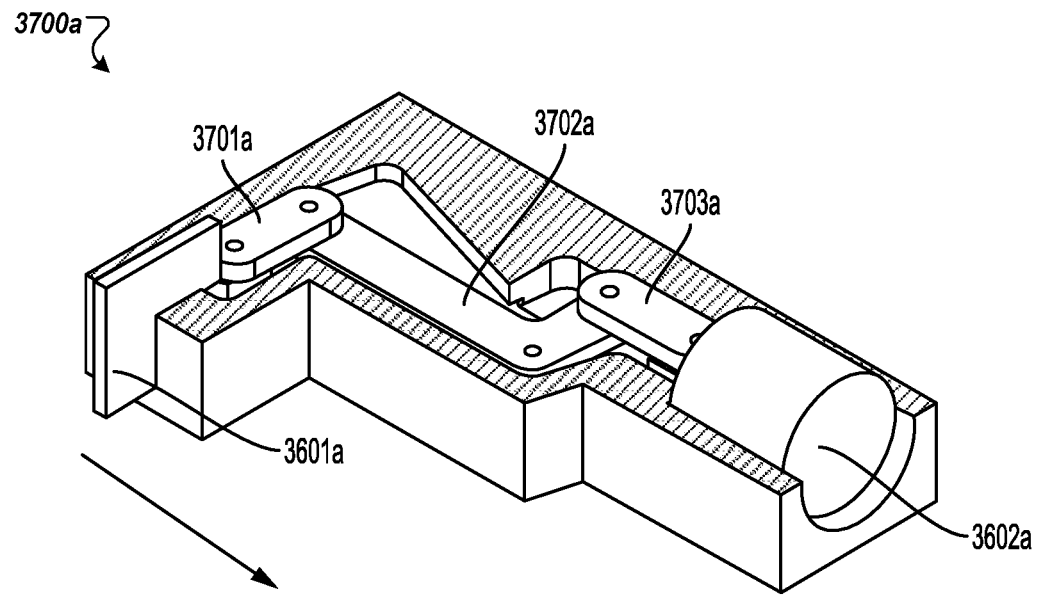
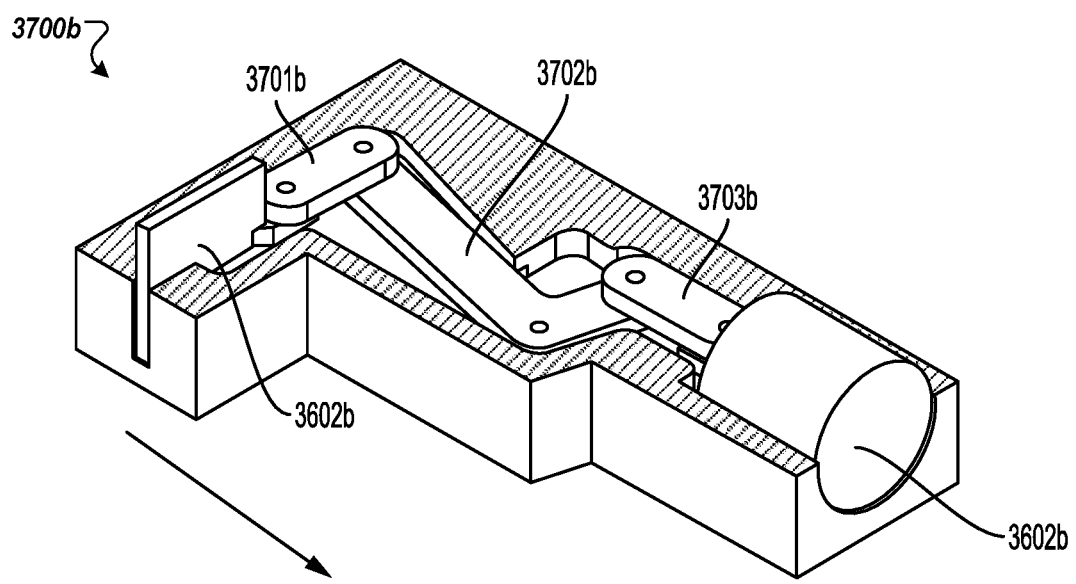
FIG. 38

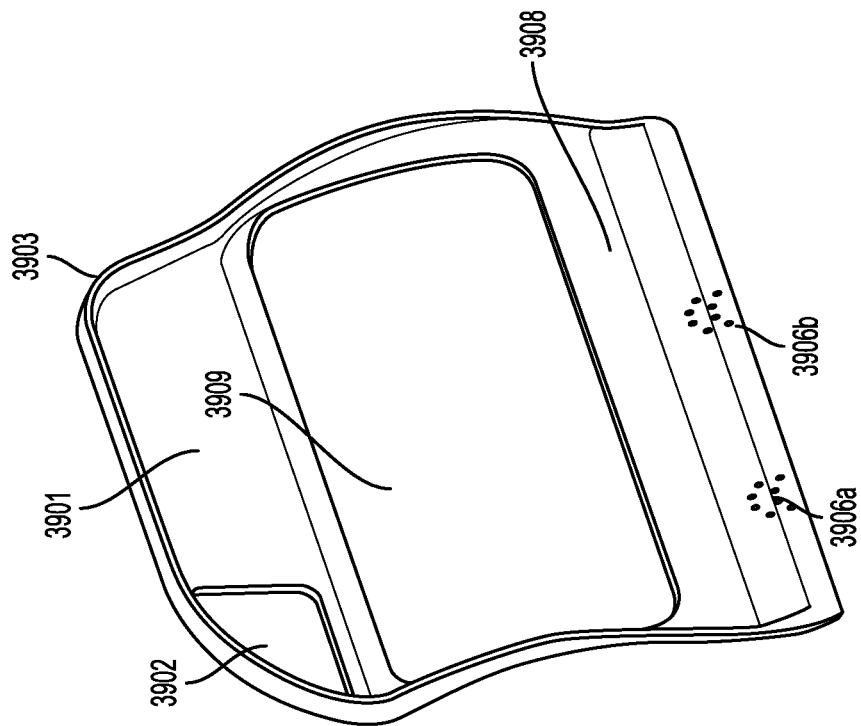
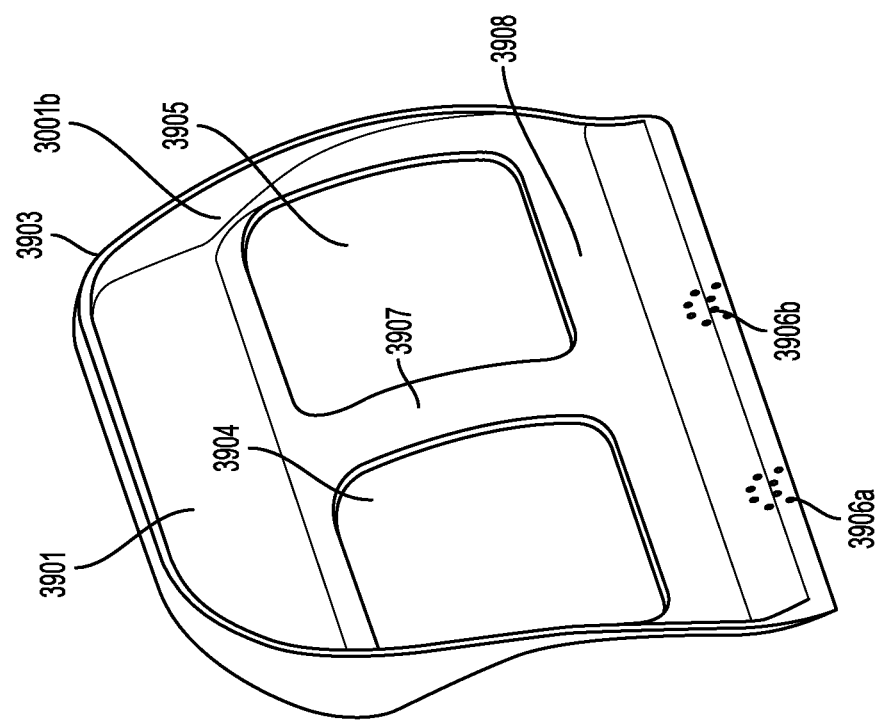
FIG. 39

CONTOURED CLASS DIVIDER

RELATED APPLICATIONS

This application claims priority to U.S. Provisional Patent Application Ser. No. 62/481,244, entitled "Contoured Class Divider," filed Apr. 4, 2017. This application also claims priority to and is a continuation-in-part of U.S. patent application Ser. No. 15/291,863 entitled "Contoured Class Divider" and filed Oct. 12, 2016 which is a continuation-in-part of U.S. patent application Ser. No. 15/153,104 entitled "Contoured Class Divider" and filed May 12, 2016, which claims priority to U.S. Provisional Patent Application No. 62/317,706 filed Apr. 4, 2016. The present disclosure is also related to PCT application number PCT/US16/32061 entitled "Contoured Class Divider" and filed May 12, 2016. All above identified applications are hereby incorporated by reference in their entireties.

BACKGROUND

The present disclosure relates to commercial aircraft multi-class cabin arrangements and how they can be efficiently separated from each other. One method to achieve division of the seat groups is by providing a hard divider between rows of seats attached to the aircraft seat tracks and an upper support element such as an overhead storage bin assembly.

Head Injury Criteria (HIC) requirements are provided, for example, by the Federal Aviation Administration (FAA) to establish standards in passenger protection in passenger aircraft cabin design. Certain HIC requirements are set forth in 14 CFR 23.562, which is incorporated herein by reference. The HIC requirements, for example, may specify clearance requirements within a head impact zone to reduce likelihood of passenger concussion in the event of an emergency such as rapid deceleration. Further, the requirements may specify deflection forces against objects that are within the head impact zone of a passenger, such as a fore passenger seat. In this manner, should a passenger's head impact an object such as the forward headrest of the fore passenger seat, the force of the impact is absorbed at least in part through the headrest design.

Federal regulations also dictate certain standards for static load handling, load sharing and dynamic load handling. 14 CFR 25.562 (incorporated herein by reference) provides that seats and restraint systems must be able to withstand a 16 G dynamic load. 14 CFR 25.561 (incorporated herein by reference) provides that other aircraft structures such as bulkheads must be able to withstand a 9 G forward static load. It is understood in the industry that if structures are spaced within one inch of one another, it must be demonstrated that the structures are capable of sharing loads during normal use and emergency landing conditions. Due to the complexity of the analysis, those skilled in the art of aircraft interior components generally avoid placing components within one inch of one another. For this reason, a minimum spacing of one inch has generally been maintained between bulkheads and seating systems (e.g. between a bulkhead and the aft surface of an aircraft seat).

SUMMARY OF ILLUSTRATIVE EMBODIMENTS

In one aspect, to optimize the usable space between cabin classes, a contoured class divider according to this application is specifically designed to nest into the volume behind the seat body following the profile of the seatback while still allowing for adequate seatback recline. In some embodiments, the form of the divider allows the seat immediately behind the contoured class divider to be located several inches closer to the seat forward of it, thus increasing the opportunity for increased seat pitch and passenger legroom in the cabin.

In one aspect, to increase passenger safety in the event of a rapid deceleration (e.g., as would occur during an emergency landing) a locking mechanism is design to release to allow the partition to move forwardly, increasing the clearance between the passenger and the divider. The locking mechanism, in one example, may include a shear pin which remains in its locked position until it is subjected to longitudinal acceleration associated with an emergency landing. Under those conditions the deceleration force experienced by the divider is sufficient to overcome the pin static shear force and the divider moves forwardly.

In another aspect, to increase passenger safety in the event of rapid deceleration, a contoured class divider according to this application includes at least one energy absorbing zone to absorb the energy of a head impact in the event of an emergency situation. In one example, an energy absorbing zone includes one or more structurally weakened portions designed to deform or break as a result of a threshold dynamic load. In other examples, the energy absorbing zone includes one or more portions embedded with energy absorbing material. The energy absorbing material may be foam. In further examples, the energy absorbing zone is designed to deform in a predetermined manner.

In a further aspect, the placement of a class divider panel within less than one inch of a seat or restraint system is facilitated by providing a known impact or interaction points between the divider and seat back. Impact protrusions or other design elements described herein may provide known points at which the divider will impact the seat, which will in turn simplify and make practical the calculations necessary to show that the divider and seat are able to withstand the projected load sharing in an emergency landing.

These and other objects and advantages of the embodiments described herein may be achieved, in some implementations, by providing a contoured class divider that includes a curved panel. The curved panel may be mounted into seat tracks "T" fittings behind a selected row of seats. The curve of the panel may closely correspond to the shape of the back of the selected row of seats and may nest into the volume behind the seatback while still allowing for adequate seatback recline. More specifically, a contoured class divider may be provided for dividing an aircraft cabin according to a predetermined class arrangement and including a divider panel having a contour closely matching a contour of a forward-positioned seatback and adapted for being positioned in closely, spaced-apart relation to the seatback for providing additional space aft of the seat. At least one leg may be provided for supporting the panel about an aircraft cabin deck. A viewing window may be formed in the panel for providing the ability of a flight attendant to observe areas of the cabin forward of the divider.

In one non-limiting illustrative example, a contoured class divider for dividing an aircraft cabin may include a panel positioned between a aft seat and a forward seat, the panel having an aft-facing convex contour closely matching an aft-facing contour of a seatback of the forward seat and configured to provide a gain of space forward of the aft seat; and at least one foot inserted into a seat track of the aircraft cabin; an articulation system to articulate the panel from a rearward position to a forward position and to increase the space between the divider and the seats immediately aft thereof (or, alternatively, permit those seats to be moved forward and, in some configurations, thereby enable an additional row of seats to be disposed on the airplane); and at least one connector that connects a top end of the panel and an overhead structural element of the aircraft cabin.

In one non-limiting illustrative example, a contoured class divider for dividing an aircraft cabin includes a panel positioned between a aft seat and a forward seat, the panel having an aft-facing convex contour closely matching an aft-facing contour of a seatback of the forward seat seatback and configured to provide increased space between the divider and the seats immediately aft thereof (or, alternatively, permit those seats to be moved forward and, in some configurations, thereby enable an additional row of seats to be disposed on the airplane), and a head impact zone configured to limit an impact shock between a passenger head and the panel; and at least one foot inserted into a seat track of the aircraft cabin; an articulation system to articulate the panel from a rearward position to a forward position and to increase the gain of space forward of the aft seat; and at least one connector that connects a top end of the panel and an overhead structural element of the aircraft cabin.

In one non-limiting illustrative example, an apparatus to divide class sections within a commercial aircraft is presented. The apparatus may include a divider panel positioned between an aft seat and a forward seat, the panel having an aft-facing convex contour closely matching an aft-facing contour of a seatback of the forward seat seatback and configured to provide increased space between the divider and the seats immediately aft thereof (or, alternatively, permit those seats to be moved forward and, in some configurations, thereby enable an additional row of seats to be disposed on the airplane). The apparatus may include at least one impact protrusion configured to be the initial point of impact if the forward seat makes contact with the panel. The panel may include at least one foot inserted into a seat track of the aircraft cabin. The apparatus may include an articulation system to articulate the panel from a rearward position to a forward position and vice-versa, allowing the gain of space forward of the aft seat; and at least one connector that connects a top end of the panel and an overhead structural element of the aircraft cabin.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIGS. 8A-8C illustrate views of an example locking system for locking a position of the contoured class divider upon articulation;

FIGS. 12A-12B illustrate views of a contoured class divider that includes a spring mechanism;

FIGS. 14A-14C illustrate components of a mechanism for causing movement of a contoured class divider during a crash event;

FIG. 15 illustrates an example of a mechanism for causing movement of a contoured class divider during an emergency event;

FIG. 17 illustrates a side view of passenger seats separated by a contoured class divider including panels hingedly connected by a pop joint;

FIG. 24 illustrates a side view of passenger seats separated by a contoured class divider including a telescoping lower base assembly;

FIG. 25 illustrates a side view of passenger seats separated by a contoured class divider that includes a stationary member coupled to an articulating panel by a magnetic catch;

FIG. 26 illustrates a side view of passenger seats separated by a contoured class divider including an articulating panel mounted to an overhead storage bin by a webbing strap retainer;

FIGS. 27A-27B illustrate views of passenger seats separated by a deformable contoured class divider;

FIGS. 28A-28B illustrate views of a passenger seat separated by a contoured class divider having a single articulating portion and multiple stationary portions;

FIG. 36 illustrates an alternative release mechanism for upper and lower shell members of a contoured class divider;

FIGS. 37-38 illustrate views of a mass linkage release mechanism for a contoured class divider; and FIGS. 39-42 illustrate views of a contoured class divider having a reduced articulating mass during a crash event.

DETAILED DESCRIPTION OF ILLUSTRATIVE EMBODIMENTS

Figure 1:
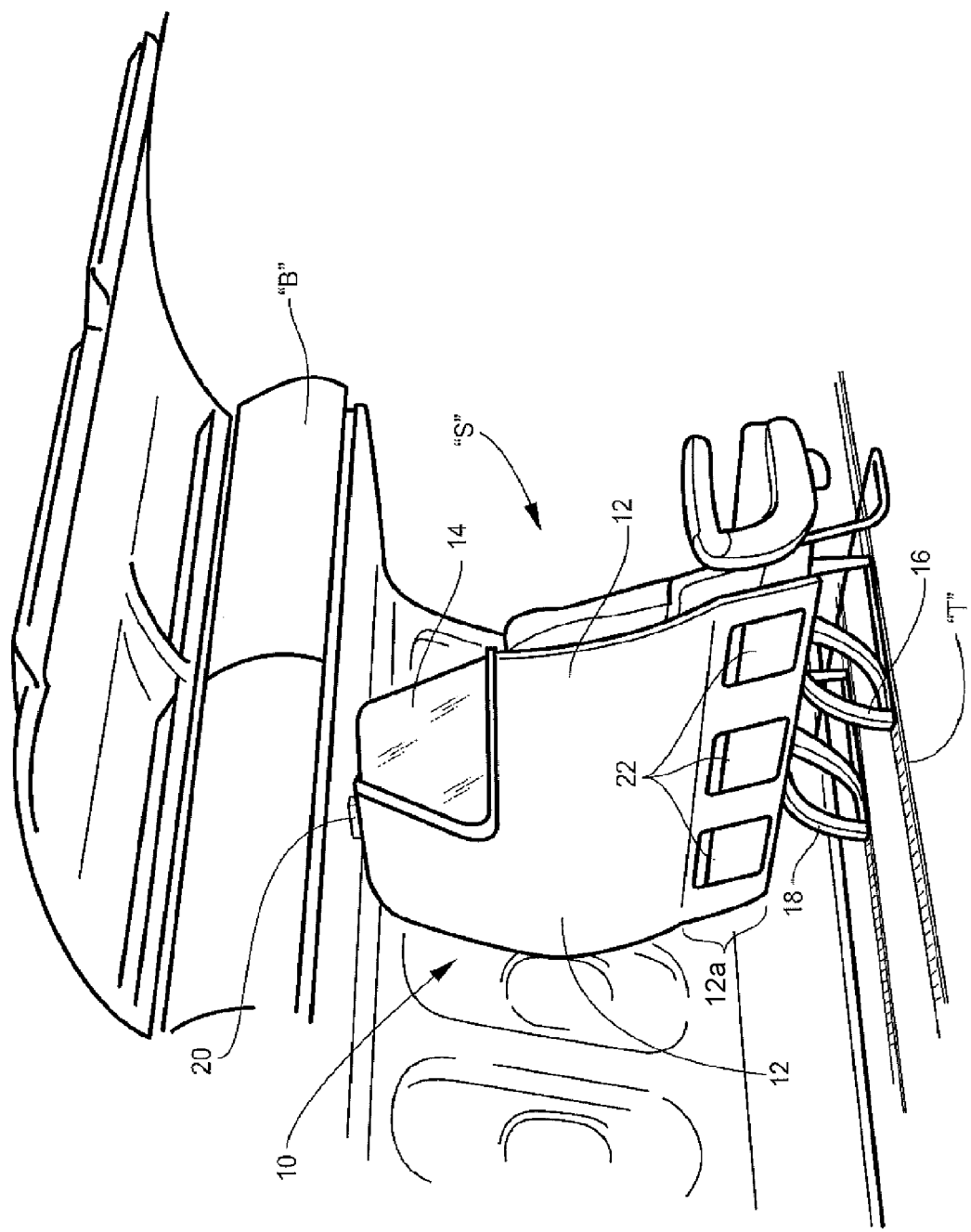
FIG. 1 is a forward perspective view of an aircraft cabin, showing an example contoured class divider and forward-positioned seats.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Referring now specifically to FIG. 1 of the drawings, a contoured port side class divider 10 is positioned directly behind a row of two first or business class passenger seats S such as are conventionally found in commercial aircraft cabins. Such cabins typically include both structural and decorative panels and overhead stowage bins for passenger luggage and other items. The divider 10 may include a fixed, rigid monument in the form of a panel 12 attached to floor-mounted seat tracks "T" and the overhead stowage bin "B" of the aircraft cabin. The exact attachment configuration may be dependent upon aircraft type and cabin configuration. The contoured port side class divider 10 may include an attendant viewing window 14. The attendant viewing window 14, for example, may be inset into an outer corner of the upper part of the panel 12 that can be defined by the airlines' cosmetic specifications. The window 14 may be clear or automatically dimmable. The divider 10 may separate a premium cabin area (e.g. first class or business class) from another cabin area (e.g. coach class seating).

Figure 2:
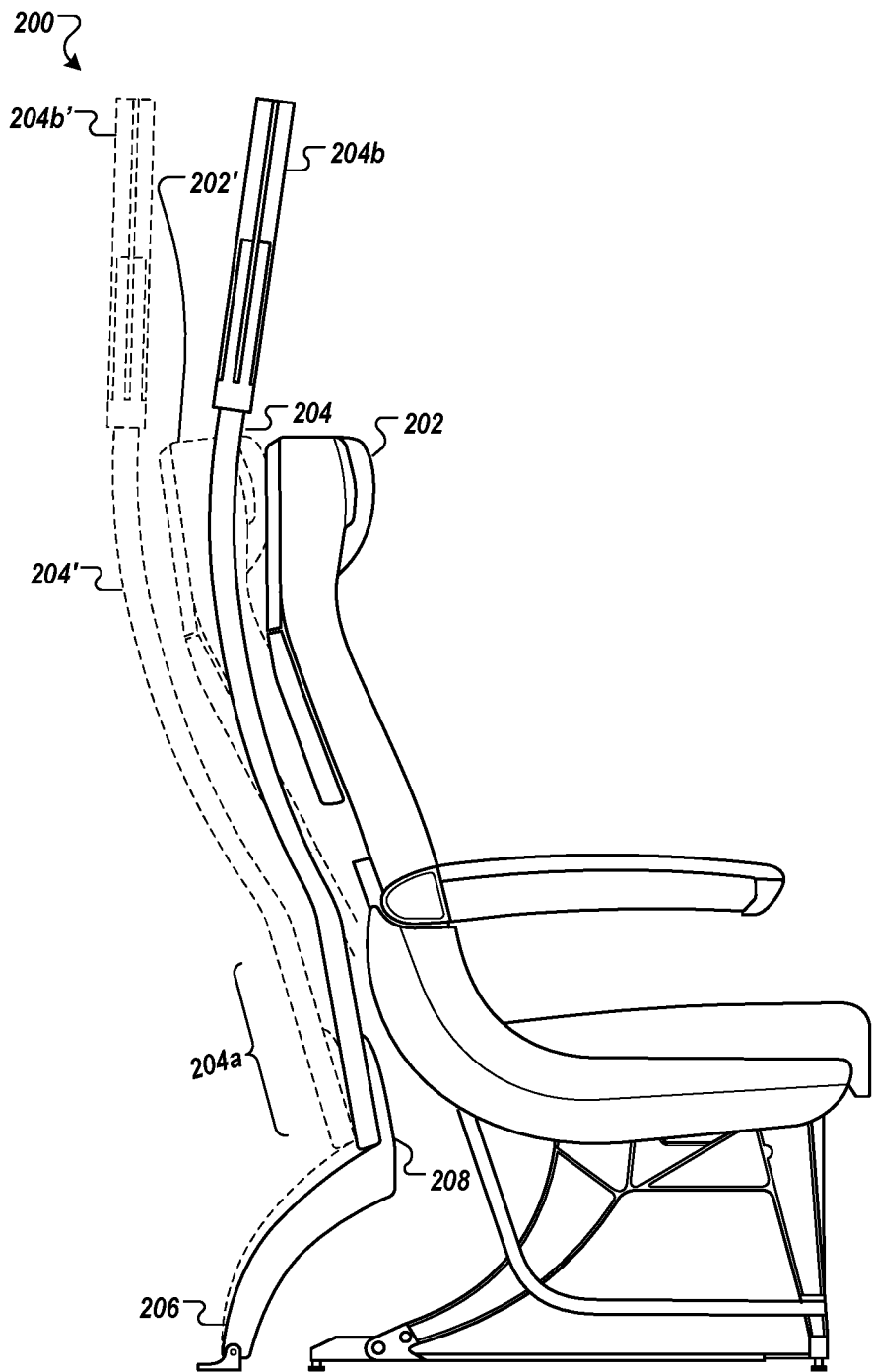
FIG. 2 is a side view of an example contoured class divider and forward-positioned seat.

Referring to FIG. 2, in some embodiments, a contoured class divider 200 optimizes use of the space behind the seat 202 that is normally not utilized or inefficiently utilized. By forming a panel 204 that follows the contour of the back of seat 202, the passenger in the seats aft of the divider may be provided enhanced space while also enhancing the ability of the seat and divider system to meet Head Impact Criteria (HIC) requirements. As shown, the panel 204 in the rear-facing direction is generally concave with a lower section 204a that is relatively flat in order to accommodate optionally supplied pockets 22 (illustrated in FIG. 1) for use by occupants of aft-positioned seats.

Returning to FIG. 1, three pockets 22 correspond to three main cabin seats (not shown) positioned immediately aft of the pockets. The contoured divider enables the aft seats (not shown) to be moved forward one to six inches towards the divider 10, more preferably three to five inches toward the divider 10 and in a currently preferred embodiment about four inches toward the divider 10. A panel 12, in some embodiments, is elevated off the floor by support legs 16, 18, allowing for stowage of passenger items under the seats S forward of the divider 10 by the passengers in the three main cabin seats.

The legs 16, 18, in some embodiments, are bowed rearwardly in a convex manner. This may provide additional clearance between the legs 16, 18 of the divider 10 and the rear legs of the seat. Such a configuration may provide enhanced resistance to deflection of the divider 10 in the aft direction, as might occur if divider is impacted by excessive recline of the seatback of the seat S or 202 or if forced rearwardly by a passenger. In alternative configurations, the legs 16, 18 are bowed forwardly in a concave manner (not shown). This configuration has the advantages that the legs 16, 18 generally follow the contour of the rear legs of the seats 202, provide more ingress and egress foot clearance for passengers in the three main cabin seats, and enhanced resistance to forward deflection of the divider.

Figure 3:
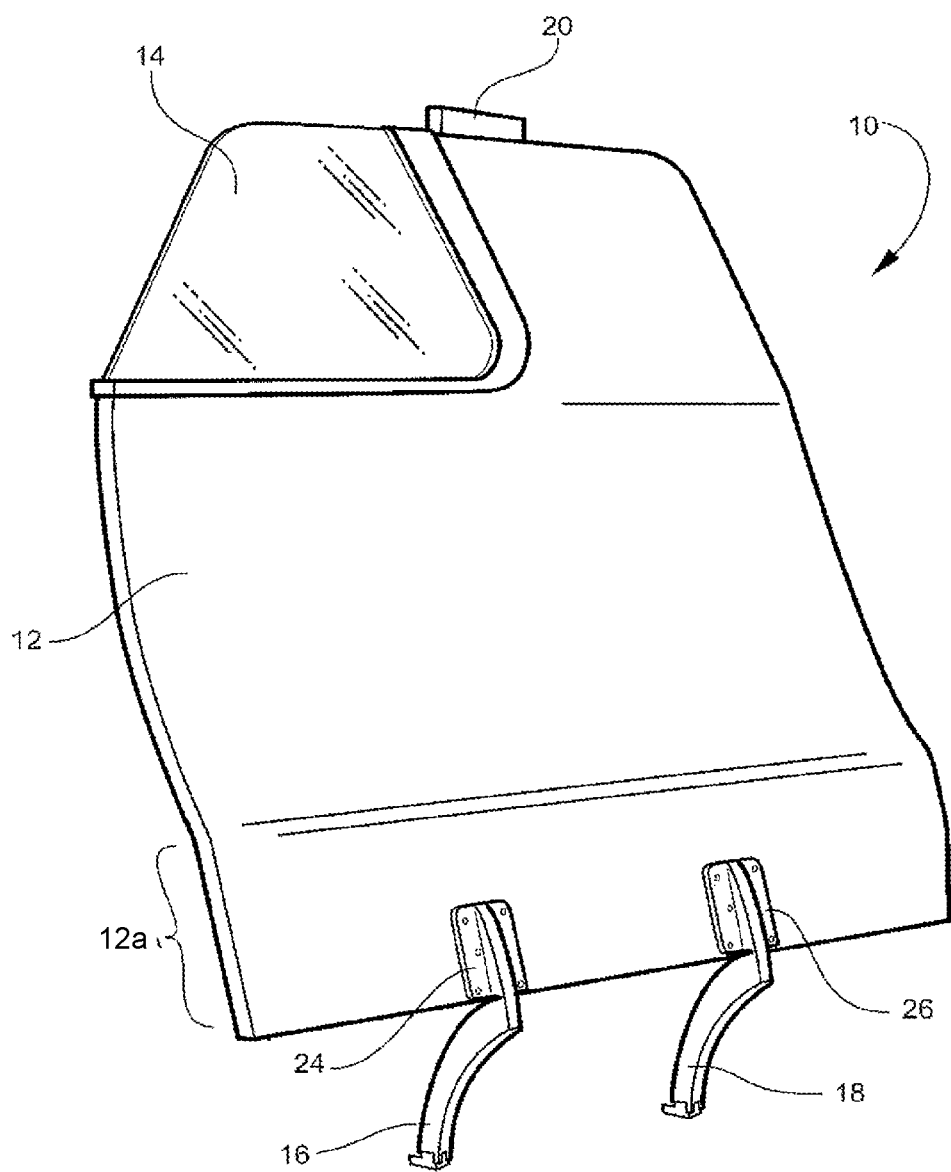
FIG. 3 is an aft perspective view of an example contoured class divider.

Referring to FIG. 3, a top end of the divider 10 may be secured against deflection by a connector 20 that attaches the divider 10 to an overhead structure below the bins B. Therefore, both the top and bottom of the divider 10 may be secured against movement. In the circumstance of a stationary mount of the divider 10, sufficient space may be provided between the panel 12 and the seats S to allow for the conventional amount of seatback recline. The panel 12 may also provide additional legroom for the occupants of seats aft of the divider 10 through both the contoured curve and the opening provided by the legs 16, 18.

In some embodiments, the legs 16, 18 are coupled to the divider by force distributing flanges 24 and 26. These flanges disperse the load transferred between the legs and panel 12 such that the panel can be of a relatively lightweight construction with either modest or no structural reinforcement in the region of the leg 16 and 18.

Returning to FIG. 2, in some embodiments an upper portion 204b of the panel 204 is generally straight and arranged in a substantially vertical orientation when in the normal operative position (illustrated in dotted lines). The upper portion 204b may include a connector (not illustrated), such as connector 20 of FIG. 1, to secure the contoured divider panel 200 to an overhead structure, such as overhead storage bins. The contoured class divider 200, in some embodiments, is designed to automatically move to a forward position (shown in solid lines) in an emergency landing situation (i.e., under substantial deceleration) or other emergency circumstance. For example, to provide additional head clearance for aft-positioned passengers in the event of an emergency landing, the contoured class divider 200 may be configured to automatically actuate from its rearward position (dashed lines) to the forward position (solid lines). Various configurations designed to enable automatic deflection of the contoured class divider position are described in detail below.

In another example, the contoured class divider 200 may be positioned in the forward (solid line) position during take-off and landing, and in the rearward (dashed line) position in-flight. For example, as illustrated in dashed lines, the passenger seat 202' may only have clearance to move to a rearward position (illustrated in dashed lines) when the contoured class divider is positioned in the rear (dashed line) position. In this situation, the positioning of the contoured class divider 200 may be actuated by a passenger or crew member. In one example, a passenger may cause the contoured class divider 200 to actuate to a rearward position by selecting a control such as the conventional passenger seat back recline control. In another example, a crew member may have access to a control positioned proximate the overhead bin (e.g. on the underside of the bin adjacent the slot into which a connector extends, or inside the bin).

Figure 5:
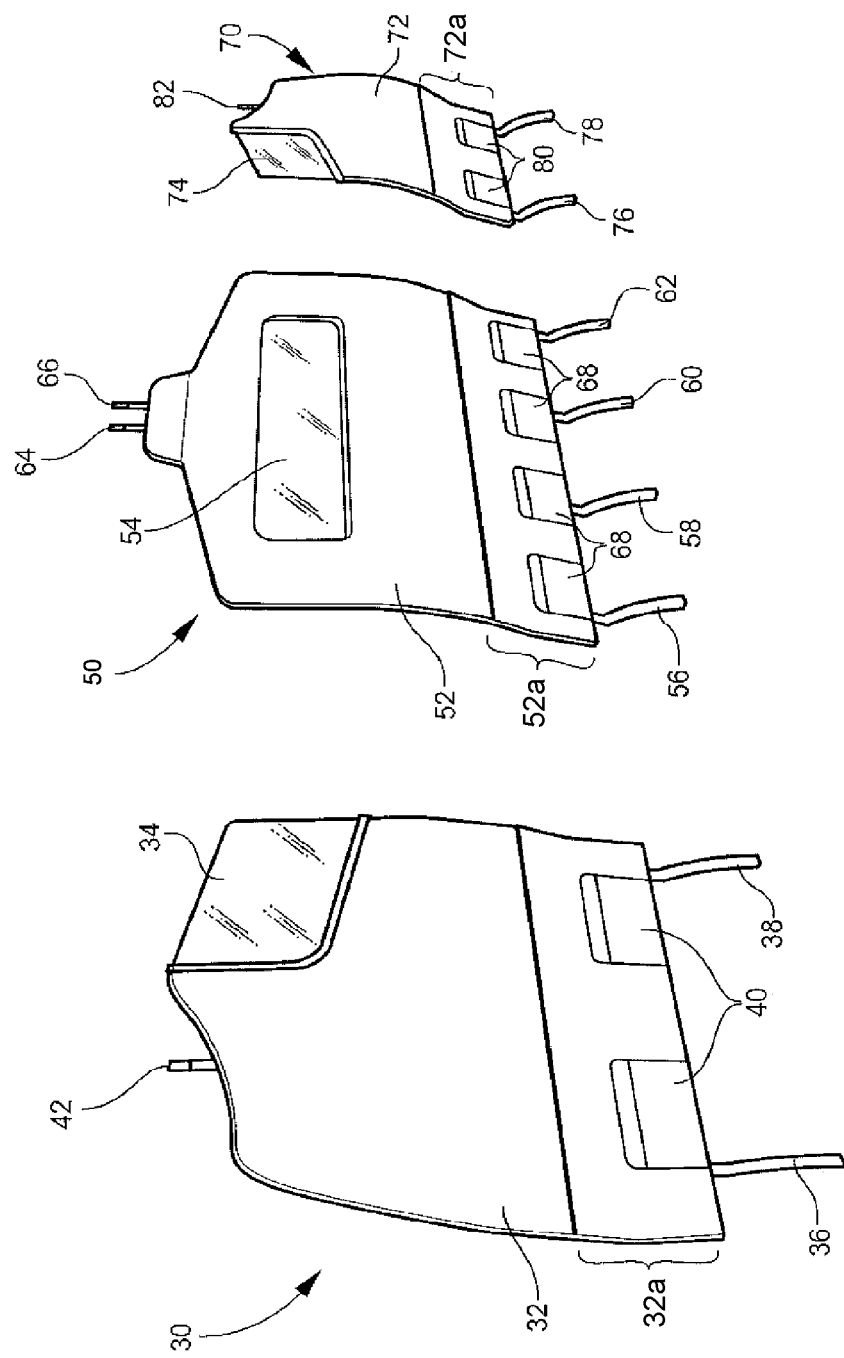
FIG. 5 is a forward perspective view of an example set of two side class dividers and a center class divider.

Referring now to FIG. 5, a set of contoured dividers, in some implementations, include a port divider 30, a center divider 50, and a starboard divider 70. Port divider 30, as illustrated, includes a panel 32. The port divider 30, in some examples, may be attached to floor-mounted seat tracks via legs 36, 38 and to the overhead stowage bin of the aircraft cabin via connector 42 in a manner similar to that described in relation to FIGS. 1 and 2. The connector 42 preferably mates with the overhead bin in a manner that permits the panel to actuate between the forward and rearward positions. The exact attachment configuration, in some embodiments, is dependent upon aircraft type and cabin configuration. The divider 30 may include an attendant viewing window 34 that is inset into an outer corner of the upper part of the panel 32 that permits crew to view through the divider 30 when standing. The provides privacy for the seated passengers while improving visibility of standing crew members. The window 34, in some examples, may be clear or have electronically adjustable opacity, tint, or reflectivity.

The panel 32, in the illustrative embodiment, is generally concave in the rear-facing direction with a lower section 32a that is relatively flat. The lower section 32a, for example, may be designed to accommodate pockets 40 for use by occupants of aft-positioned seats. The profile of the top end of the panel 32, in the illustrative embodiment, is curved to fit a fuselage and storage bin configuration different than that shown in FIGS. 1-4. The port divider 30 may be secured against deflection by a connector 42 that attaches the port divider 30 to an overhead structure (not shown) such as the underside of a storage bin.

The center divider 50, in some embodiments, includes a panel 52. The center divider 50, in some examples, may be attached to floor-mounted seat tracks via legs 56, 58, 60, and 62 and to the overhead stowage bin of the aircraft cabin by connectors 64, 66 in the manner discussed above. The center divider 50 may include, for example, an attendant viewing window 54 that is inset into an outer corner of the upper part of the panel 52 that may have the properties discussed above. Legs 56, 58, 62, and 62 may be bowed rearwardly as shown and as described above. The panel 52 in the rear-facing direction, in the illustrative embodiment, is generally concave with a lower section 52a that is relatively flat. The lower section 52a, for example, may be designed to accommodate pockets 68 for use by occupant's main cabin seats positioned immediately aft of the divider 50. The profile of the top end of the panel 52, in the illustrative embodiment, is curved to fit storage bins mounted on the center aisle above the center passengers. The center divider 50 may be secured against deflection by connectors 64, 66 that attach the center divider 50 to an overhead structure, not shown. The connectors preferably permit the divider to move between a rear position and forward position, as discussed above.

A starboard side divider 70, in some implementations, may be attached to floor-mounted seat tracks via legs 76, 78 and to the overhead stowage bin of the aircraft cabin via connector 82 in a manner similar to that described above. The starboard divider 70 may include an attendant viewing window 74 that is inset into a corner of the upper part of the panel 72 that may have the properties and functionality discussed above. The panel 72 in the rear-facing direction, in the illustrative embodiment, is generally concave with a lower section 72a that is relatively flat. The lower section 72a, for example, may be designed to accommodate pockets 80 for use by occupants of passengers in the seats immediately aft of the divider 70. The profile of the top end of the panel 82, in the illustrative embodiment, is curved to fit a storage bin configuration different than that shown in FIGS. 1-4. The connector 82 preferably permits the divider to move between a rear position and forward position, as discussed above.

Figure 6:
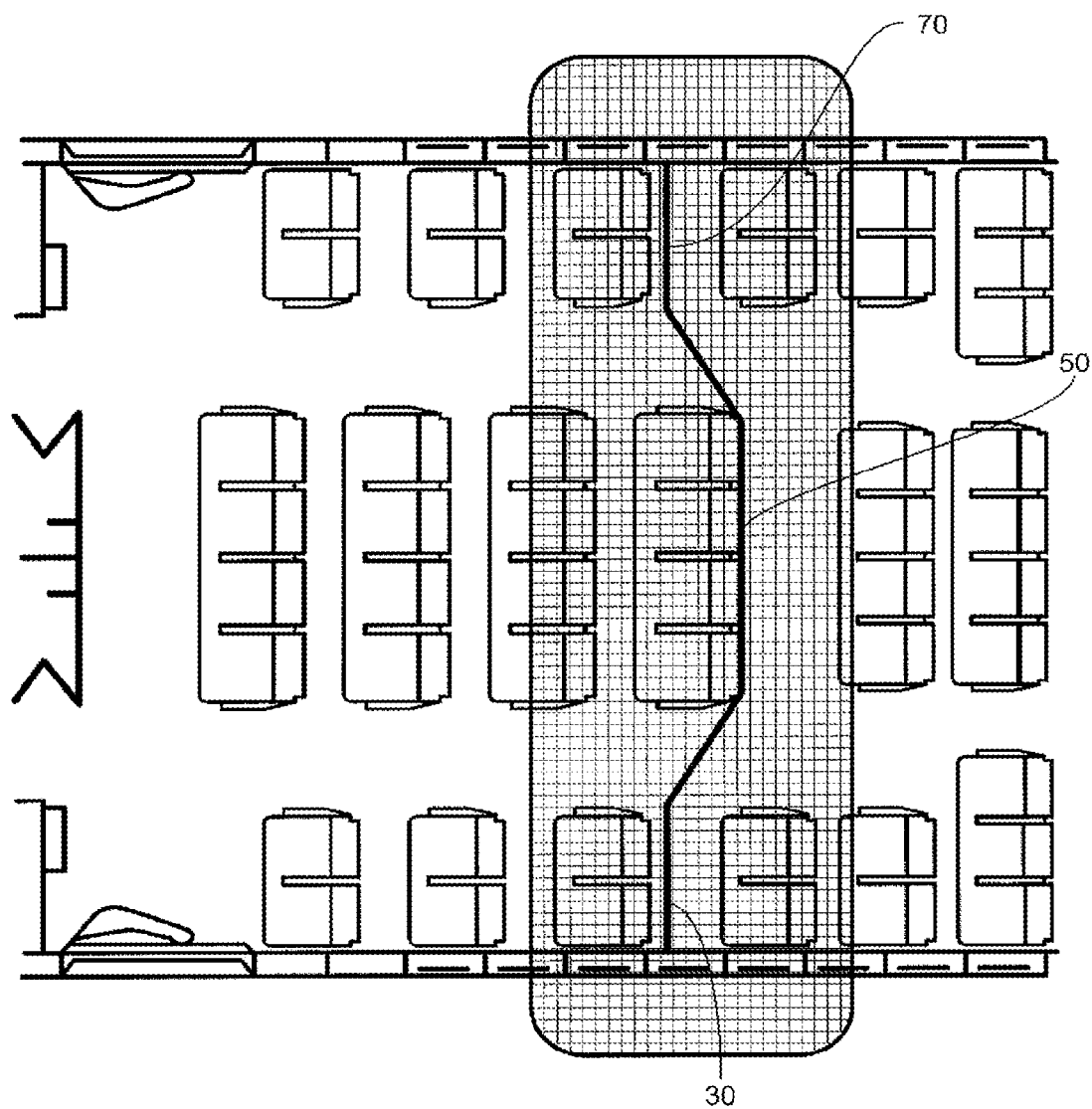
FIG. 6 is a partial plan view of an aircraft cabin showing an example placement of side contoured class dividers and a center class divider.

As shown in FIG. 6, the port side, center and starboard side class dividers 30, 50 and 70, in an illustrative embodiment, are positioned to divide an aircraft cabin into separate classes. The dividers advantageously form a divider system wherein the starboard, center and port dividers are positioned at varying longitudinal positions (fore/aft) in the cabin. This helps accommodate galley and other structures which are often disposed in the center of the cabin and can require the center column of seats to be shifted rearwardly relative to the starboard a port columns of seats.

Figure 4A:
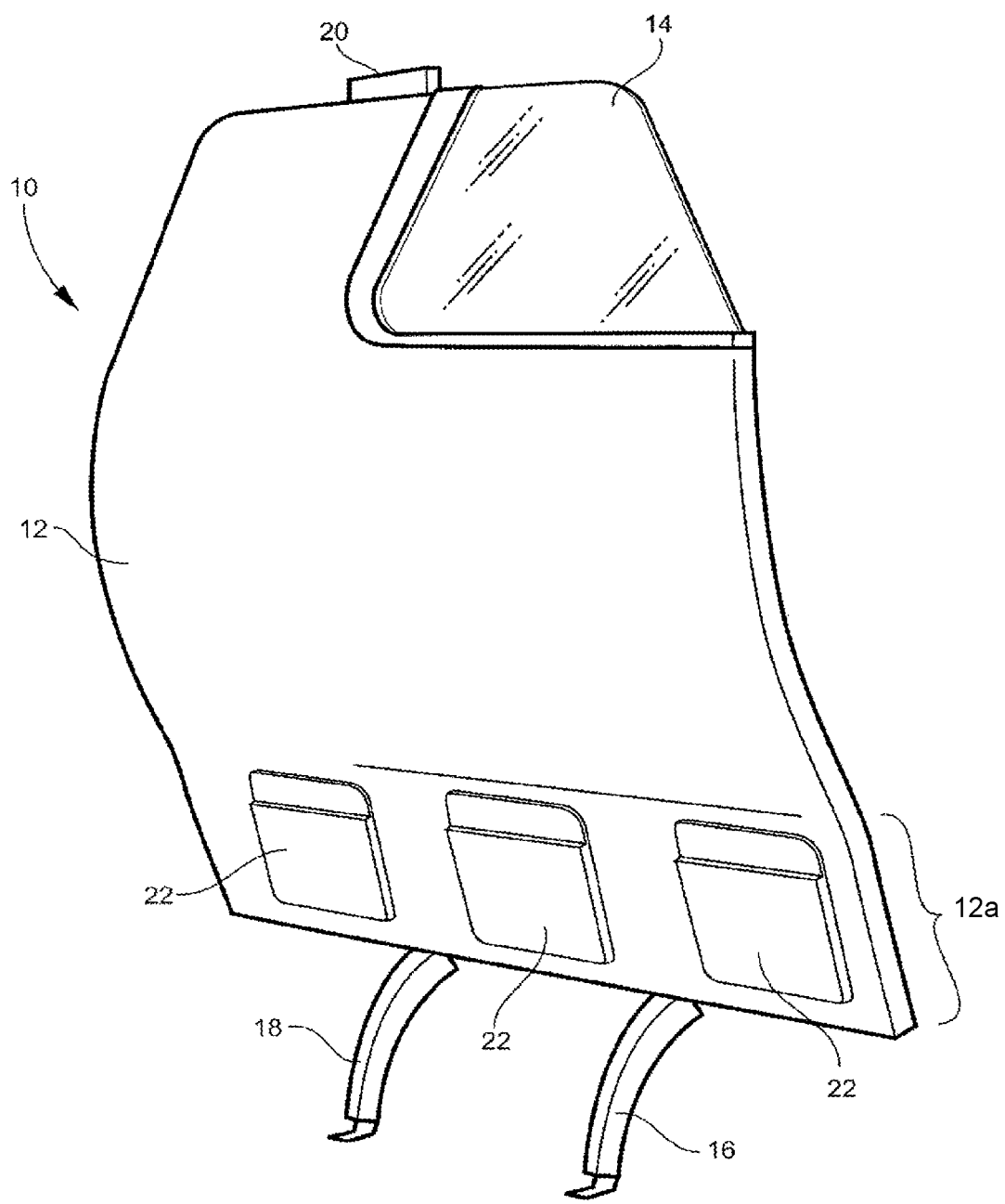
FIG. 4A is a forward perspective view of an example contoured class divider.
Figure 7A:
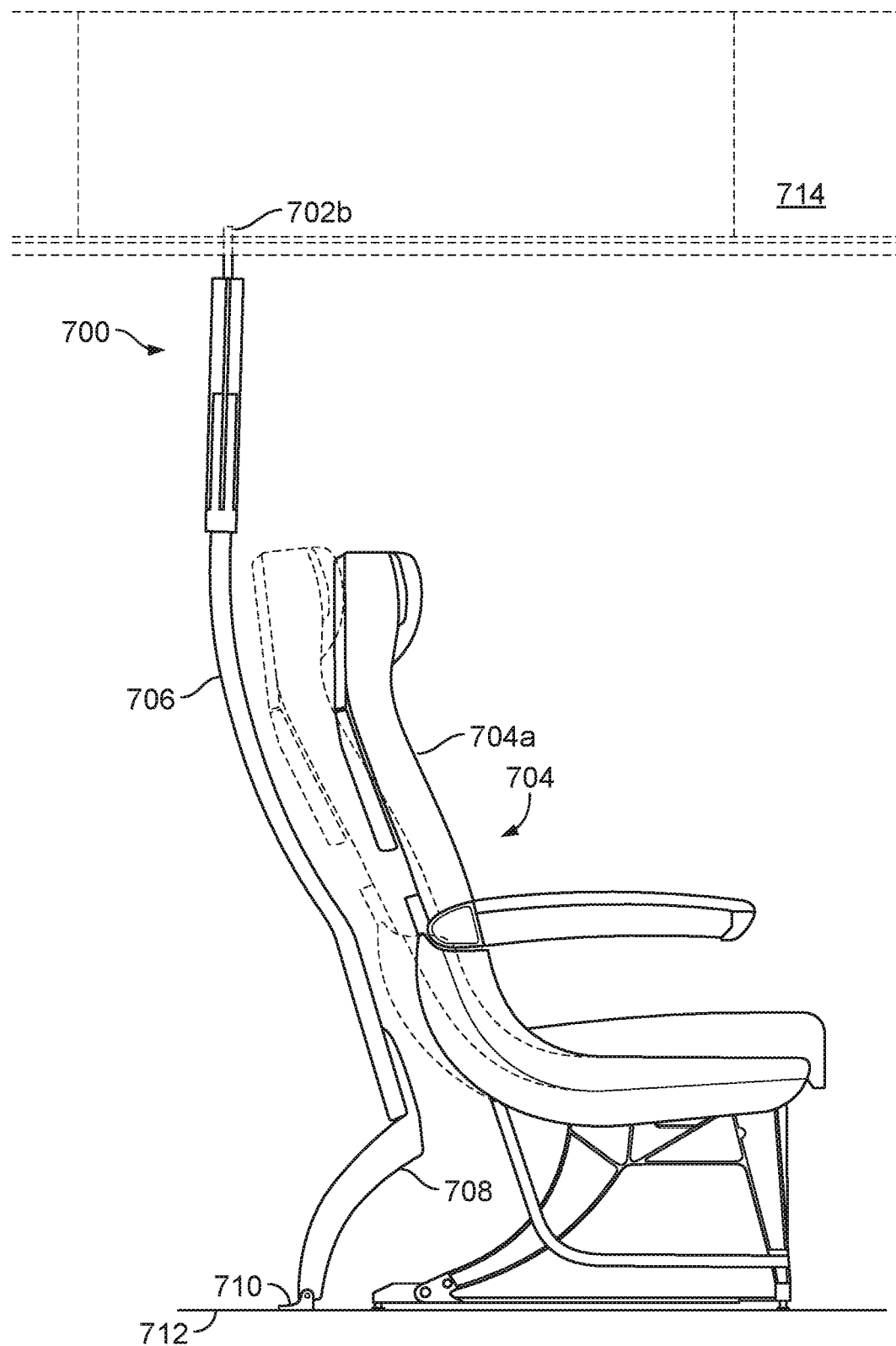
FIGS. 7A-7I illustrate side views of example contoured class dividers showing embodiments of articulation systems.

FIG. 7A is a side view of an example contoured class divider 700 shown the rearward position. The contoured class divider 700, for example, may be similar to the contoured class divider 10 illustrated in FIG. 4A. The class divider 700 includes a panel section 706 positioned between a storage bin region 714 and at least one leg 708, and a foot or floor mount 710. The floor mount 710, for example, may be a portion of the leg(s) 708 that is inserted in floor-mounted seat tracts 712. For example, as illustrated in FIG. 4A, the contoured class divider 700 may include a total of two legs 708 (e.g., such as legs 16 of class divider 10) and two feet 710. The passenger seat 704, as illustrated, may move from an upright position (illustrated in solid lines) to a reclined position (illustrated in dashed lines) where a seatback region 704a of the passenger seat 704 is nested proximate a curved area of the contoured class divider 700 while the seat is in a reclined position. Although illustrated as being positioned a distance away from the contoured class divider 700, in other embodiments, the contoured class divider 700 may be designed for load sharing between the passenger seat 704 and the panel section 706. In such configurations, the distance between the seat and the divider in certain operative configurations is less than one inch.

Figure 7B:
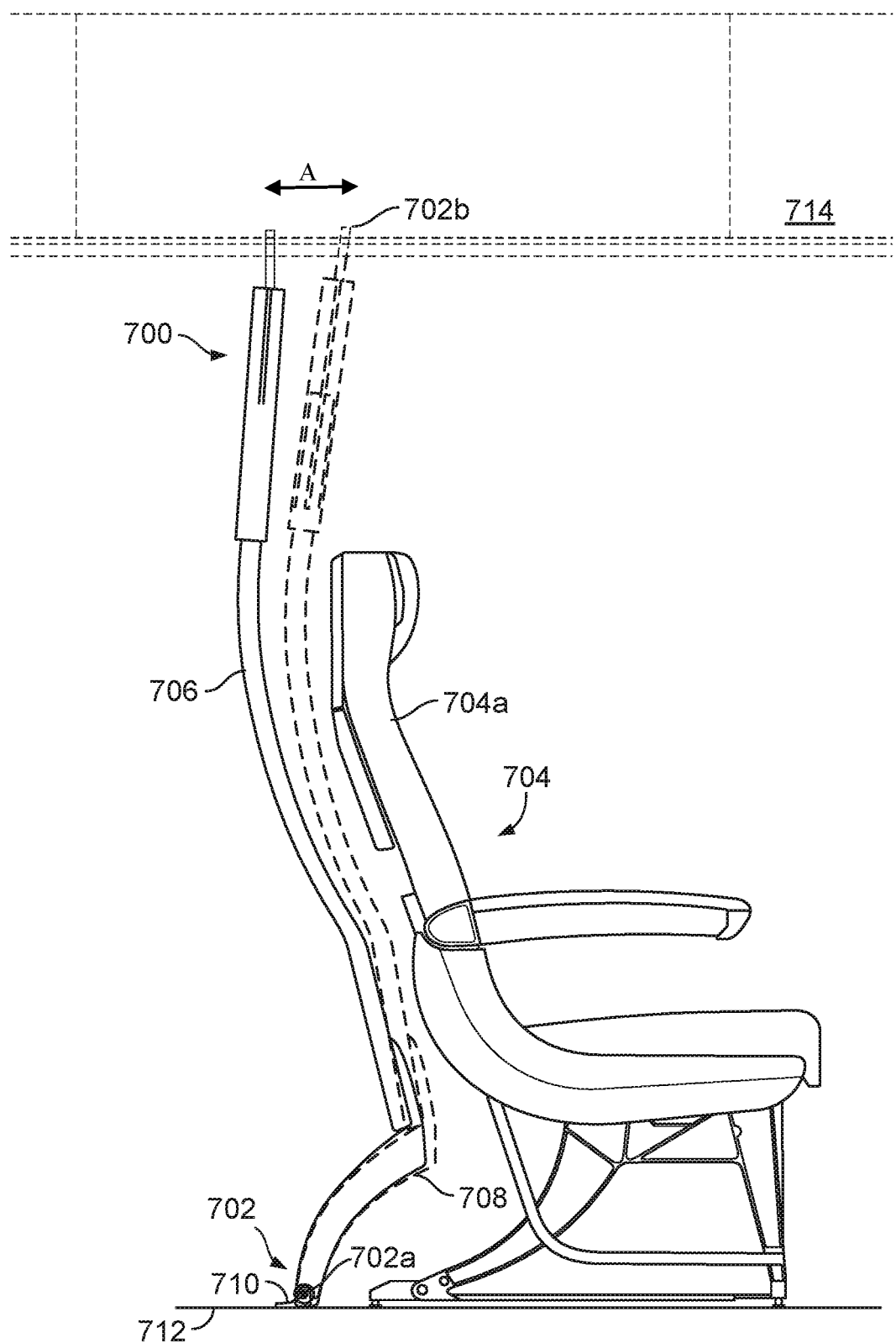

FIG. 7B is a side view of the example contoured class divider 700 in a rearward (solid lines) and forward (dashed line) positions. The seat 704 is shown in the upright or take-off taxi and landing (TTOL) position. The contoured class divider 700, in some embodiments, includes the articulation system 702 to articulate the divider 700 from a rearward position (illustrated in solid lines) to a forward position (illustrated in dashed lines). The articulation system includes a pivotable or hinged floor mount 702a and an upper connector 702b that moves between a forward and a rearward position. In the forward position, the space behind the forward positioned passenger seats, such as the passenger seat 704, may be minimized such that the divider 700 more readily meets the FAA's Head Injury Criterion (HIC) requirements for the passenger seats immediately aft the contoured class divider 700. While in the forward position (dashed lines), for example, increased space between a set of aft passenger seats (not illustrated) and the contoured class divider 700 may be outside of a conventional head impact zone (e.g., range of typical sized passenger head movement during an emergency deceleration). While in the rearward position (solid lines), in some implementations, the space aft the passenger seat 704 is adequate to provide clearance for conventional range of seatback recline for the passenger seat 704. For example, the forward position (dashed lines) can be used during a taxi takeoff landing (TTOL) phase or an emergency situation, e.g. anticipated impact, anticipated ditching, anticipated forced landing, while the rearward position can be used during a cruise phase. In another example, the divider may be placed in the forward position (dashed lines) only in emergency circumstances only.

The articulation of the contoured class divider 700 from the rearward position (solid lines) to the forward position (dashed lines), in some implementations, is configured to increase seating capacity and space for other cabin amenities while conforming to HIC requirements. The contour and/or articulation of the contoured class divider 700 may enable the main cabin seats positions immediately aft the contoured class divider 700 to be moved forward up to 6 inches (towards the contoured class divider 700) due to the increased clearance provided by the contour and/or articulation of the class divider 700. This may in many cabin configurations enable the insertion of an additional row of main cabin and/or premium cabin seats. Alternatively or additionally, the space savings provided by the class divider may alternatively be utilized to improve passenger comfort, as by enlarging the living space of for the passengers seated immediately aft of the divider or enlarging the living space in a number of rows (e.g., by increasing the seat pitch in the premium cabin, the forward portion of the main cabin, or the rear portion of the main cabin) without reducing the number of seats on the aircraft. Seat pitch is the distance between like points on seats juxtaposed fore and aft of one another.

In other embodiments, the divider 700 provides 1-12 inches of additional clearance, 2-10 inches of additional clearance, 3-9 inches of additional clearance, 4-8 inches of additional clearance, 5-7 inches of additional clearance or about six inches of additional clearance. As discussed herein below, up to an additional inch of clearance may be provided by positioning the seat and divider in close proximity (less than one inch apart) such that they share loads during normal operation and/or emergency landings.

The articulation system 702, in some implementations, includes at least one pivot mechanism 702a to enable articulation of the contoured class divider 700 from the rearward position (solid lines) to the forward position (dashed lines), and vice-versa, via a rotation or pivoting of at least the panel 706 of the contoured class divider 700 between the rearward and forward positions. The at least one pivot mechanism 702a can be placed at a predetermined position on the contoured class divider 700, in one example, to maximize the additional clearance generated by the articulation of the contoured class divider 700 from the rearward position (solid lines) to the forward position (dashed lines). As illustrated, for example, the at least one pivot mechanism 702a (such as a rotatable pin connection) can be placed on the leg(s) 708 at top part of the foot 710. The at least one pivot mechanism 702a for example, may be configured to rotate the panel 700 around a rotation axis substantially parallel to a floor of the aircraft cabin, as illustrated in FIG. 7B, providing a rotation range "A" of the contoured class divider 700. The positioning of the pivot mechanism 702a may in some embodiments dictate the contour of the divider in that the divider is shaped or contoured to closely follow the contour of the seat back. The rotation range "A" may be about 1-15 degrees, about 2-14 degrees, about 3-13 degrees, about 4-12 degrees, about 5-11 degrees, about 6-10 degrees, about 7-9 degrees or about 8 degrees.

In some embodiments, the articulation system 702 further includes a locking mechanism 702b for locking the contoured class divider 700 in either the rearward position (solid lines) or the forward position (dashed lines). The locking mechanisms are discussed in greater detail below in relation to FIGS. 8A-C.

As mentioned above, the divider may be positioned in the rearward position at all times until an emergency landing occurs. The decelerative force of the emergency landing moves the divider to the forward position without interfering with the seat because the seat will be in the TTOL position during an emergency landing. This configuration advantageously provides full recline for the seat forward of the divider (in the first, business or premium cabin) while provide the aforementioned amounts of additional clearance.

In an alternative embodiment, the divider is routinely articulated between the forward and rearward positions by crew members. For instance, after reaching cruising altitude the crew may move the divider to the rearward position. In preparation for TTOL, the crew may move the divider to a forward position.

Figure 7C:
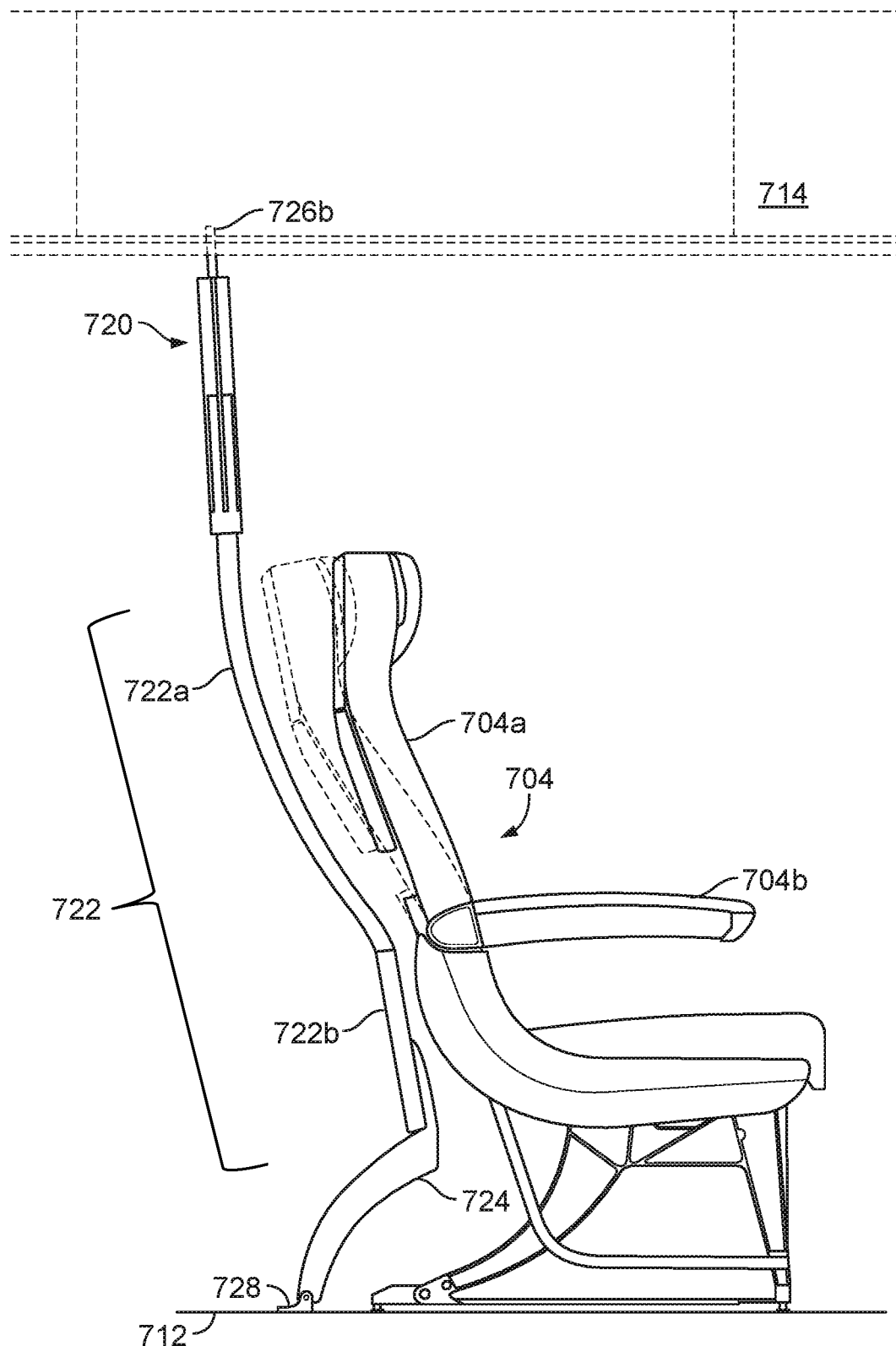

FIG. 7C depicts the functionality of the seat when the divider is in the rearward position. The seat 704 may fully recline in the depicted embodiment without coming within one inch of the class divider, thus obviating the need to design the seat and divider to share loads. The seat will be placed in the upright position during TTOL.

In some implementations, a contoured class divider 720, as illustrated in FIG. 7C, includes a panel section 722 positioned between the storage bin region 714 and at least one leg 724, and a foot 728. The foot 728, for example, may be a portion of the leg(s) 724 that is inserted in floor-mounted seat tracts 712. The panel 722 may be divided in an upper curved region 722a and in a lower straight region 722b. The passenger seat 704, as illustrated, may move from a forward position (illustrated in solid lines) to a rearward position (illustrated in dashed lines) where a seatback region 704a of the passenger seat 704 is nested proximate the upper curved region 722a of the contoured class divider 720. Although illustrated as being positioned a distance away from the contoured class divider 720, in other embodiments, the contoured class divider 720 may be designed for load sharing between the passenger seat 704 and the upper curved region 722a (e.g. as where the divider and seat are spaced less than one inch away from each other). As illustrated, the contoured class divider 720 is disposed between the seat tracts 712 of the cabin area and the bin region 714. In other implementations, the contoured class divider 720 may be fixed to other upper cabin area structures.

Figure 7D:
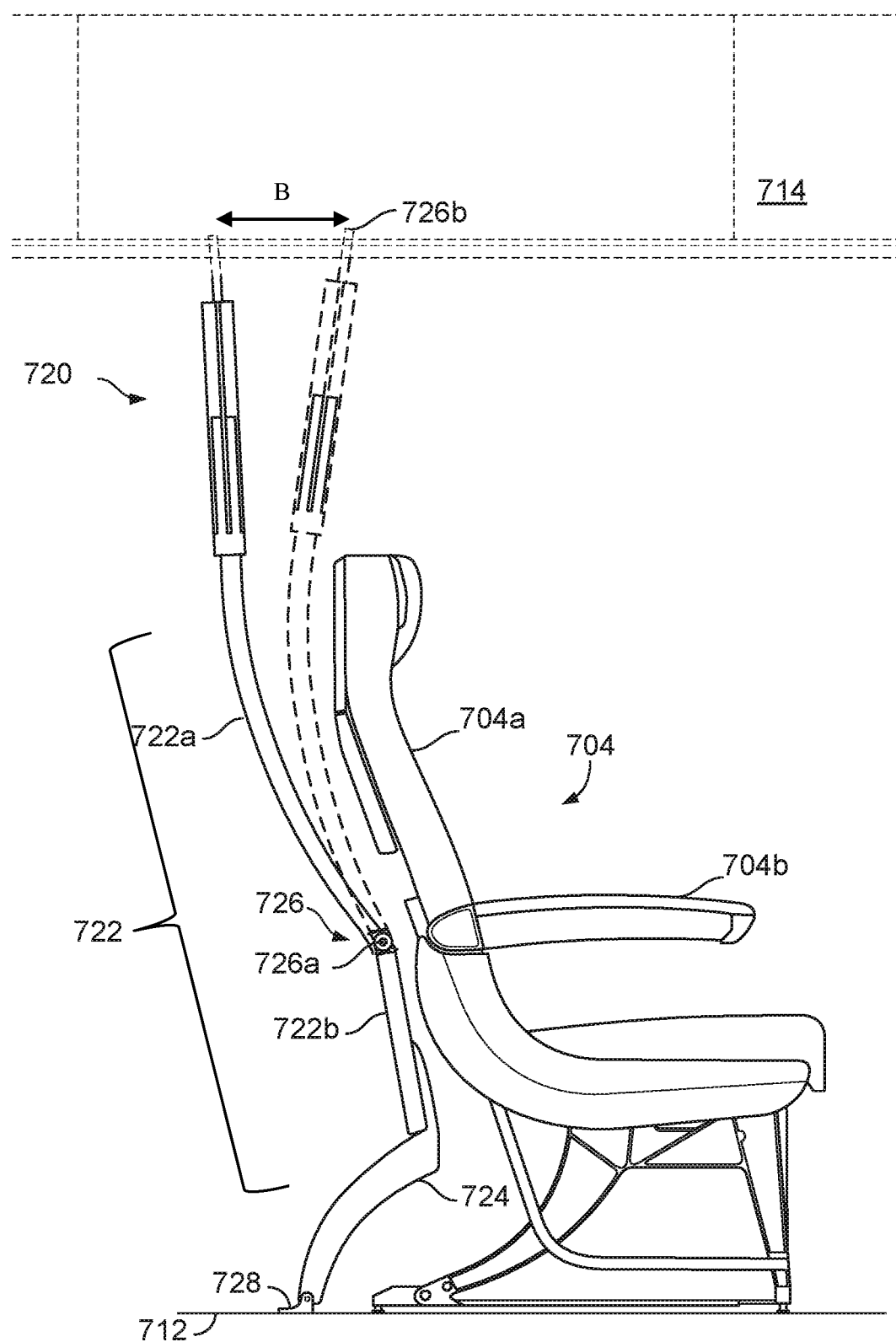

FIG. 7D shows an alternative embodiment in which the pivot point is mid-way up the panel (as opposed to at the floor mount). The articulation system 726, in some implementations, includes at least one pivot mechanism 726a to enable articulation of the contoured class divider 720 from the rearward position (solid lines) to the forward position (dashed lines), and vice-versa, via a rotation of at least the upper panel region 722a of the contoured class divider 720. The at least one pivot mechanism 726a can be placed at a predetermined position on the contoured class divider 720, in one example, to maximize a gain of space generated by the articulation of the contoured class divider 720 from the rearward position (solid lines) to the forward position (dashed lines). As illustrated, for example, the at least one pivot mechanism 726a can be placed at approximately the height of an armrest 704b of the passenger seat 704 (or mid-back region of the passenger therein).

The at least one pivot mechanism 726a for example, may be configured to rotate the upper panel region 722a around a rotation axis substantially parallel to a floor of the aircraft cabin, as illustrated in FIG. 7D, providing a rotation range "B" of the contoured class divider 720. The rotation range "B" may be about 2-20 degrees, about 5-15 degrees, about 7-12 degrees or about 10 degrees.

This configuration provides the advantage that the pivoting or rotating mass is reduced. This may permit the use of a higher strength (and heavier) panel construction or a lighter weight or lower strength connector mechanism. The mid-range positioning of the pivot mechanism 726a, for example, may be configured to lessen a load on the pivot mechanism 726a as opposed to the embodiment illustrated in FIG. 7A where the pivot mechanism 702a is located near the cabin floor. Moreover, this arrangement may more fully optimize usage of the space immediate aft of the seat base in the divider is more closely spaced to the lower portion of the seat even when the divider is in the rearward position. In addition, the rotation of the upper panel section 722a around the axis of rotation provided by the pivot 726a allows the lower panel section 722b to remain fixed, avoiding interference of the articulation of the contoured class divider 720 with items that may be placed below the panel 722 such as carry-on bags. An example recline range may be observed in the difference of position between the contoured class divider 720 in the forward position (dashed lines) and in the rearward position (solid lines).

Figure 7E:
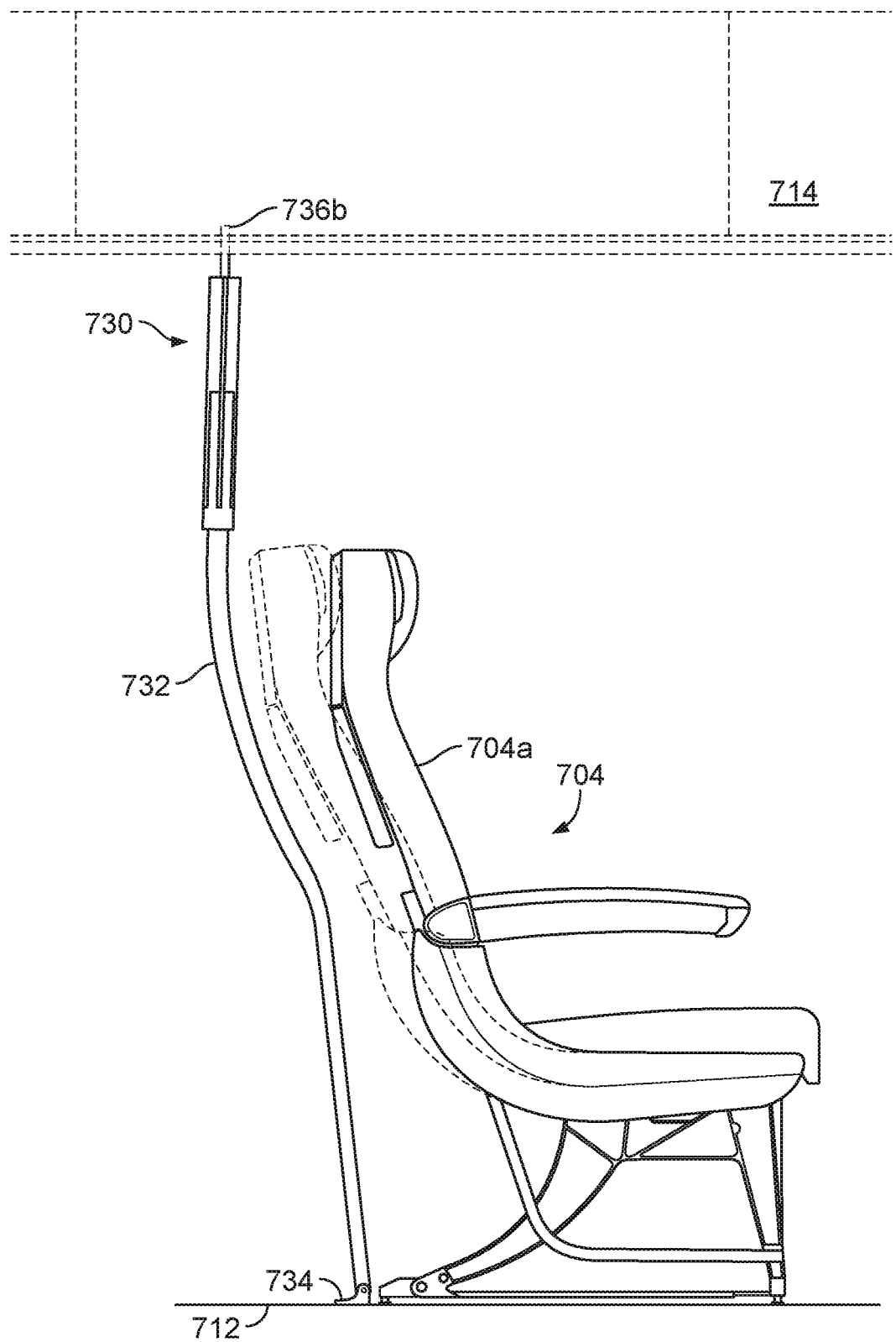

FIG. 7E illustrates a full height divider that prevents the passengers aft of the divider from placing their luggage under the seats 704. The contoured class divider 730, for example, may be similar to the contoured class divider 10 illustrated in FIG. 4A. This embodiment enhances privacy by more completely separating the main cabin from the premium cabin. This embodiment also provides for the storage of crew luggage, aircraft supplies and/or emergency equipment a cabinet or locker positioned in the gap just forward of the panel and behind the rear seat legs. The cabinet or locker (not shown) may be integrally formed with or rigidly attached to the panel. The recline of the seat is shown in dashed lines.

Figure 7F:
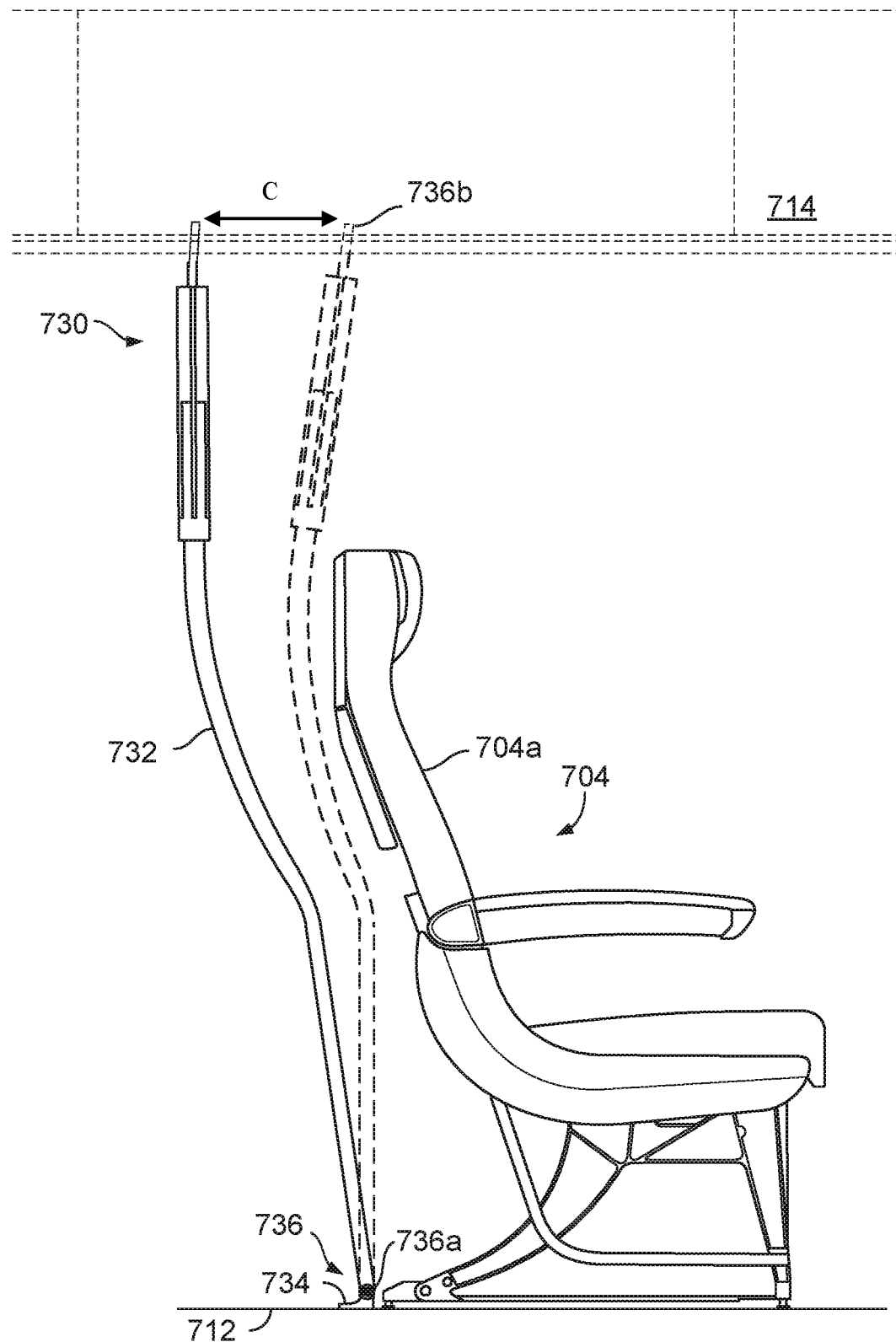

FIG. 7F shows the panel of FIG. 7E articulated between a rearward position and forward position. The seat 704 is shown in the TTOL position. As discussed above, the seat and divider may be placed closer together (within one inch) if the divider and seats are configured to share loads.

Figure 4B:
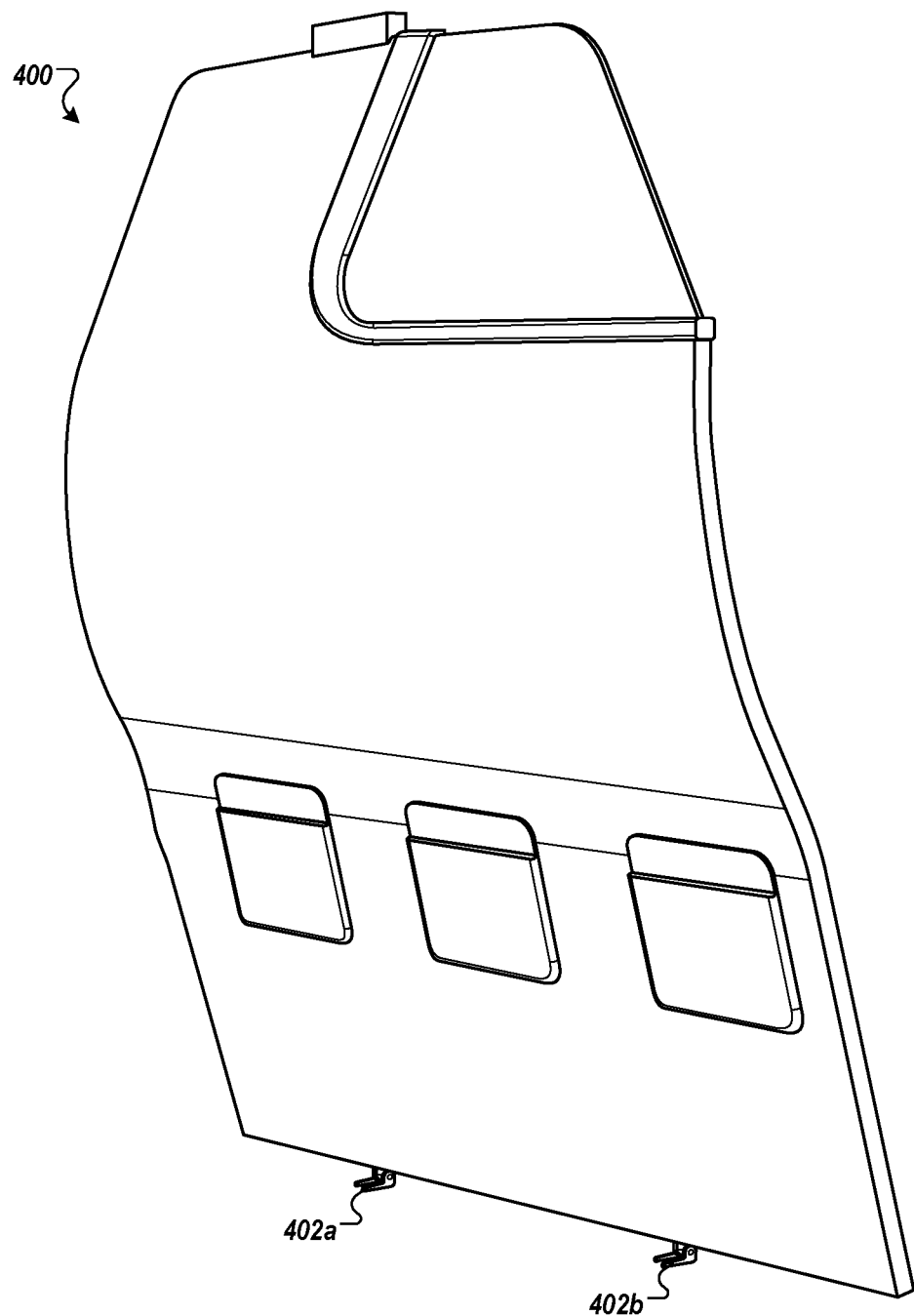
FIG. 4B is a forward perspective view of another example contoured class divider.

All of the functionality and features described above apply equally to the embodiment shown in FIGS. 7E-7F. In some embodiments, a top connector of an articulating contoured divider panel, such as the connector 20 illustrated in FIG. 4, is designed to interoperate with a locking system. The locking system, in some embodiments, is configured to lock the articulating contoured divider panel after articulation of the contoured class divider panel from a forward position to a rearward position or vice versa. In some embodiments, the locking system may be configured to automatically unlock in the event of a rapid deceleration event to allow articulation from a present position to a forward position, moving the panel away from potential impact with aftwardly positioned passenger seats.

Figure 7G:
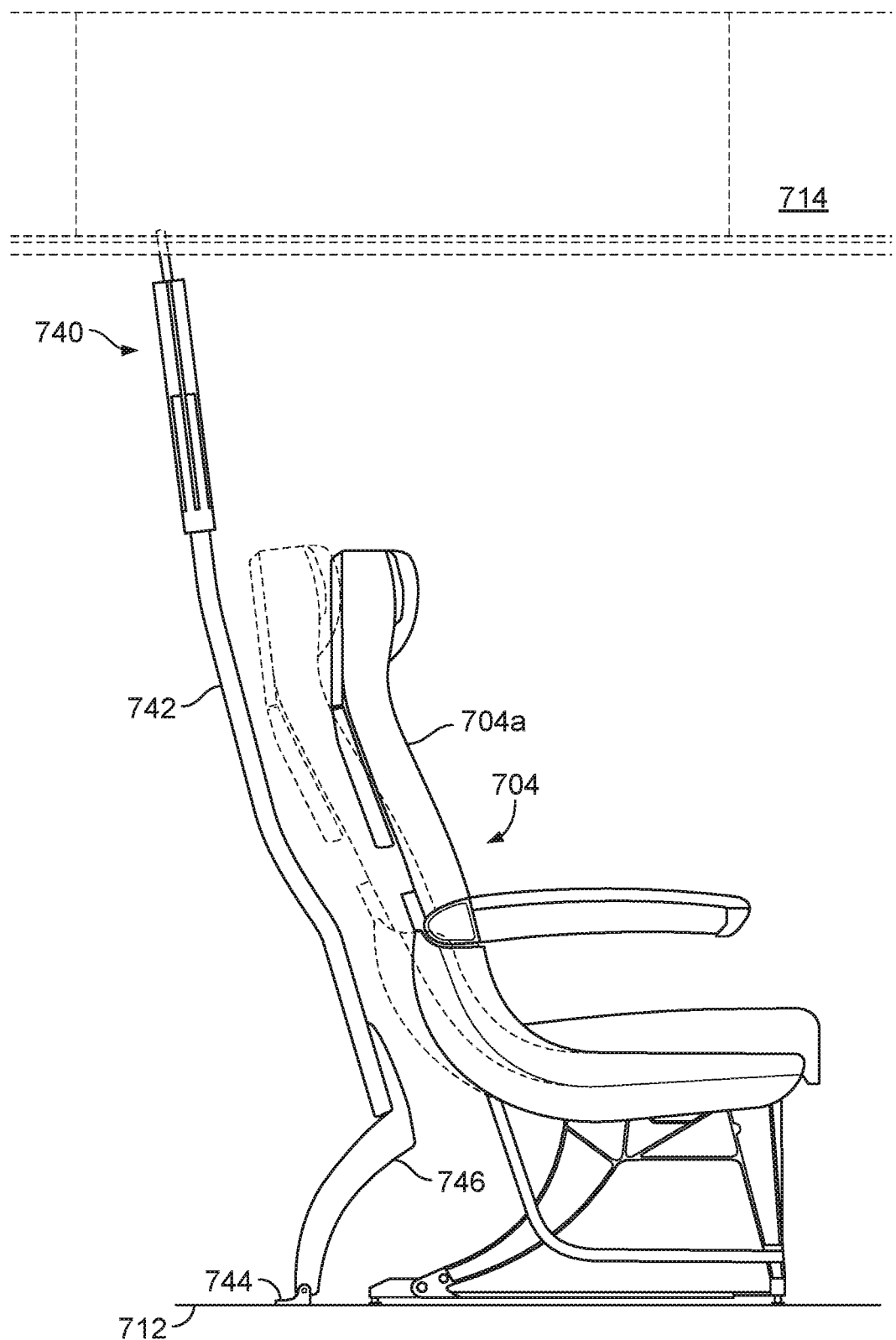
Figure 7H:
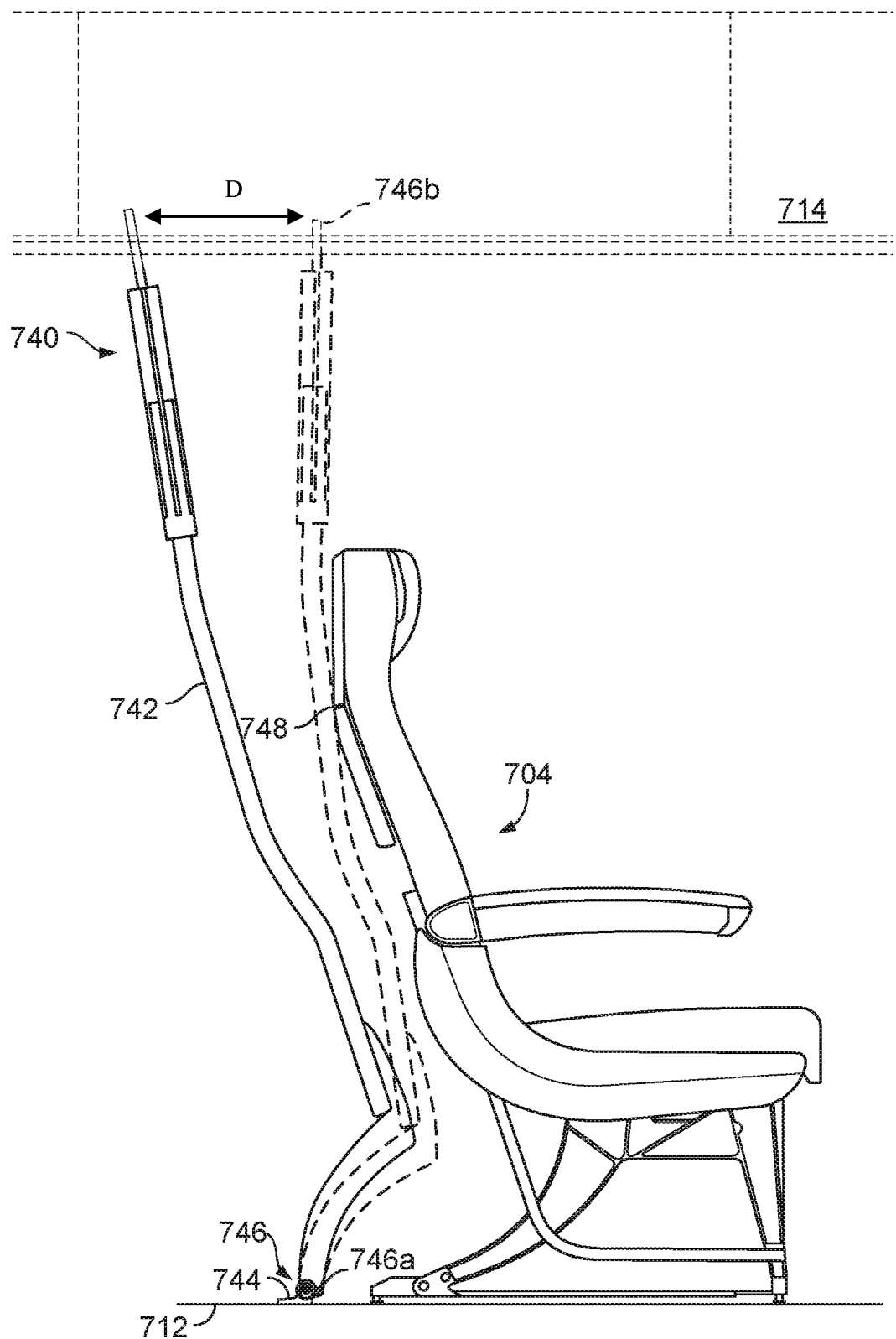
Figure 7I:
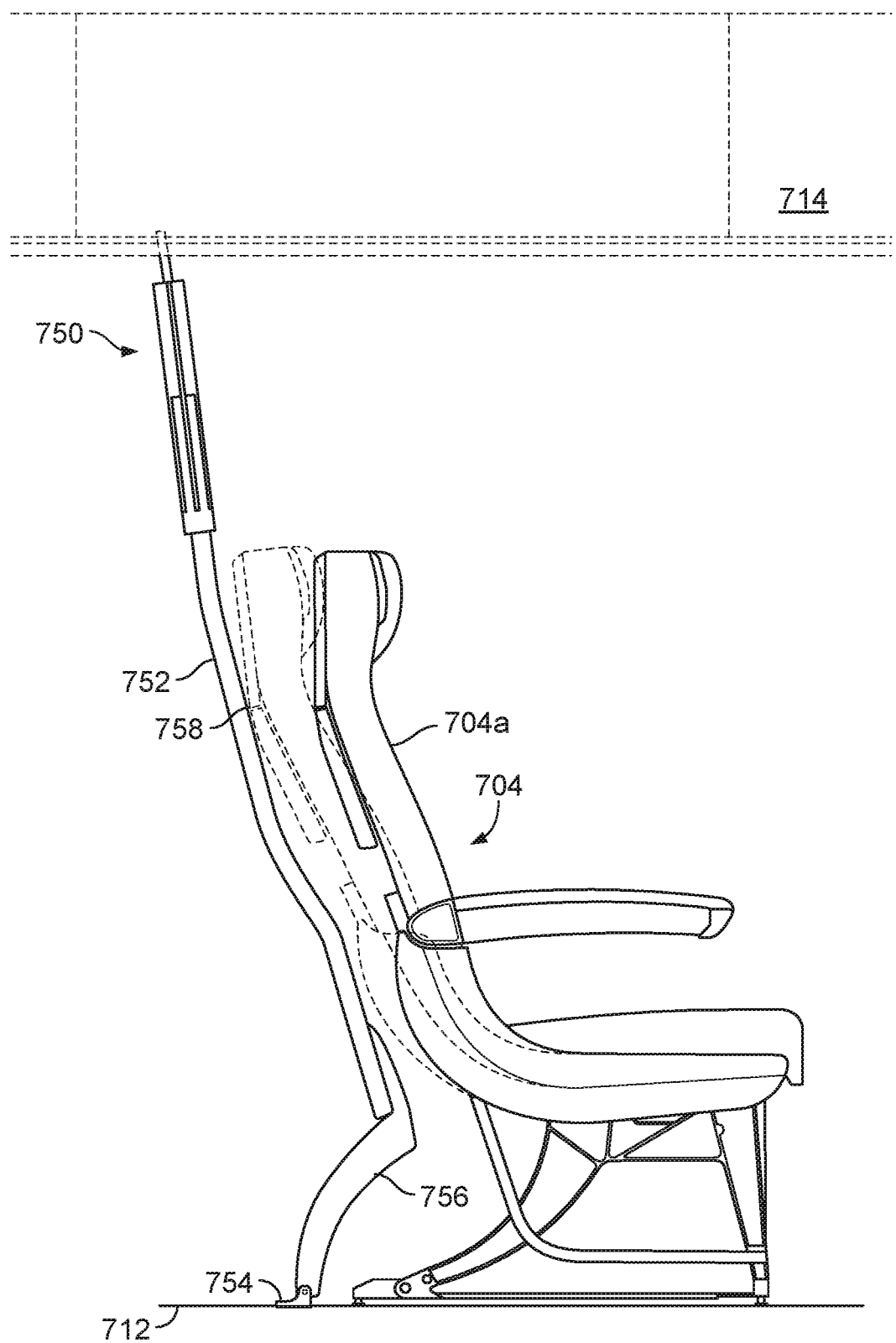

FIGS. 7G, 7H and 7I depict one embodiment which is design to "use" the last inch of clearance which is normally reserved to space apart components such that they do not have to be designed to share loads during normal use and/or emergency landings. The upper portion 752 of the panel has less curvature than the seat such that it will have a known point of impact 748/758 with the seat 704. The known point of impact 748/758, for example, can simplify load sharing simulations in the circumstance of the dynamic load of the panel section 742 meeting the passenger seat 704 in the event of an emergency situation. This may enable the divider to be placed up to an inch closer to the seat 704, thereby providing an extra inch of clearance which may be utilized in the manner described above. All of the functionality and features described above apply equally to the embodiment shown in FIGS. 7G-7I.

FIGS. 8A-8C illustrate a locking system 800, according to certain aspects of the disclosure. The locking system 800, in some embodiments, is designed to automatically move an articulating contoured class divider panel into the forward position from a rearward position when the aircraft cabin experiences a deceleration above an emergency deceleration threshold. The emergency deceleration threshold can correspond, in some examples, to a deceleration generated by a forced landing or turbulences and can be between 5 g and 20 g, and particularly between 7 g and 13 g, and in some embodiments around 9 G.

The locking system 800, in some embodiments, includes a body 810 affixed to an overhead stowage bin (such as bin "B" illustrated in FIG. 1) or other structure above the passenger seats, a channel 812 in the housing 810, and a shear pin 814 inserted in a rounded end 816 of the channel 812 on one side and affixed to the contoured class divider panel on another side (e.g., such as the connector 20 of FIG. 1). The channel 812, as illustrated, includes enlarged ends 816 connected by a narrower channel region 812. The channel 812 can have a curved shape with a minimum width $D_c$ smaller than a diameter of the shear pin 814 such that the pin 814 is prevented from travel along the channel 812. The channel dimensions and friction coefficients are selected configured such that a predetermined force corresponding to the emergency deceleration threshold will move the shear pin 814 from the first end 816a to the second end 816b by causing the material of the housing 810 surrounding the channel 812 to deform. In selected embodiments, the shear pin is a single use item and must be replaced after it is actuated because during actuation the pin and/or body deform or have material sheared off their surface(s). After that occurs, the locking system 800 may no longer activate at the same predetermined force.

In other implementations (not shown) the body permits the pin to move axially from the first end 816a and to the second end 816b via manual actuation by a cabin attendant. For example, to prepare for TTOL, the cabin attendant may retract a spring-loaded pin downwards out of an aperture in the housing, articulate the contoured class divider from a rearward position to an upright position, and shift the pin upwards to lock it within a corresponding aperture of the housing. In other embodiments, a manual latch mechanism may releasably retain the pin in the two desired positions. The manual latch may be actuated by a handle disposed on the underside of the overhead bins. The latch and handle may be connected via a cable.

Returning to the embodiment depicted in FIGS. 8A-8C, when the deceleration generated by the emergency is higher than the emergency deceleration threshold, the deceleration generates a force on the articulating contour class divider panel that overcomes the predetermined force, i.e. the force required to overcome the friction between the channel 812 and the pin 814. The force generated on the panel 12 slides the pin 230 along the channel 812 and articulates the contoured class divider 10 from the inclined position and to the upright position. The force generated by the panel during deceleration is a function of its mass and, to a lesser extent, the angular range of motion through which the pin travels. Depending on the density of the panel, the pivot point may be moved mid-way up the divider to provide the desired predetermined force.

When the deceleration generated by the emergency is lower than the emergency deceleration threshold, the deceleration generates a force on the articulating contoured class divider panel that is too weak to overcome the predetermined force, and the pin 814 cannot slide along the channel 812. The pin 814 stays at proximity of the first end 816a and the contoured class divider panel is maintained in the rearward position.

In other embodiments (not shown), a spring-loaded latch is used to retain the pin in the rearward position until the spring latching force is overcome by the predetermined force, at which time the pin moves forward and its received and retained by another latch. In another variation, the pin is permanently biased in the rearward direction. During deceleration, the pin moves forward and when it reaches the front of the channel it is retained and locked into place with a latch. In still other embodiments, a spring may forwardly bias the pin which is held in the rearward position by a latch. A solenoid may release the pin when an accelerometer detects a predetermined amount of deceleration. At that time the spring moves the pin forward in the channel and another latch receives and retains the pin at the forward end of the channel. In still further embodiments, electro-magnets may be used to hold the pin in place and/or repel a magnetic pin in the desired direction when an accelerometer detects a predetermined amount of deceleration.

In some implementations, an articulating contoured class divider locking system is designed to provide a fixed position panel except in the event of an emergency. The fixed position panel may be configured to withstand a static load meeting or exceeding a dynamic load threshold. Upon exceeding the dynamic load threshold (e.g., indicative of an emergency deceleration condition or other abrupt force), the locking system may release to provide additional clearance for passengers and to avoid passenger injury. In an illustrative example, the locking system may be designed to support static loads of 9 G while remaining in locked position. In the event of a dynamic load of about 16 G pounds or greater, however, the primary locking mechanism of the locking system will release, and the panel will move into a secondary locking position, thus dissipating the inertial load by allowing the panel to shift forward in a controlled manner. For example, in some embodiments, the locking system can automatically articulate the contoured class divider from the inclined position to the forward position when a deceleration generated by an emergency, e.g. a series of turbulences, a forced landing, a sudden braking, or other accident.

A contoured class divider, in some implementations, may vary substantially in weight depending upon a deployment configuration. For example, the contoured class divider may be configured to hold one or more video monitors, pockets filled with reading materials or other passenger convenient items, and/or passenger storage area. In a particular example, a baby bassinette or other child seating configuration may be suspended from the contoured class divider. In these circumstances, it may be desirable to move the pivot point up to the middle of the panel as shown in FIG. 7D. Moreover, a purely mechanical solution for releasing the contoured class divider from its rearward position to an emergency forward position may lack a desired level of precision due to the variability of static weight on the contoured class divider in various applications. In such embodiments one of the electrically triggered mechanisms may be used to actuate the contoured class divider from its in-flight rearward position to the emergency forward position. In one example, a signal from an accelerometer may release a latching mechanism, allowing the contoured class divider to shift forwards under the bias of a spring. The signal, for example, may be received from an accelerometer in the seat, proximate the locking system in the overhead bin, or in the cockpit.

Figure 9A:
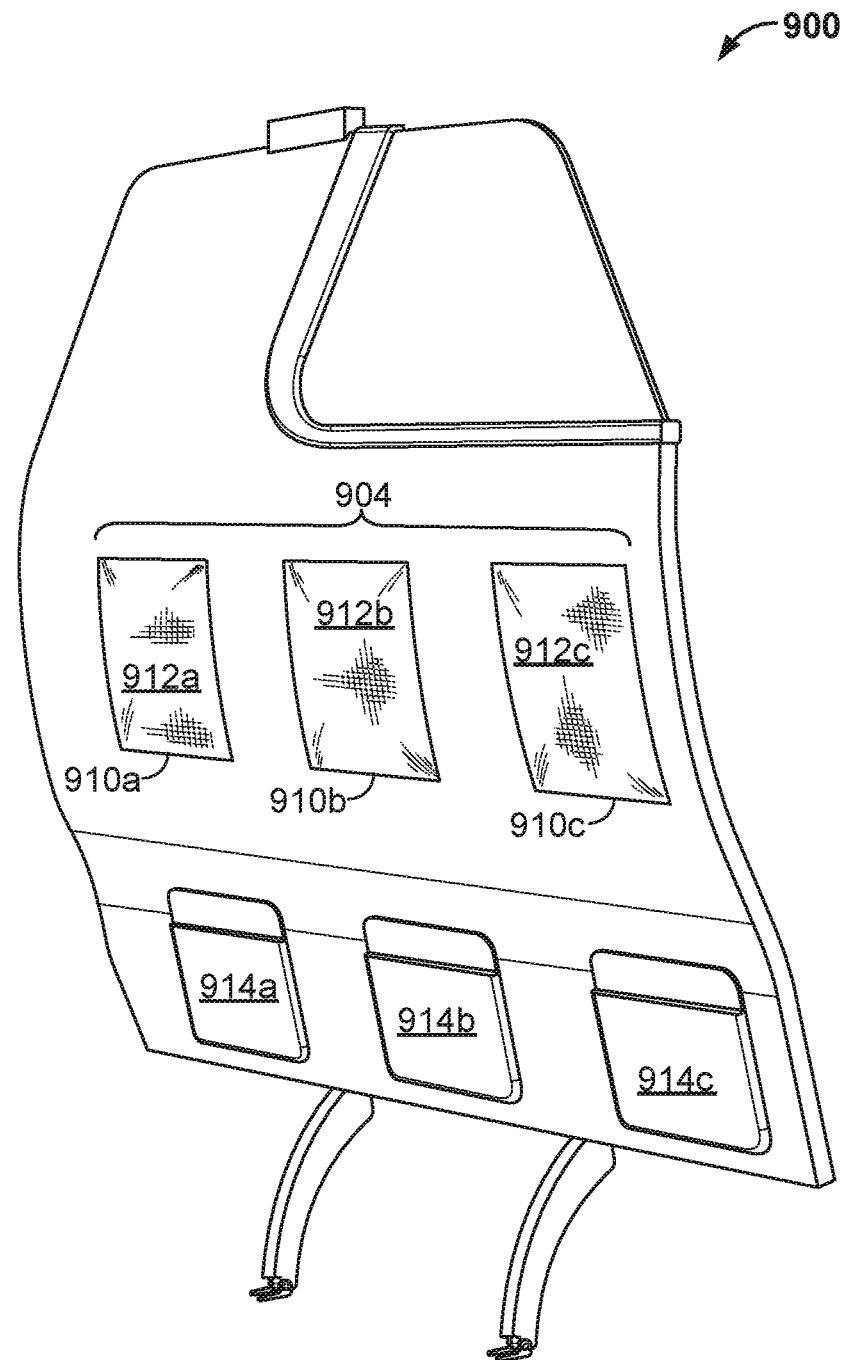
FIGS. 9A-9C are forward perspective views of example contoured class dividers with a head impact zone protection feature.
Figure 9B:
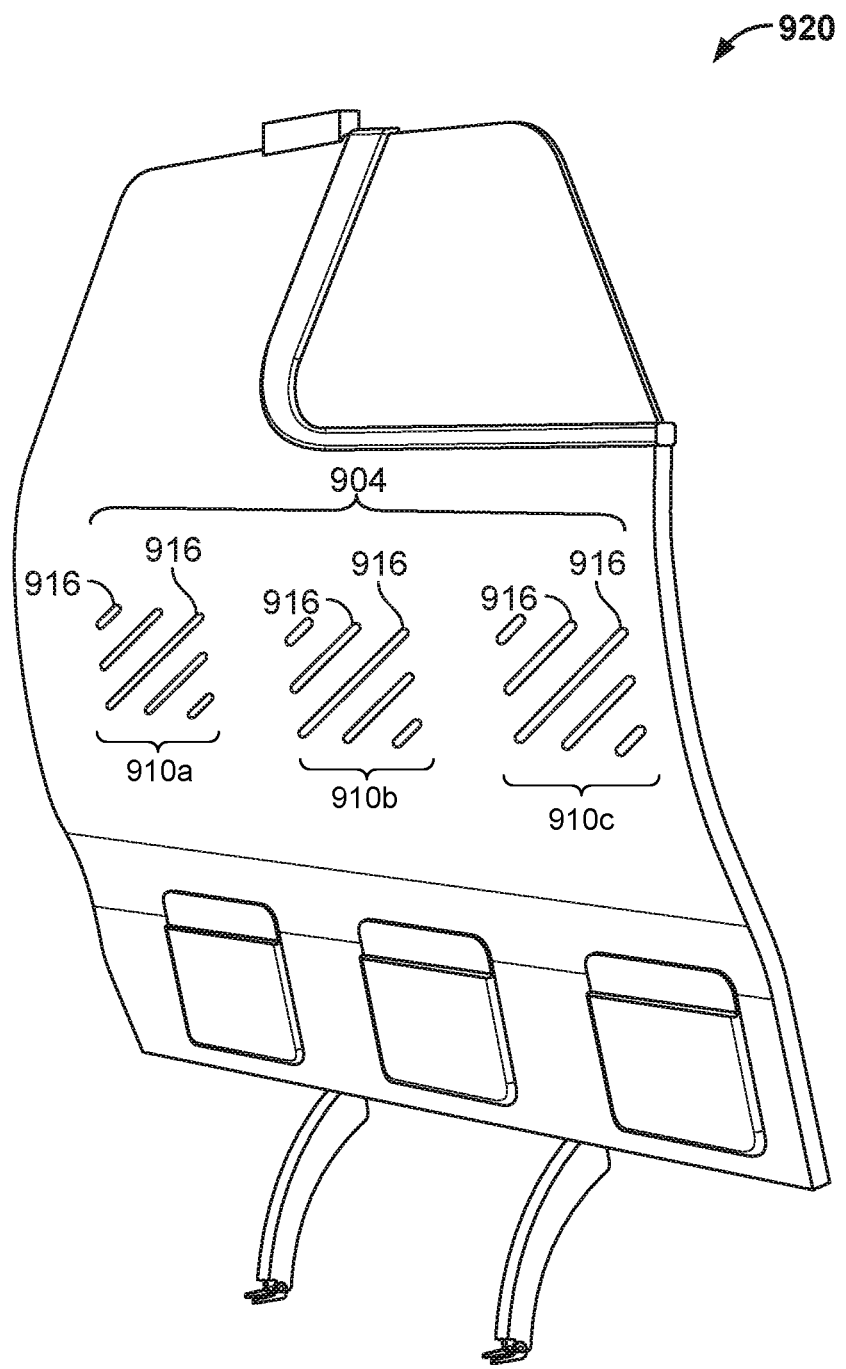
Figure 9C:
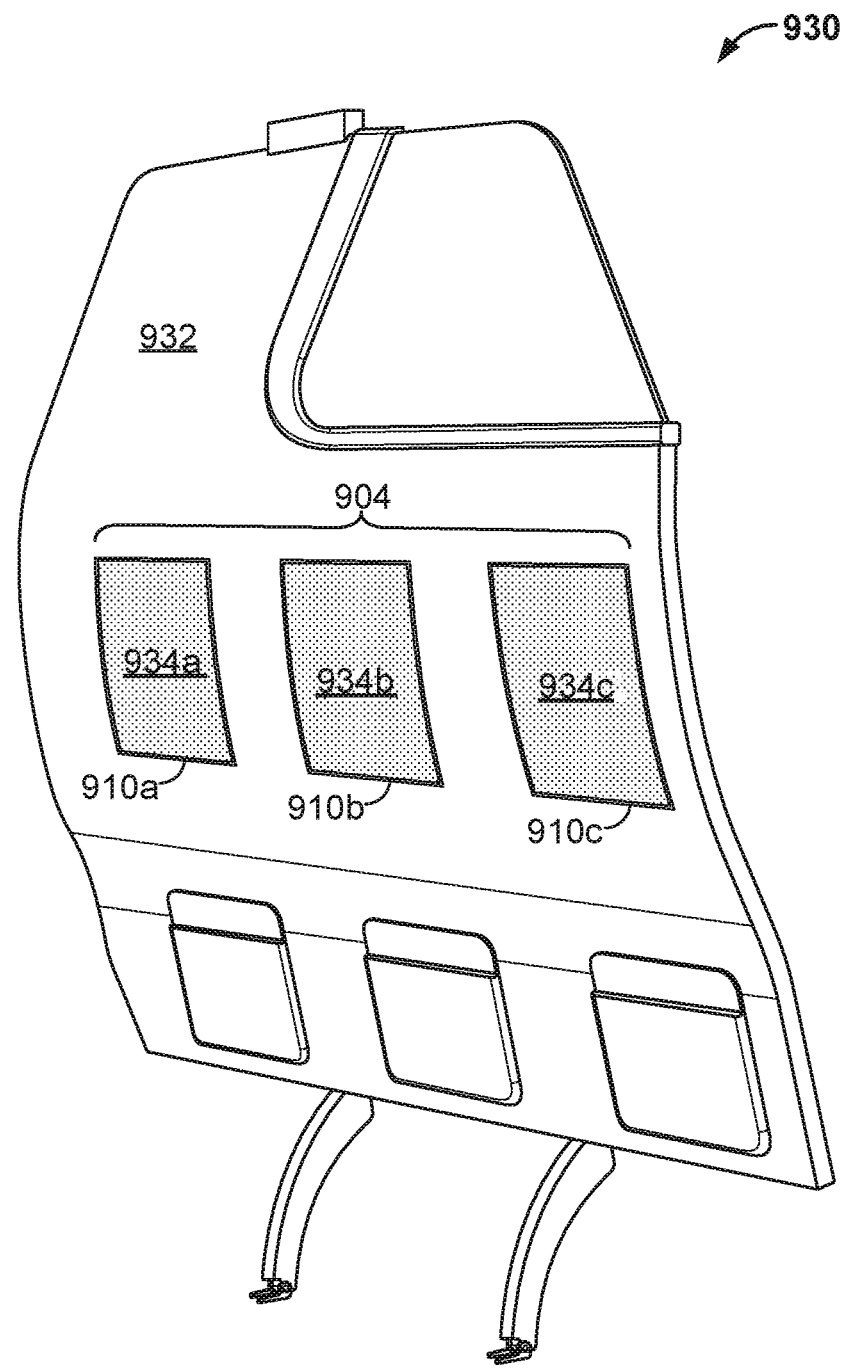

Turning now to FIGS. 9A-9E, a contoured class divider may be designed with weakened structural integrity within a head impact zone to further protect passengers seated to the aft of the contoured class divider in the event of an emergency landing. FIGS. 9A through 9C illustrate forward perspective view of embodiments of contoured class dividers with an enhanced head impact zone 904 for increased passenger safety. Particularly, the head impact zone 904 can be configured to limit a head impact shock between a head of the passenger and the panel of the contoured class divider through use of one or more energy absorbing zones having a predetermined location to face the head when the passenger is in a brace position, e.g. the head on the knees of the passenger.

Turning to FIG. 9A, a series of energy absorbing zone(s) 910 of a contoured class divider 900 can each include a core having slots cut therein and covered by a fabric 912, such as a stretched tissue. The fabric 912, in some examples, can have a similar appearance, texture, and or color as the surrounding surface of the contoured divider panel. In another example, the fabric 912 may be stretched to cover a wider portion of the contoured class divider panel 902 including the energy absorbing zone(s) 910. In a particular example, the fabric 912 may be positioned above a set of pockets 914 and up to the upper region of the panel 902 interfacing with the storage bins or other ceiling structure (not illustrated), as well as across a full width of the contoured divider panel 902. The fabric 912, in some embodiments, can have a predetermined surface tension sufficiently high to have a rigid surface appearance but sufficiently low to deflect when the head impact shock happens. Alternatively, the panel 902 may be composed of layered materials such that one or more interior layers of panel material is removed at the energy absorbing zone(s) 910 and an exterior layer of the panel 902 is intact across the energy absorbing zone(s) 910.

Turning to FIG. 9B, in some embodiments, each energy absorbing zone 910 of a contoured class divider 920 includes perforations or other apertures or cavities in the panel core material to weaken the structural integrity of a contoured divider panel 922 at the energy absorbing zone(s) 910. For example, each energy absorbing zone 910, as illustrated, may include a number of slots 916 machined on the panel 922 to weaken the panel 922. Further, a material such as stretched tissue, as discussed in relation to FIG. 9A, may be positioned, in some implementations, to cover at least the energy absorbing zone(s) 910 to mask the perforations, apertures or cavities in the panel 922.

Turning to FIG. 9C, as illustrated in relation to a contoured class divider 930, in some embodiments, each energy absorbing zone 910 of a contoured class divider 920 includes a cushioning material 934 replacing or partially replacing the panel material of a contoured panel 932. The cushioning material 934, for example, can include a foam material, a mesh material, and/or a flexible material forming a plurality of pockets filled with air and/or gel. Further, a material such as stretched tissue, as discussed in relation to FIG. 9A, may be positioned, in some implementations, to cover at least the energy absorbing zone(s) 910 to mask the cushioning material 934 inserts.

Alternatively, the head impact zone 904, in some implementations, can be configured to avoid contact between the passenger and the contoured panel. For example, the head impact zone 904 can include individual recesses (not illustrated) sufficiently curved forwardly to avoid contact between the head of the passenger and the contoured class divider panel. The embossments, in some implementations, may be covered with a material such as a stretched tissue to mask the embossments.

A skilled artisan will understand that in certain cabin configurations the passengers seated immediately aft of the divider will be positioned sufficiently far away from the divider such that their heads will not impact the divider during an emergency landing. In such configurations, the energy absorbing zones can be omitted or rather included to provide an additional measure of safety.

Figure 9D:
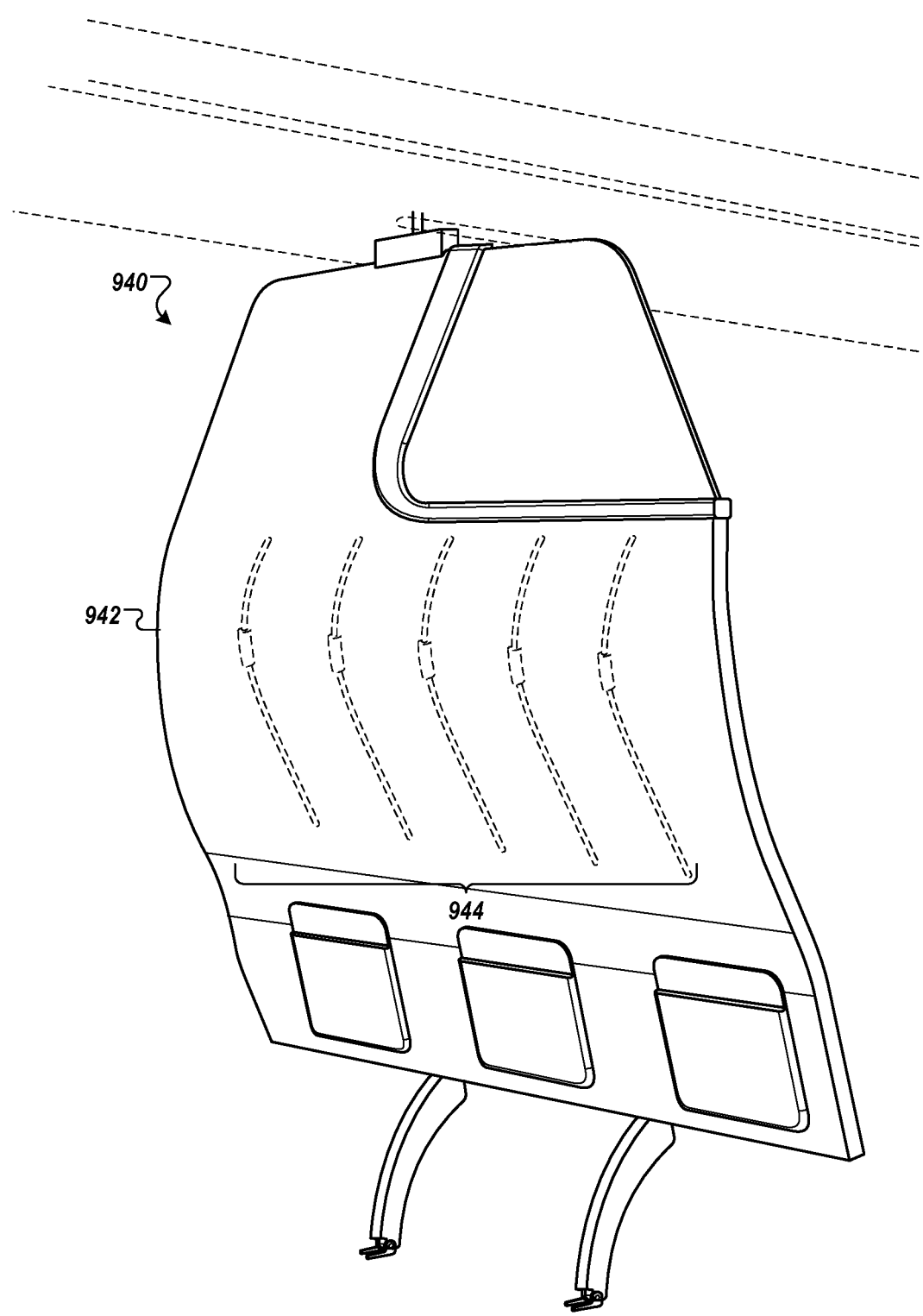
FIGS. 9D-9E are forward perspective views of an example contoured class divider with another head impact zone protection feature.
Figure 9E:
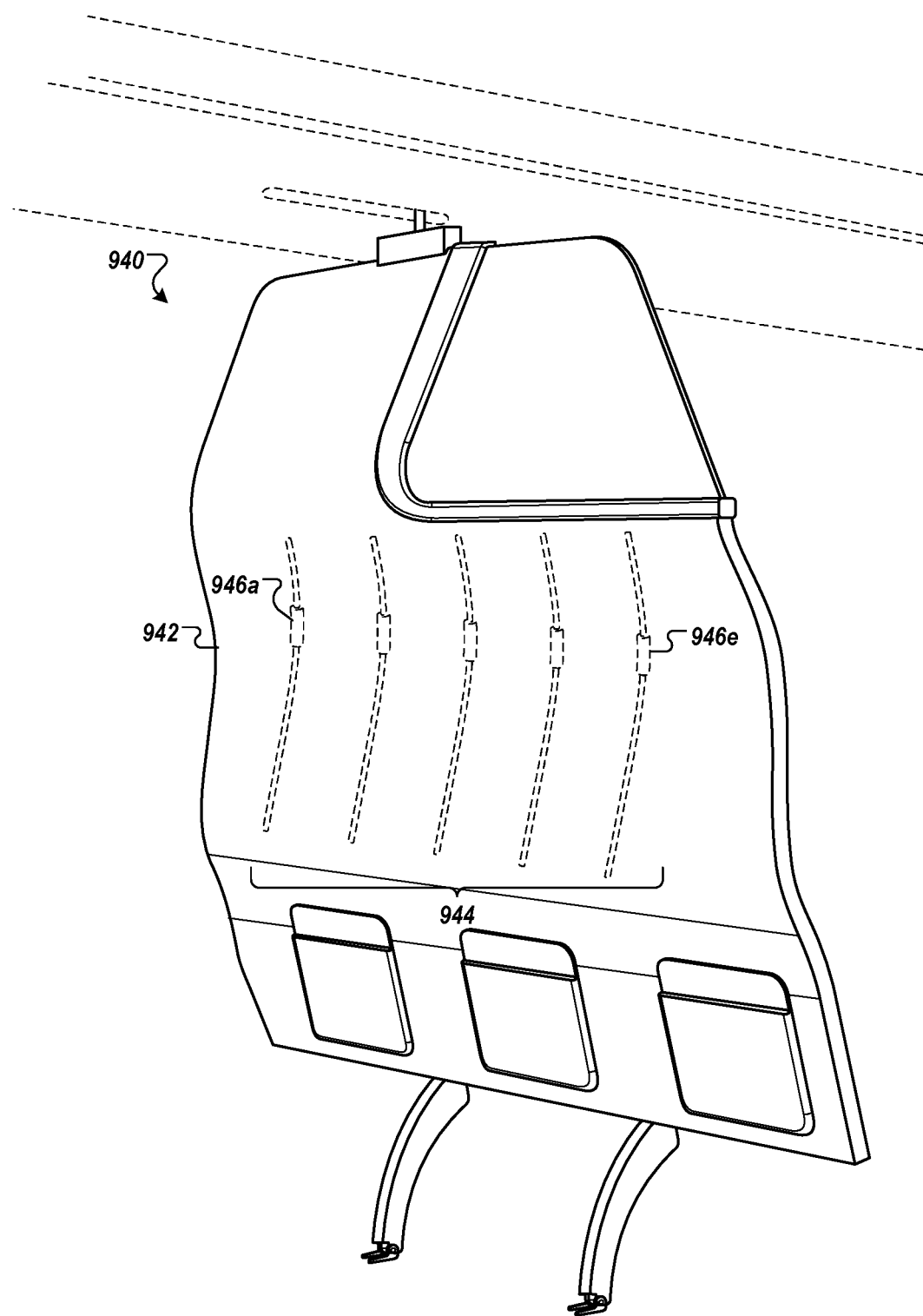

Turning to FIGS. 9D and 9E, in some implementations, a curved panel portion 942 of a contoured class divider 940 includes a series of flexible reversibly jointed ribs 944 maintaining a convex profile of the contoured class divider 940, as illustrated in FIG. 9D. The ribs, in some examples, may be designed using materials having sufficient tensile strength and rigidity to withstand a load imposed by a large adult passenger (e.g., up to 300 pounds). In some examples, the materials may include titanium, aluminum, plastics. etc.

However, upon a sufficient dynamic load impact such as a dynamic load created by passenger head impact with the panel 942, the flexible reversibly-jointed ribs 944 may reverse the convex jointed orientation. For example, as illustrated in FIG. 9E, the ribs 944 may reverse their joint orientation, causing the panel 942 to warp to a concave orientation. In some embodiments, the panel 942 may be designed using sufficiently flexible material to allow for warping of the panel 942.

This embodiment provides the advantage that the divider may be moved entirely out of the range of the passengers' heads. Alternatively, this approach may be used in combination with an energy absorbing zone to minimize the extent and force of the impact with the passengers' heads. To further protect the passengers seated behind the contoured class divider 940, in some embodiments, the flexible reversibly jointed ribs 944 may be designed to lock into and maintain the concave position upon impact. For example, by preventing return to the convex orientation, the passenger's heads may be spared a bounce-back impact by the ribs 944.

In some implementations, rather than depending upon a dynamic load impact to reverse the orientation of the reversibly jointed ribs 944, the ribs may include a dynamic load trigger. In one example, a load sensor built into the locking mechanism at the top of the contoured divider panel may both release the contoured divider panel from its rearward position and trigger reversal of the reversibly-jointed ribs 944. In a particular example, a hinge 946 of each rib 944 may surround an inflatable material such as an inflatable tube. By forcing air into the inflatable tubes, for example, the hinge mechanism holding the ribs in the present orientation may be broken, causing the ribs to reverse orientation and thereby assume the concave orientation.

Figure 10A:
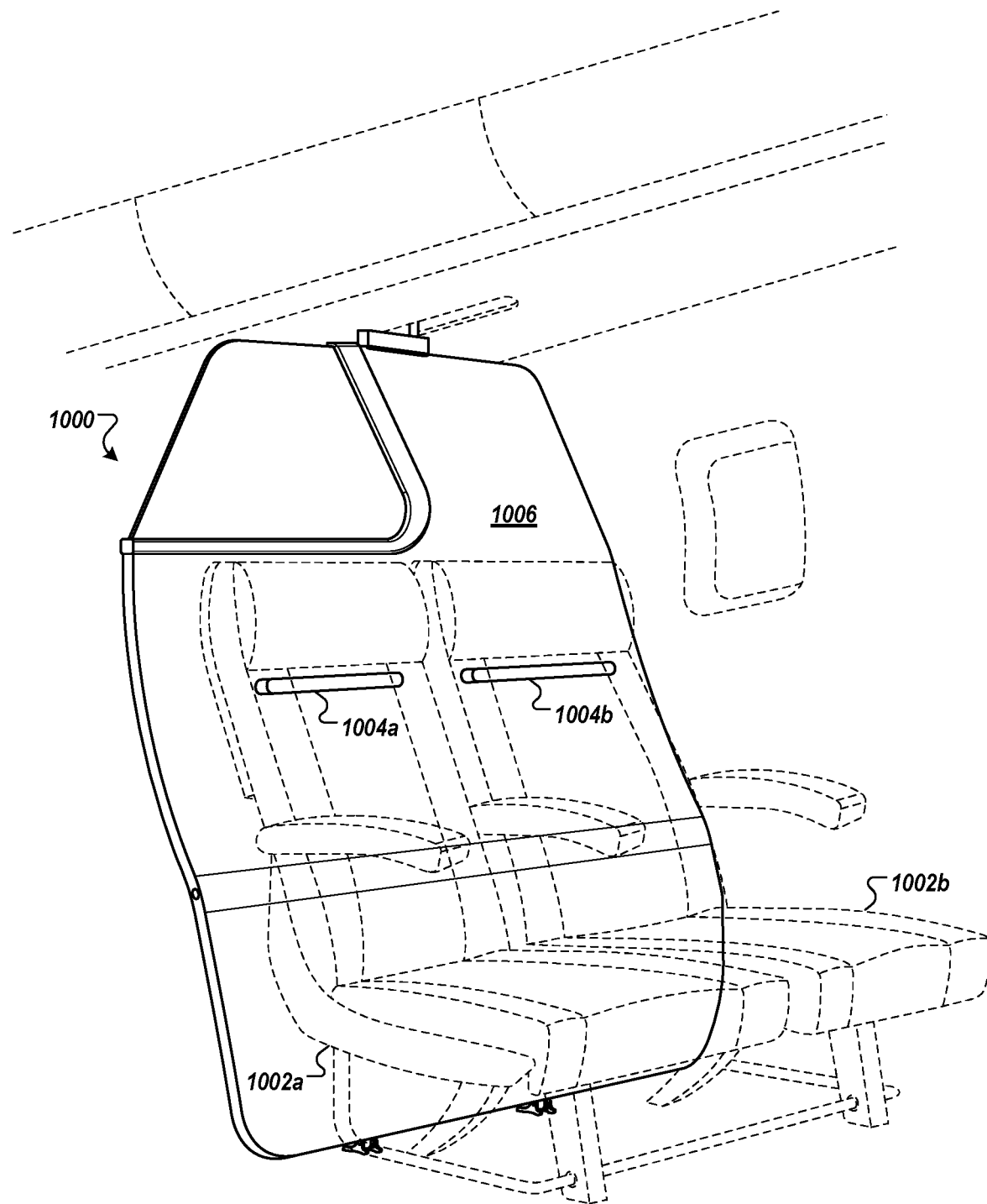
FIGS. 10A-10C illustrate example impact protrusion configurations for establishing an impact zone between a contoured class divider and forward-positioned seats.
Figure 10B:
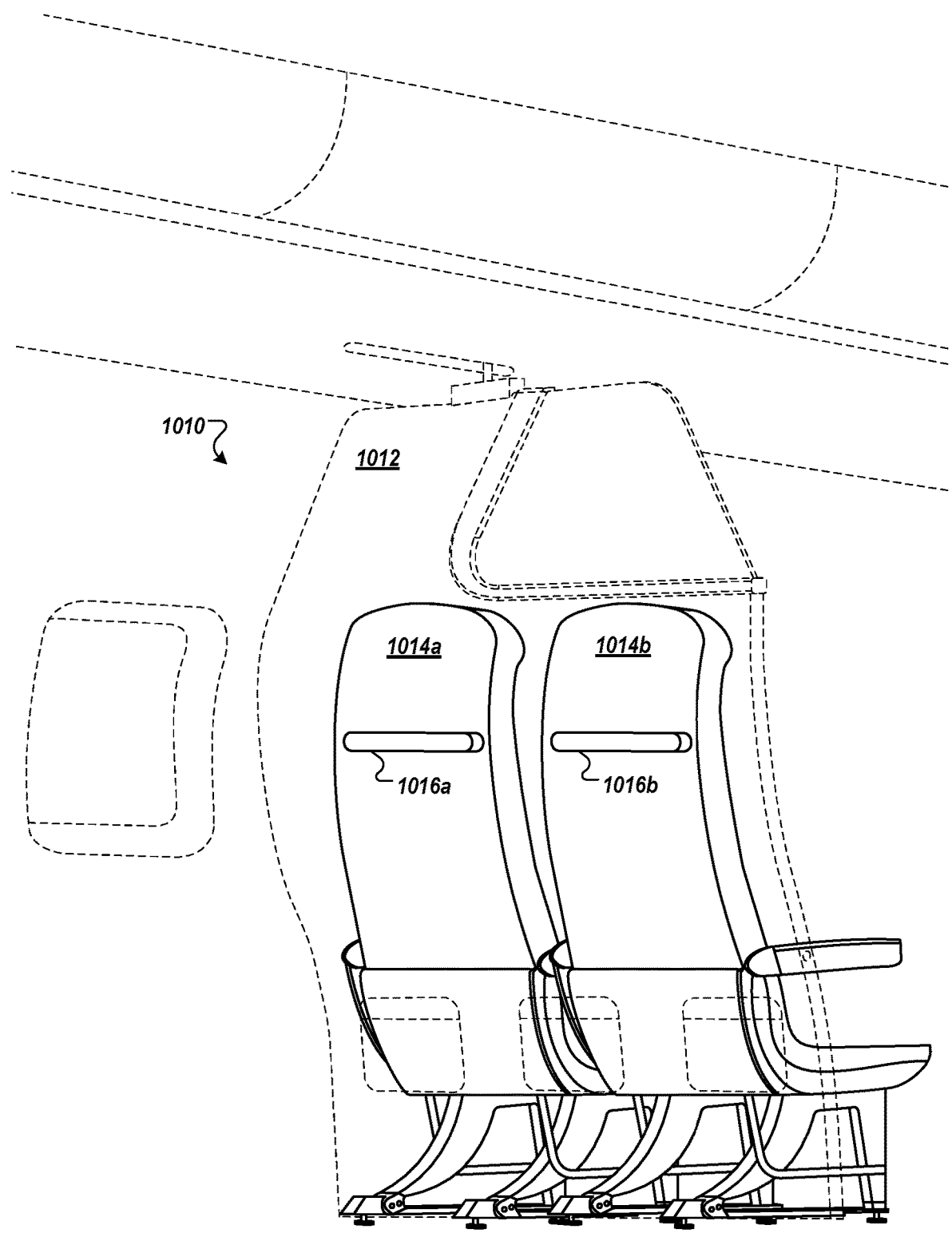
Figure 10C:
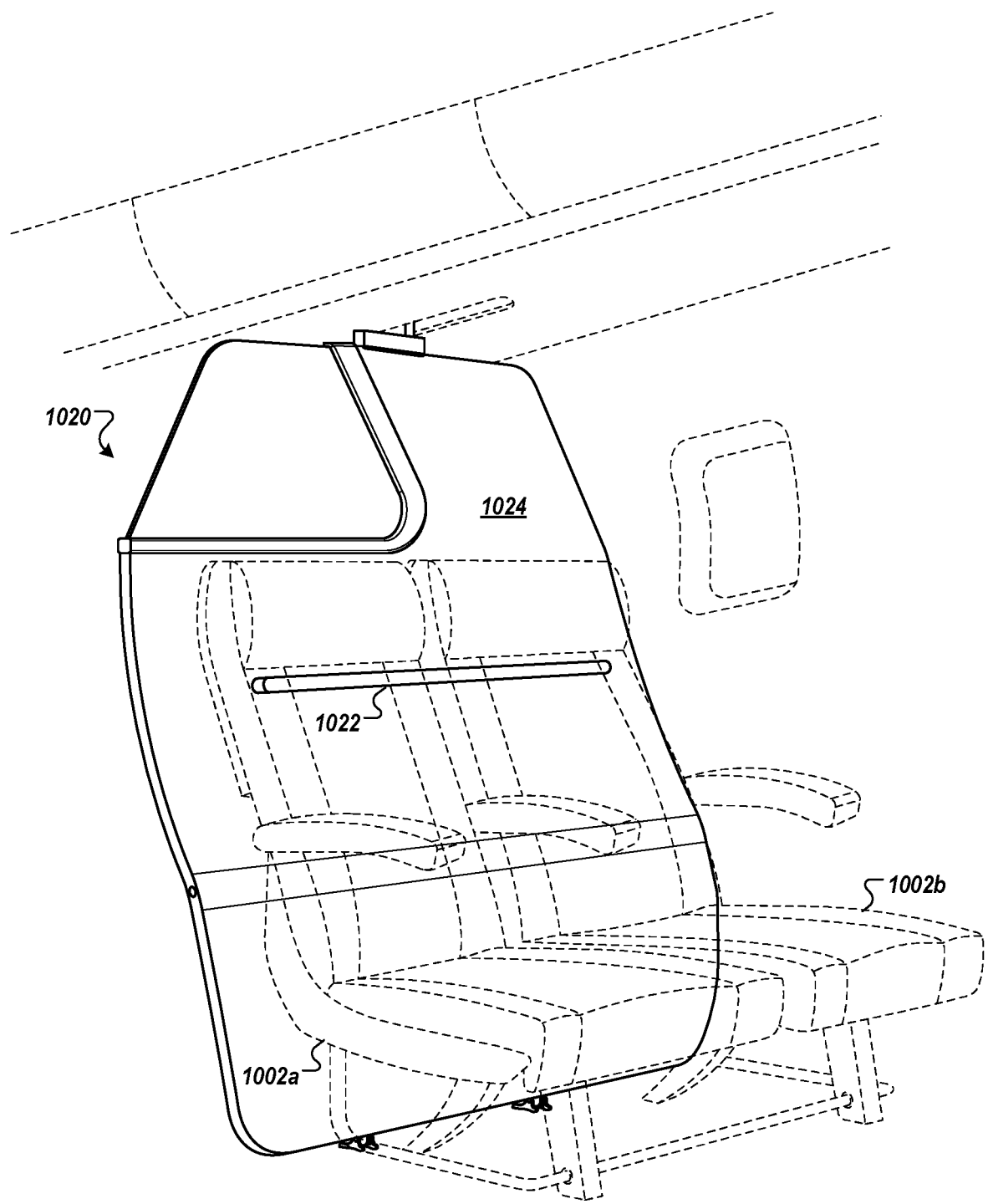

FIGS. 10A-10C illustrate alternative embodiments having known points of impact between the divider and the seats which permits determination of load sharing and thereby permits "use" of the last inch of clearance between the divider and the seats. In some embodiments, a contoured class divider panel includes one or more impact protrusions positioned on a fore surface of contoured class divider panel facing the seatbacks of the aft passenger seats such that at least one protrusion corresponds to each passenger seat back, providing known impact points between the contoured class divider panel and the seat backs when the contoured class divider panel contacts the passenger seats due to a strong deceleration, e.g. above 10 g. The impact protrusions, for example, may be used to provide predictable impact characteristics by identifying known localized impact points between the fore passenger seats and the contoured class divider. Thus, the impact protrusions may simplify impact predictions in meeting regulation requirements for design of the contoured class divider. This may be especially important in a contoured class divider panel which remains nested closely to, if not abutting, the fore passenger seat backs. For example, by providing the impact protrusions for load-sharing modeling purposes, a seating arrangement including a contoured class divider may be designed with a gap between the contoured class divider and the fore passenger seat(s) of less than about one inch, or even less than one inch.

FIGS. 10A and 10C are aft perspective views of contoured class dividers 1000, 1020 incorporating impact protrusions at approximately a shoulder height of a passenger (e.g., below a headrest of the passenger seats 1002). Turning to FIG. 10A, the contoured class divider 1000 includes a set of impact protrusions 1004a, 1004b, each impact protrusion positioned behind a respective passenger seat 1002a, 1002b.

In this manner, a weight of material used to provide the impact protrusions 1004 may be limited, and no impact protrusion will be visible through a gap that may be between the passenger seats 1002a, 1002b. Turning to FIG. 10C, the contoured class divider 1020 includes a single impact protrusion 1022 positioned behind the passenger seats 1002. In this manner, the installation may be simplified and a variety of seating styles may be used without concern for proper centering behind each passenger seat 1002. Although illustrated as a curved "speed bump" of material, in other implementations, the impact protrusions 1004, 1022 may be designed as having a triangular cross section or rectangular cross section. In some implementations, the impact protrusions 1004, 1022 are manufactured as part of the panel 1006, 1024 of the contoured class divider 1000, 1020. In other implementations, the impact protrusions 1004, 1022 are affixed to the panels 1006, 1024. For example, the impact protrusions 1004, 1022 can be made of materials having a strength sufficiently high to withstand the impact shock between the contoured class divider 1000, 1020 and the passenger seats 1002, such as metallic alloys or high-density plastics. In other embodiments, the impact protrusions are formed of energy absorbing material such as rubber to reduce the peak load transferred between the divider and the seats.

Alternatively, as illustrated in FIG. 10B, in some embodiments, passenger seats 1014 installed in front of a contoured class divider 1010 may include one or more impact protrusions 1016 disposed to create a known contact surface with a panel 1012 of the contoured class divider 1010. In this manner, the impact protrusions 1016 may be precisely positioned upon each seat back.

In some embodiments, a number, depth, surface area, shape, material composition, and/or positioning of each impact protrusion 1004, 1016, 1022 may be selected to simplify impact simulations and/or to limit damage caused by the impact between the contoured class divider 1000, 1010, 1020 and the passenger seats 1002, 1014. For example, by disposing the impact protrusion(s) 1004, 1022 upon the contoured class divider 1000, 1020 (or, alternatively, protrusions 1016 on the passenger seats 1014), a known point of impact is created between the passenger seats 1002 (1014) and the contoured class divider 1000, 1020, (1010) thus simplifying calculations for load sharing in emergency circumstances.

In some implementations, each impact protrusion 1002, 1022 is disposed in a panel reinforced area of the fore surface of the contoured class divider panel 1006, 1024 configured to withstand the impact shock between the contoured class divider 1000, 1020 and the passenger seats 1002. The panel reinforced area can be made of a material having a strength higher than a material composing the panel 1000, 1020, e.g. high-density polyethylene, Delrin, steel alloy, acrylic, a thickness greater than a thickness of the panel 12, and/or a density greater than a density of the panel 12. Similarly, each impact protrusion 1016 may be disposed in a passenger seat reinforced area of the aft surface of the passenger seats 1014 of FIG. 10B.

Each impact protrusion 1002, 1016, 1022, in some implementations, is coated with an energy absorbing layer to provide a damping between the contoured class divider panel 1006, 1024, 1012, and the passenger seats 1002, 1014. For example, the energy absorbing layer may limit scratching and other damage to the contoured class divider panel 1006, 1024, 1012 and/or the passenger seats 1002, 1014. The energy absorbing layer may be made from elastic materials such as elastomer alloys, rubber alloys, or the like.

One advantage of deploying the protrusions on the divider is that the seats need not be customized. The seats positioned directly in front of the divider may have the same configuration and construction as the remainder or majority of the seats in that cabin.

Figure 11:
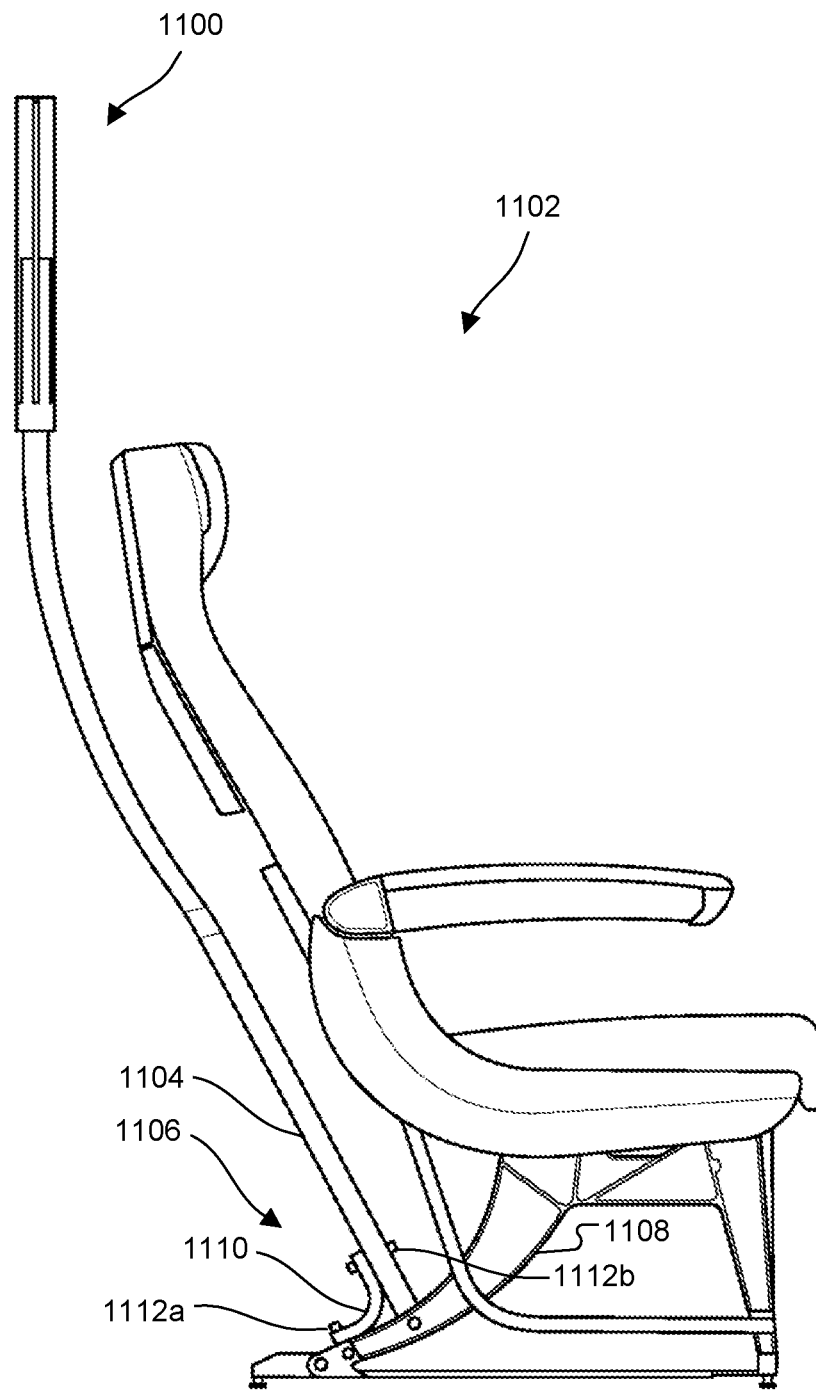
FIG. 11 is a side view of an example contoured class divider designed for affixing to at least one forward-positioned passenger seat.

FIG. 11 is a side view of a contoured class divider 1100 affixed to at least one passenger seat 1102 according to certain aspects of the disclosure. The contoured class divider 1100 can be directly affixed to the seat(s) 1102, for example, without affixing to a structure of the floor of the cabin, such as an in-floor track. For example, the contoured class divider 10 can at least one divider leg 1104 affixed to an aft part of a leg 1108 of the passenger seat 1102 via a fixation system 1106. The fixation system 1106 can include a bracket 1110 affixed to one end to the divider leg 1104 and to the other end to the leg 1108 of the passenger seat 1102. Such an arrangement may require the divider to pass the 16 G dynamic test because it is mounted to a passenger restraint system (the seat). However, this arrangement provides additional ingress/egress foot clearance for the passengers seated immediately aft of the divider and may optimize usage of the space immediately aft of the rear seat leg. Moreover, the use of the connecting system to secure the top of the divider to the overhead bin may provide sufficient support such that the panel does not impart unacceptable additional load on the seat during an emergency landing.

Figure 13:
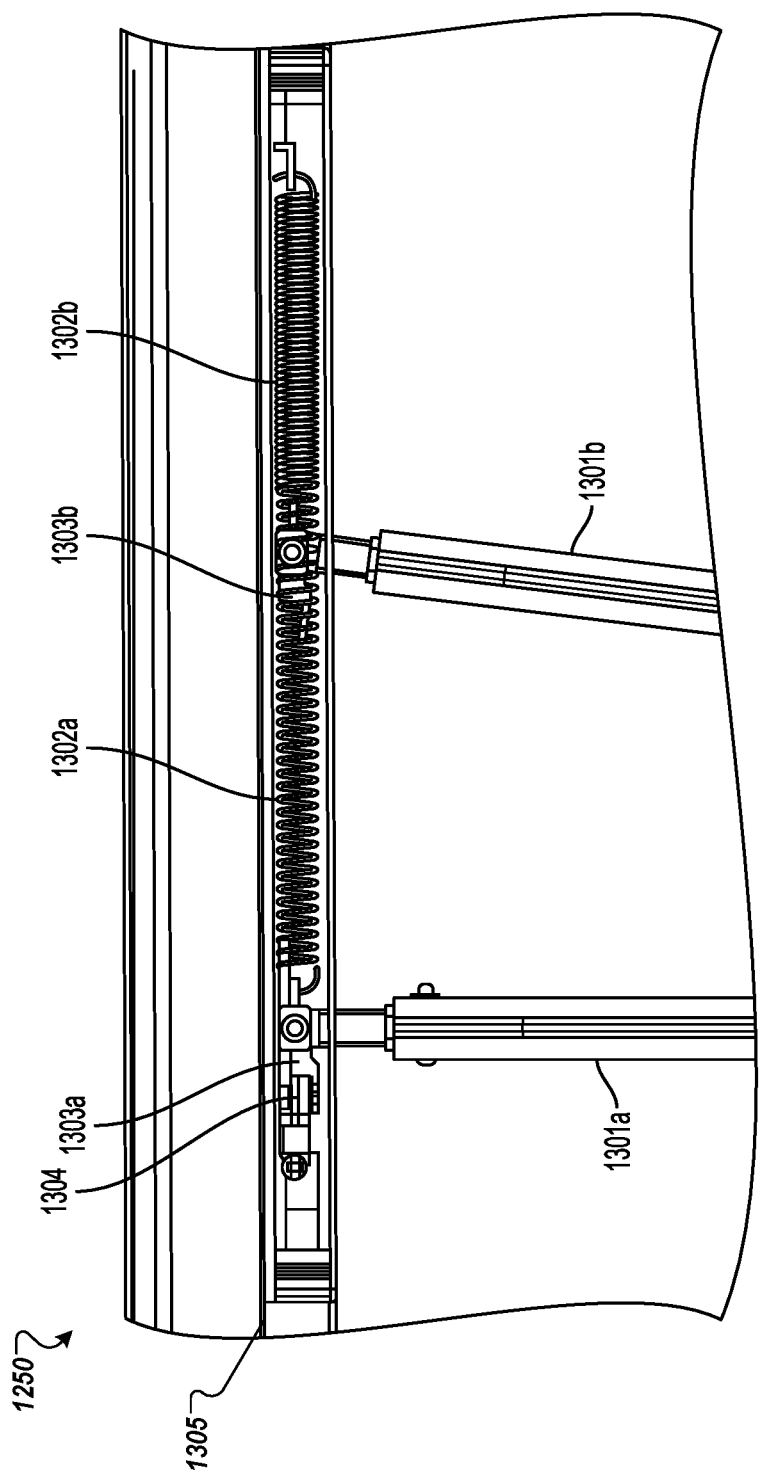
FIG. 13 illustrates a zoomed-in view of the spring mechanism shown in FIGS. 12A-12B.

Turning to FIGS. 12A-12B and 13, a further embodiment of a contoured class divider 1200 before and after a crash event or other emergency event are illustrated. FIG. 12A illustrates the contoured class divider 1200 in a rearward position prior to the crash event, FIG. 12B illustrates the countered class divider 1200 in a forward position after the crash event, and FIG. 13 illustrates a zoomed in spring mechanism for the contoured class divider 1200. In some implementations, the divider 1200 may include a panel 1253 coupled to a floor mount 1206 with feet 1244 at connection surface 1208. Prior to a crash event, as shown in FIG. 12A, the partition, wall or panel 1253 may be in rearward position 1253a, which corresponds to position 1301a in FIG. 13. After a crash event, as shown in FIG. 12B, the panel 1253 may be in forward position 1253b, which corresponds to position 1301b in FIG. 13. Seatback 1251 of passenger seat 1205, which may include headrest portion 1202, is depicted in an upright TTOL position in both FIGS. 12A and 12B.

In some implementations, the divider 1200 may be hingedly attached at a lower end to the cabin floor 1212 at pivot 1252 and at an upper end to spring mechanism 1250, which may be mounted to a ceiling or on an underside of an upper monument of an aircraft cabin, such as an underside of an overhead bin. In some examples, the spring mechanism 1250 may include a spring 1302 positioned within a channel or rail 1305 that is held in an extended position 1302a within the channel 1305 until a crash event occurs, at which point the spring recoils to a collapsed or retracted position 1302b. In some implementations, the spring mechanism 1250 may include a pyrotechnic pin puller 1304 that may be coupled to a flange or coupling member 1303 which holds the panel 1301 in the normal operating position 1301a prior to an occurrence of a crash event. In addition, the pyrotechnic pin puller also holds the spring in an extended position within the channel during normal operating conditions. Upon detection of a crash condition, an inertial switch (not shown) triggers the pyrotechnic pin puller 1304, at which time flange 1303 is released from a retaining member at position 1303a of the pyrotechnic pin puller 1304, causing the spring 1302 to recoil to position 1302b. When the flange 1303 is released and moves to position 1303b, the panel 1253/1301 moves to the forward position 1253*b*/1301*b* under the force of the spring 1302 as well as the inertia of the panel 1253. In some implementations, the tension provided by the spring mechanism 1250 maintains the panel in position 1253*b* after the crash event.

In some embodiments, the weight of the panel 1253 may be sufficient such that a spring force from the spring mechanism 1250 may not needed. In fact, in some embodiments, the panel 1253 may be heavy enough to require the use of a compression spring (rather than the depicted tension spring 1302) to impede or slow a speed of travel of the panel 1253 to position 1301*b*. In such an alternative, a latch mechanism (not shown) may be used to retain the panel in position 1301*b*. Without the use of such a latch, the panel 1253 may return to position 1301*a* after the crash event.

FIGS. 14A-14C depict an alternative implementation to the spring mechanism 1250 shown in FIGS. 12-13 for causing movement of a contoured class divider during an emergency event including a panel 1404 (similar to the panel 1253 of the contoured class divider 1200) from a rear position to a forward position during a crash event, emergency landing, or other emergency situation. As shown in FIG. 14A, a channel 1401 may be disposed above the panel 1404 and may be mounted to an underside of overhead bins or an aircraft cabin ceiling in a manner similar to that of the spring mechanism 1250 shown in FIGS. 12A-12B. In some implementations, a pyrotechnic pin puller 1402 may be mounted on one side of the channel 1401 that is connected to a pin 1403 that securely holds panel 1404 in place via a flange (not shown) during normal operations prior to a crash event. In some examples, inertial switch 1405 shown in FIG. 14B may be connected to the pyrotechnic pin puller 1402 and may be used to actuate the puller 1402. For example, upon detection of a crash or other type of emergency event, the inertial switch 1405 may trigger the pyrotechnic pin puller 1402 to pull the pin from its normal operating position, thereby allowing the panel 1404 to move from a rearward position to a forward position. As shown in FIG. 14C, a torsion spring and bar assembly 1406 may be coupled to the floor mounts 1407 for the contoured class divider 1200 that are mounted to the panel 1404. The assembly 1406 may apply torque in either the forward or rearward direction depending on whether it is desired to promote or inhibit the forward movement of the panel 1404 during a crash event.

FIG. 15 shows another embodiment of a mechanism 1500 for causing movement of a contoured class divider during an emergency event in which a pneumatic actuator 1501 is used to control the travel of the panel 1504 from a rearward position 1504*a* during normal operations to a forward position 1504*b* after an occurrence of a crash event. As with the embodiments described immediately above with respect to FIGS. 12A-14B, channel or rail 1503 may be slidably engaged with a coupling 1505 that connects the panel 1504 to the pneumatic actuator 1501. In some implementations, the pneumatic actuator 1501 assists in propelling or urging the panel 1504 in a forward direction during a crash event by causing a shear pin (not shown) to break and release the coupling 1505 in the rearward position 1505*b* from the pneumatic actuator 1501 such that the coupling 1505 and thus the panel 1504 moves from the rearward position 1505*a*/1504*a* to the forward position 1505*b*/1504*b*. In some implementations, actuation of the pneumatic actuator may be triggered by an inertial release mechanism such as the inertial switch 1405 described above.

In an alternative example, the shear pin may not be designed to break during a crash event, in which case the pneumatic actuator 1501 can propel the panel 1504 toward the forward position 1504*b* during a first portion of the travel, whereafter the actuator 1501 can impede the progress of the panel 1504. Slowing the panel during the second half of its travel may help preserve structural integrity of the panel and limit impact with the seat back 1251.

In still a further embodiment, the pneumatic actuator 1501 may be configured to impede or retard the progress of the panel 1504 from rearward position 1504*a* to the forward position 1504*b* during the entire length of travel across the channel 1503. Retarding the movement of the panel 1504 may be advantageous in implementations where the panel 1504 is relatively heavy, in which case there may be no need to provide additional force urging the panel forwardly during a crash event.

Figure 16:
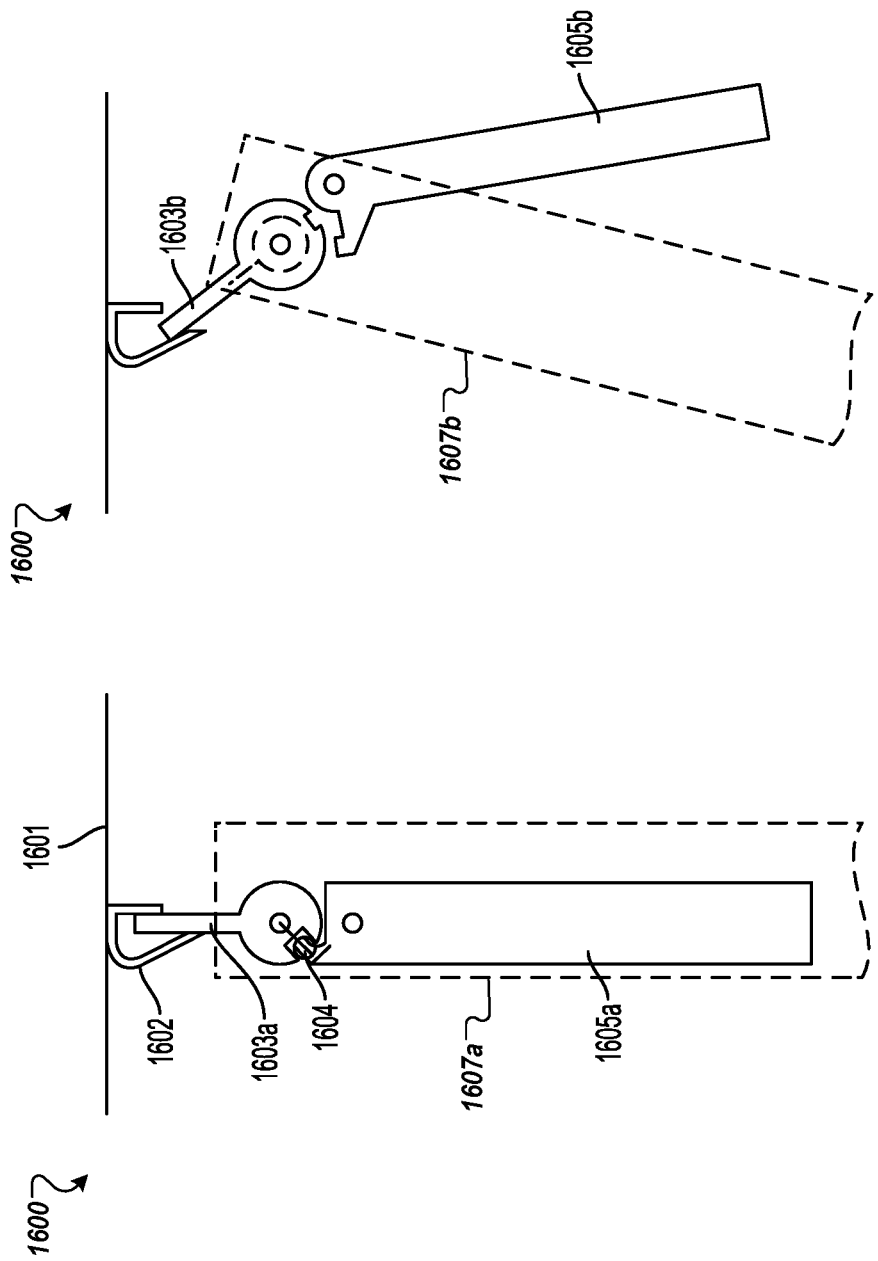
FIG. 16 illustrates an example of a mechanism for causing movement of a contoured class divider during an emergency event.

FIG. 16 shows a further alternative implementation of a mechanism 1600 for causing movement of a contoured class divider during an emergency event where a catch 1602 is mounted to an aircraft cabin ceiling or overhead stowage bin structure 1601. In some implementations, the mechanism 1600 may include a blade 1603 that is received in the catch 1602 and is held in place by a pawl 1604 rigidly coupled to a pivoting pendulum 1605. In some implementations, during normal operations, the pivoting pendulum 1605 may be substantially in-line with a panel 1607*a* of a contoured class divider. During a crash, inertial forces may cause the pendulum 1605 to swing in a forward direction to position 1605*b*, thereby causing the pawl 1604 to release from the blade member 1603. After the pawl 1604 releases from the catch 1602, the blade 1603 may rotate relative to the catch 1602, which in turn may cause release of the pendulum 1605 from the catch 1602 and causes the panel 1607 to move or rotate from the rearward 1607*a* position to the forward position 1607*b*.

Turning to FIG. 17, an example of an economy class seat 1703 separated from a business class seat 1704 by a class divider 1700 is illustrated. In some implementations, the expected travel of the head of the passenger in seat 1703 during a crash event may interfere with the divider 1700 in its normal operating position 1700*a*, which may permit the seats 1703/1704 to be positioned more closely to one another, thereby saving space and, in certain cabin configurations, permitting the installation of an additional row of seats forward or aft of the seats 1703/1704. For example, the class divider 1700 may include an upper divider portion 1705 and a lower divider portion 1708 connected by a pop joint 1707 that provides a pivot point between the upper divider portion 1705 and lower divider portion 1708, which provides for rotation of the upper divider portion 1705 and lower divider portion 1708 along with pivot points 1709 and 1711 when a crash event or emergency situation is experienced. In some examples, a seatback 1702 of seat 1704 may articulate between an upright position 1702*a* and a reclined position 1702*b*. When the divider 1700 is in its normal operating position 1700*a*, the seatback 1702 may be reclined to the position 1702*b*. Immediately prior to a crash event, the seatback 1702 may be expected to be in the TTOL position 1702*a*. In some implementations, an upper divider portion of the class divider 1700 may include upper divider portion 1705 and an associated pocket member 1706 which together form a telescoping or "slip joint" panel structure that can accommodate changes in the distance between pop joint 1707 and pivot 1711 connecting the pocket member 1706 to the stowage bin structure as the class divider 1700 moves between the normal operating position 1700*a* and a crash position 1700*b*.

During normal operations, the pop joint 1707 may be locked such that the upper divider portion 1705 and lower divider portion 1708 are held stationary in the rearward position 1705a/1708a During a crash event, the inertial forces on divider 1700 overcome the locking force of the pop joint 1707 and the upper divider portion 1705, pocket member 1706, and lower divider portion 1708 articulate to positions 1708b, 1705b and 1706b by articulation of pivots 1707, 1709, and 1711. In this operating position, also referred to as an emergency operating position, the divider 1700 may not interfere with an expected arch of travel of a head of a passenger seated in seat 1703, thereby meeting safety guidelines. In some implementations, the pocket member 1706 may be equipped with a damping member configured to impede the travel of the upper divider panel 1705b into pocket member 1706b. Slowing the travel of the upper divider panel 1705b into the pocket member 1706b may help slow the travel may help preserve structural integrity of the divider 1700 and reduce impact of the divider 1700 on the seatback 1702.

Figure 18:
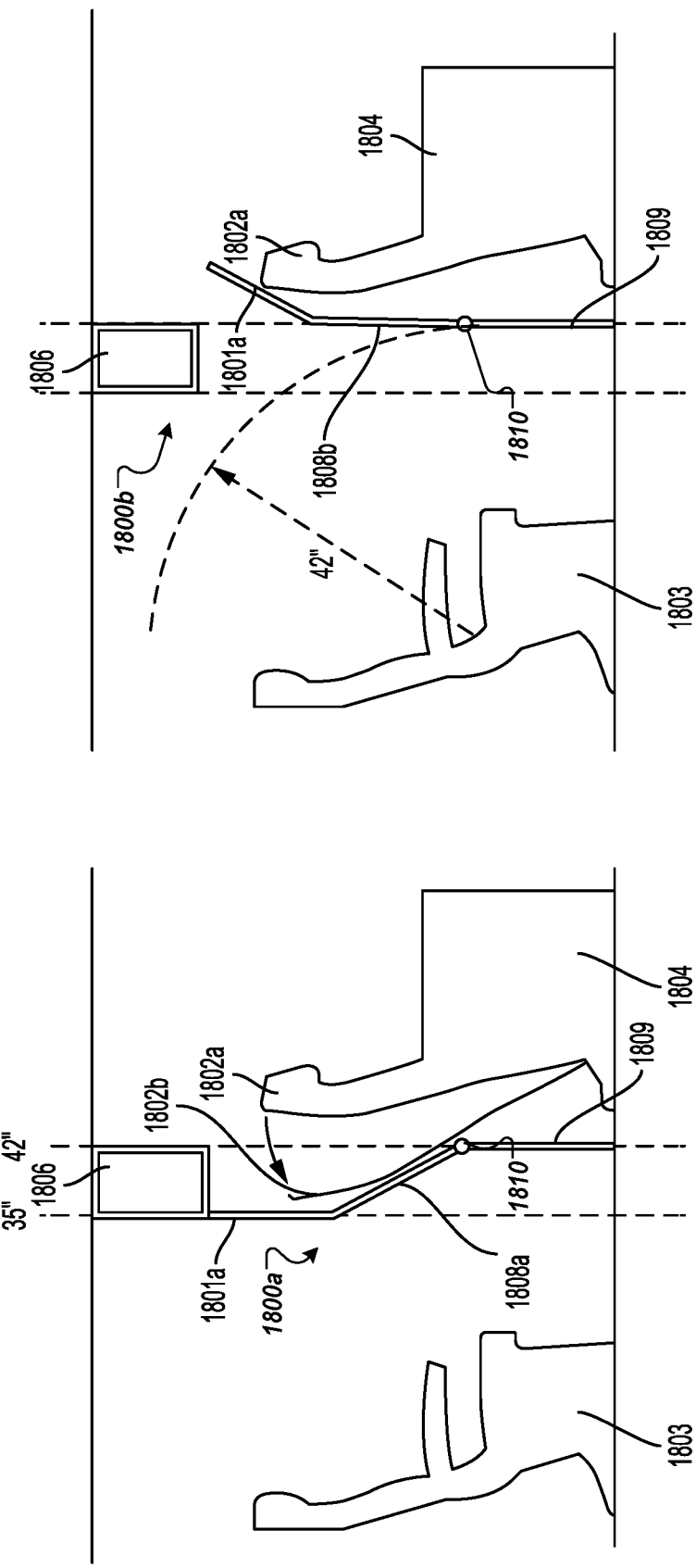
FIG. 18 illustrates a side view of passenger seats separated by a contoured class divider that articulates below an overhead storage bin.

Turning to FIG. 18, economy class seat 1803 separated from business class seat 1804 by a contoured class divider 1800 is illustrated. In certain embodiments, the divider 1800 may include an upper portion 1801, a middle portion 1808, and a bottom portion 1809. The upper portion 1801 and the middle portion 1808 may be fixedly attached to one another with a predetermined angular relationship, while the middle portion 1808 may be hingedly connected to the lower portion 1809 by a pop joint 1801 that functions as a pivot point for the upper and middle portions 1801/1808 during a crash event. For example, in a normal operating position 1800a, the upper portion 1801a may have a vertical orientation, and the middle portion 1808a may be positioned at an angle that allows a seatback 1802 for seat 1804 to move from a TTOL position 1802a to a reclined position 1802b during normal operations without interfering with the divider 1800a. During a crash event when the seat 1804 is expected to be in the TTOL position, inertial forces may cause the upper and middle portions 1801/1808 of the divider 1800 to overcome a locking force of the pop joint 1810, and rotate in a forward direction to a forward emergency position 1801b/1808b such that the middle portion 1808b has a vertical orientation that is substantially in-line with the lower portion 1809, and the upper portion 1801b has an inclined orientation relative to the middle portion 1808b.

During a crash event, an expected travel distance of the head of the passenger in seat 1803 may interfere with divider 1800 in its normal operating position 1800a. However, the forward rotation of the divider to position 1800b during a crash event may permit the seats 1803/1804 to be positioned more closely to one another, thereby saving space and, in certain cabin configurations, permitting the installation of an additional row of seats forward or aft of the seats 1803/1804. In some examples, located above the upper portion 1801 is a monitor or stowage compartment 1806, which may be mounted to the overhead stowage bin structure. During a crash event, the inertial forces on divider 1800 overcome the locking force of pop joint 1809 and the divider 1800 articulates to position 1800b. In the forward emergency position 1800b, the divider 1800 may not interfere with the expected arch of travel of the head of the passenger seated in seat 1803, thereby meeting safety guidelines. The stowage compartment or monitor 1806 may be configured to permit the depicted travel of the divider 1800 from the normal operating position 1800a to the forward emergency position 1800b.

Figure 19:
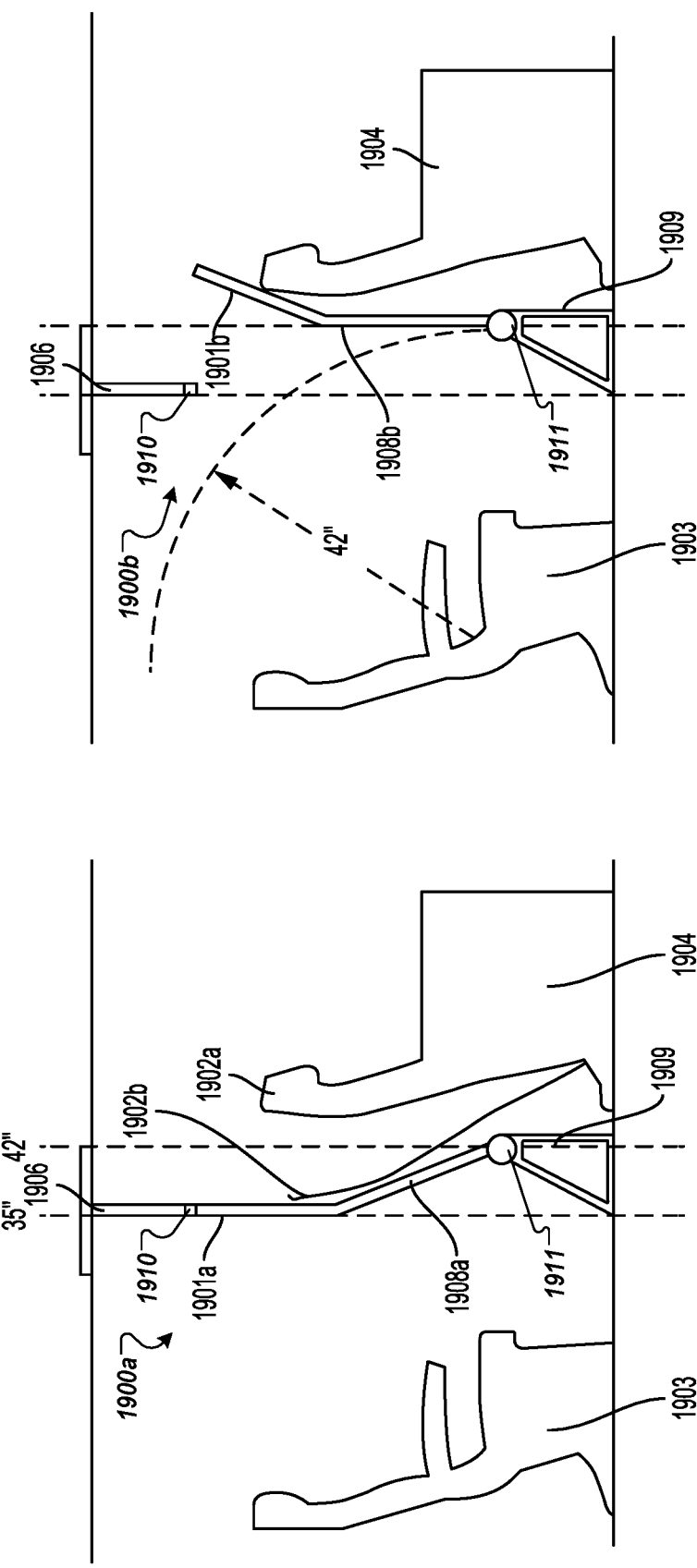
FIG. 19 illustrates a side view of passenger seats separated by a contoured class divider that includes a stationary member coupled to an articulating panel by a magnetic catch.

Turning to FIG. 19, an economy class seat 1903 separated from business class seat 1904 by a divider 1900 is illustrated. In certain embodiments, the divider 1900 may include a stationary member 1906 mounted to an aircraft cabin ceiling or to an underside of an overhead bin structure, an upper portion 1901, and a lower portion 1908. The upper portion 1901 and the lower portion 1908 may be fixedly attached to one another with a predetermined angular relationship, and lower portion 1908 may be pivotably coupled to base member 1909 by a rotary speed limiter 1911. The upper portion 1901 may be connected to the stationary member 1906 by a magnetic catch 1910, which may be set to release when inertial forces are experienced during a crash event at a load of 1, 2, 3, 4, 5, 6, 7, 8 or 9 G or values therebetween, causing forward rotation of the upper portion 1901 and lower portion 1908 of the divider 1900 at the rotary speed limiter 1911 from a normal operating position 1900a to a forward emergency position 1900b. For example, in a normal operating position 1900a, the upper portion 1901a may have a vertical orientation, and the lower portion 1908a may be positioned at an angle that allows a seatback 1902 for seat 1904 to move from a TTOL position 1902a to a reclined position 1902b during normal operations without interfering with the divider 1900a. During a crash event when the seat 1904 is expected to be in the TTOL position, inertial forces may cause the magnetic catch 1910 to release the upper portion 1901 of the divider 1900 from the stationary member 1906 such that the upper and lower portions 1901/1908 rotate in a forward direction to the forward emergency position 1901b/1908b where the lower portion 1908b has a vertical orientation, and the upper portion 1901b has an inclined orientation relative to the lower portion 1908b.

During a crash event, an expected distance of travel of the head of the passenger in seat 1903 may interfere with divider 1900 in its normal operating position 1900a. However, the forward rotation of the divider 1900 to position 1900b during a crash event may permit the seats 1903/1904 to be positioned more closely to one another, thereby saving space and, in certain cabin configurations, permitting the installation of an additional row of seats forward or aft of the seats 1903/1904. During a crash event, the rotary speed limiter 1911 which impedes the travel of the divider, which may help slow the travel of the divider 1900, which in turn may help preserve structural integrity of the divider 1900 and reduce impact on the seatback 1902. In the forward emergency position 1900b, the divider 1900 may not interfere with the expected arch of travel of the head of the passenger seated in seat 1903, thereby meeting safety guidelines.

Figure 20:
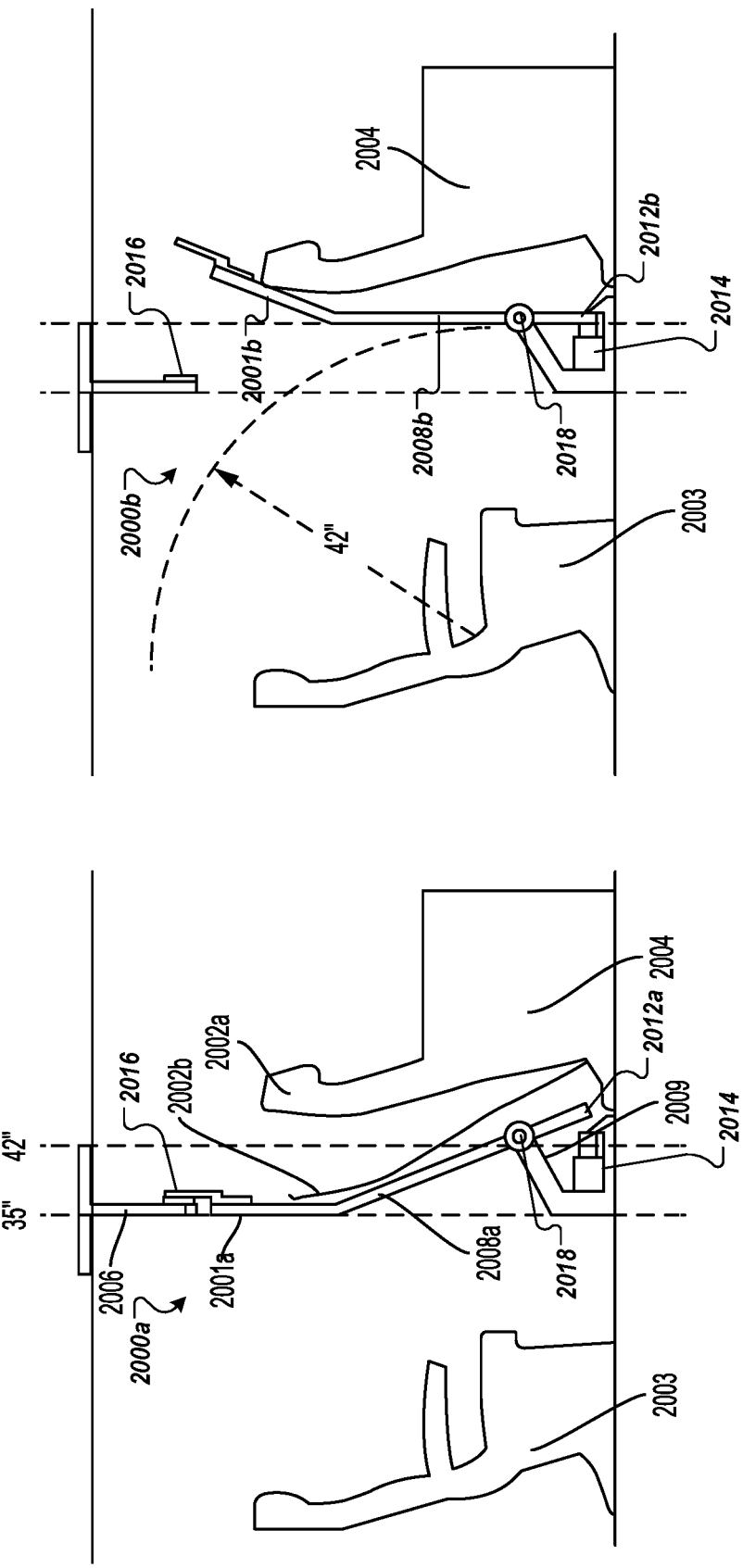
FIG. 20 illustrates a side view of passenger seats separated by a contoured class divider including a shock absorbing ram for absorbing impact for an articulating panel.

Turning to FIG. 20, an economy class seat 2003 separated from business class seat 2004 by a divider 2000 is illustrated. In certain embodiments, the divider 2000 may include a stationary member 2006 mounted to an aircraft cabin ceiling or to an underside of an overhead bin structure, an upper portion 2001, and a lower portion 2008. The upper portion 2001 and the lower portion 2008 may be fixedly attached to one another with a predetermined angular or bent relationship, and lower portion 2008 may be hingedly coupled to base member 2009 at a pivot point 2018. In some implementations, the lower portion 2008 may be pivotably coupled to base member 2009 such that an extension member 2012 of the lower portion 2008 may be spaced apart from a shock absorbing ram 2014 in a normal operating position 2012a.

In some examples, the upper portion 2010 may be connected to the stationary member 2006 by a magnetic catch 2016, which may be set to release during a crash event at a load of 1, 2, 3, 4, 5, 6, 7, 8 or 9 G or values therebetween, causing forward rotation of the upper portion 2001 and lower portion 2008 of the divider 2000 at the pivot point 2018 from a normal operating position 2000a to a forward emergency position 2000b. For example, in a normal operating position 2000a, the upper portion 2001a may have a vertical orientation, and the lower portion 2008a may be positioned at an angle that allows a seatback 2002 for seat 2004 to move from a TTOL position 2002a to a reclined position 2002b during normal operations without interfering with the divider 2000a. During a crash event when the seat 2004 is expected to be in the TTOL position, inertial forces may cause the magnetic catch 2016 to release the upper portion 2001 of the divider 2000 from the stationary member 2006 such that the upper and lower portions 2001/2008 rotate in a forward direction to the forward emergency position 2001b/2008b where the lower portion 2008b has a vertical orientation, and the upper portion 2001b has an inclined orientation relative to the lower portion 2008b. As the divider 2000 reaches the forward emergency position 2000b, the extension member 2012 may impact the shock absorbing ram 2014, which reduces an impact force as the upper and lower portions 2001/2008 rotate to the forward emergency position.

During a crash event, an expected distance of travel of the head of the passenger in seat 2003 may interfere with divider 2000 in its normal operating position 2000a. However, the forward rotation of the divider 2000 to position 2000b during a crash event may permit the seats 2003/2004 to be positioned more closely to one another, thereby saving space and, in certain cabin configurations, permitting the installation of an additional row of seats forward or aft of the seats 2003/2004. During a crash event, the inertial forces on divider 2000 may overcome the locking force of the magnetic catch 2016 and the divider 2000 begins to articulate to positions 2008b until the extension member 2012 engages the ram 2014 at position 2012b, which thereafter helps slow the travel of the divider 2000 which in turn may help preserve structural integrity of the divider 2000 and reduce impact on the seatback 2002. In operating position 2008b the divider 2000 may not interfere with the expected arch of travel of the head of the passenger seated in seat 2003, thereby meeting safety guidelines.

Figure 21:
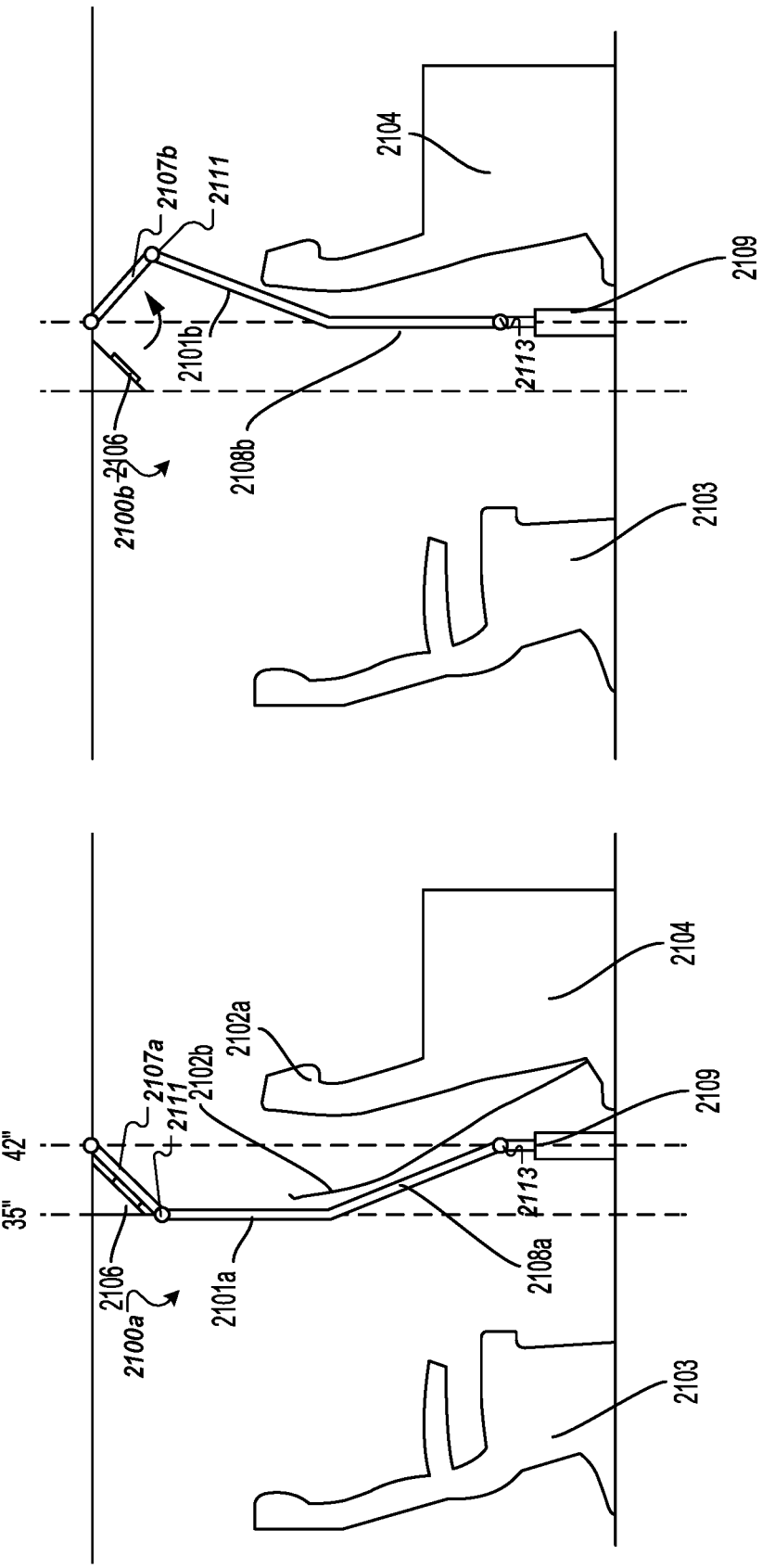
FIG. 21 illustrates a side view of passenger seats separated by a contoured class divider including two articulating panels.

Turning to FIG. 21, an economy class seat 2103 separated from business class seat 2104 by a divider 2100 is illustrated. In certain embodiments, a stationary member 2106 with a magnetic catch mounted to an aircraft cabin ceiling or to an underside of an overhead bin structure that may be magnetically coupled to a stop panel 2107 of the divider 2100 that may also be hingedly connected to the underside of the overhead bin structure. The divider 2100 may also include an upper portion 2101 coupled to the stop panel 2107 at a pivot point 2107 and a lower portion 2008. The upper portion 2101 and the lower portion 2108 may be fixedly attached to one another with a predetermined angular or bent relationship, and lower portion 2108 may be hingedly coupled to base member 2109 at a pivot point 2113. In some examples, the magnetic catch of the stationary member 2106 may be set to release the stop panel 2107 during a crash event at a load of 1, 2, 3, 4, 5, 6, 7, 8 or 9 G or values therebetween, causing rotation of the stop panel 2107, which produces forward rotation of the upper portion 2101 and lower portion 2108 of the divider 2100 at the pivot points 2111, 2113 from a normal operating position 2100a to a forward emergency position 2100b.

For example, in a normal operating position 2100a, the upper portion 2101a may have a vertical orientation, and the lower portion 2108a may be positioned at an angle that allows a seatback 2102 for seat 2104 to move from a TTOL position 2102a to a reclined position 2102b during normal operations without interfering with the divider 2100a. During a crash event when the seat 2104 is expected to be in the TTOL position, inertial forces may cause the magnetic catch of the stationary member 2106 to release the stop panel 2107 such that the upper and lower portions 2101/2108 rotate in a forward direction to the forward emergency position 2101b/2108b where the lower portion 2108b has a vertical orientation, and the upper portion 2001b has an inclined orientation relative to the lower portion 2108b. As the divider 2100 reaches the forward emergency position 2100b, the stop panel 2107 may limit an amount of forward rotation of the divider 2100.

The forward rotation of the divider 2100 to position 2100b during a crash event may permit the seats 2103/2104 to be positioned more closely to one another, thereby saving space and, in certain cabin configurations, permitting the installation of an additional row of seats forward or aft of the seats 2103/2004. During a crash event, the inertial forces on divider 2100 overcome the locking force of the magnetic catch and the divider 2100 articulates to position 2108b at which time the forward progress of the divider 2100 may be halted by the stop panel 2107 hingedly connected to the divider 2100 and the overhead stowage bin structure. Use of rotary speed limiters at the pivot points 2111, 2113 may help slow the travel of the divider 2100, which in turn may help preserve structural integrity of the divider 2100 and reduce impact on the seatback 2102. In the forward emergency position 2108b, the divider 2100 may not interfere with an expected path of travel of the head of the passenger seated in seat 2103, thereby meeting safety guidelines.

Figure 22:
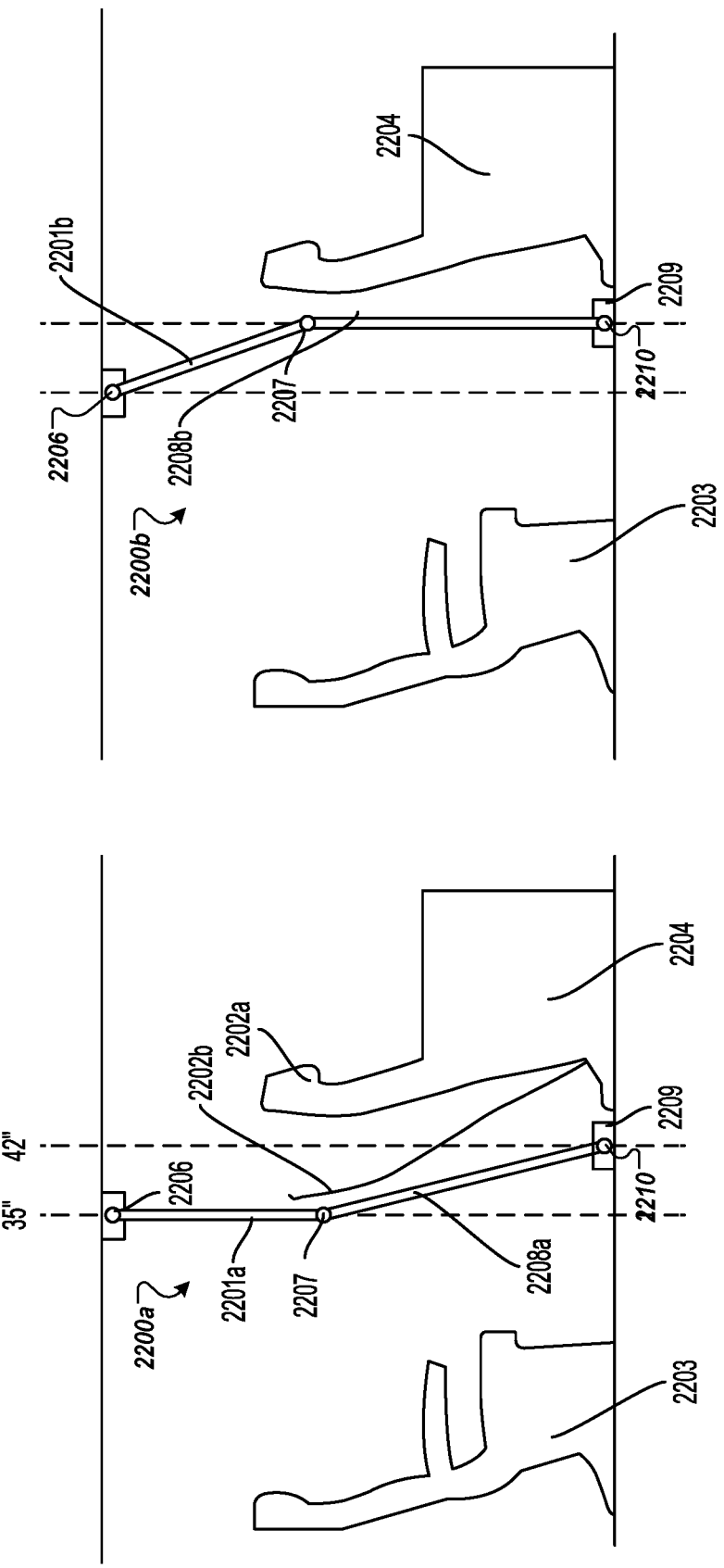
FIG. 22 illustrates a side view of passenger seats separated by a contoured class divider including two articulating panels.

Turning to FIG. 22, an economy class seat 2203 separated from business class seat 2204 by a divider 2200 is illustrated. In certain embodiments, the divider 2200 may include an upper portion 2201 hingedly connected to a lower portion 2208 at a pivot point 2207, which may be a pop joint 2207 or rotary speed limiter. In some examples, an upper end of the upper portion 2201 may be hingedly coupled to an overhead ceiling mount or overhead storage bin at pivot point 2206, which may be a rotary speed limiter that limits a speed of rotation of the upper portion 2206 during a crash event. In some examples, the lower portion 2208 may be hingedly coupled to base member 2009 at a pivot point 2210, which may also be a rotary speed limiter that limits the speed of rotation of the lower portion 2208 during a crash event.

In some examples, the pop joint 2207 may be set to release during a crash event at a load of 1, 2, 3, 4, 5, 6, 7, 8 or 9 G or values therebetween, causing forward rotation or hinging of the upper portion 2201 and lower portion 2208 of the divider 2200 at the pivot point of the pop joint 2207 from a normal operating position 2200a to a forward emergency position 2200b. For example, in a normal operating position 2200a, the upper portion 2001a may have a vertical orientation, and the lower portion 2208a may be positioned at an angle that allows a seatback 2202 for seat 2204 to move from a TTOL position 2202a to a reclined position 2202b during normal operations without interfering with the divider 2200a. During a crash event when the seat 2204 is expected to be in the TTOL position, inertial forces may cause the pop joint 2207 to release such that the upper and lower portions 2201/2208 rotate to the forward emergency position 2201b/2208b where the lower portion 2208b has a vertical orientation, and the upper portion 2201b has an inclined orientation relative to the lower portion 2208b.

The forward rotation of the divider 2200 to position 2200b during a crash event may permit the seats 2203/2204 to be positioned more closely to one another, thereby saving space and, in certain cabin configurations, permitting the installation of an additional row of seats forward or aft of the seats 2203/2204. During a crash event, the inertial forces on divider 2200 may overcome a locking force of pop joint 2207 and the divider 2200 begins to articulate to position 2200b by articulation of upper and lower rotary speed limiters 2206, 2210 which may impede the travel of the divider 2200. The user of the rotary speed limiters 2206, 2210 may slow the travel of the divider 2200 which in turn may help preserve structural integrity of the divider 2200 and reduce impact on the seatback 2202. The forward travel of the divider 2200 may be halted at the vertical dashed line indicating the forward emergency position 2200b. In forward emergency position 2200b the divider 2200 may not interfere with the expected path of travel of the head of the passenger seated in seat 2203, thereby meeting safety guidelines.

Figure 23:
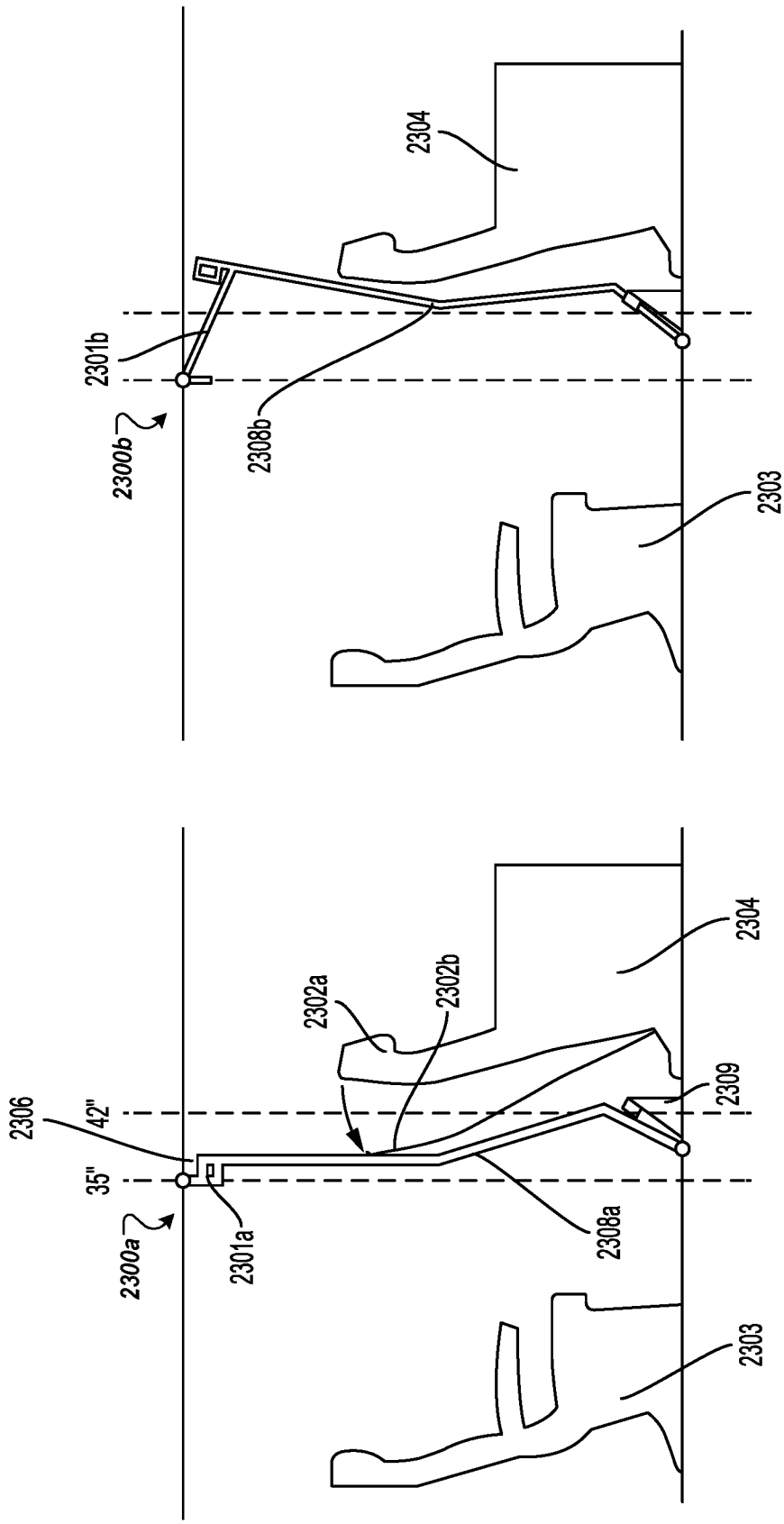
FIG. 23 illustrates a side view of passenger seats separated by a contoured class divider including an articulating panel mounted to an overhead storage bin by a webbing strap retainer.

Turning to FIG. 23, an economy class seat 2303 separated from business class seat 2304 by a divider 2300 is illustrated. In certain embodiments, the divider 2300 may include panel 2308 mounted to an aircraft cabin ceiling or underside of an overhead bin by a webbing strap retainer 2301. In some examples, the panel 2308 may be pivotably coupled to the floor and connected to base member 2309 via a mechanical latch that may be set to release at 500, 600, 700, 800, 900, 1000, 1100, 1200, 1300, 1400, or 1500 lbf of torque or values therebetween during a crash event, thereby causing forward rotation of the panel 2308 from a normal operating position 2308a to a forward emergency position 2308b.

For example, in a normal operating position 2300a of the divider 2300, the panel 2308 may be positioned at an angle that allows a seatback 2302 for seat 2304 to move from a TTOL position 2302a to a reclined position 2302b during normal operations without interfering with the divider 2300a. The forward rotation of the divider 2300 to position 2300b during a crash event may permit the seats 2303/2304 to be positioned more closely to one another, thereby saving space and, in certain cabin configurations, permitting the installation of an additional row of seats forward or aft of the seats 2303/2304. During a crash event when the seat 2304 is expected to be in the TTOL position, inertial forces on the panel 2308 may cause the mechanical latch on the base member 2309 to release such that the panel 2308 rotates to the forward emergency position 2308b. The forward travel of the divider 2301/2308 is halted by extension of the webbing strap 2301 to position 2301b that occurs when the panel 2308 moves to the forward emergency position 2308b. In the forward emergency position 2308b, the divider 2300 may not interfere with the expected arch of travel of the head of the passenger seated in seat 2303, thereby meeting safety guidelines.

Turning to FIG. 24, an economy class seat 2403 separated from business class seat 2404 by a divider 2400 is illustrated. In certain embodiments, the divider 2400 may include an upper portion 2401 and a lower portion 2408 hingedly coupled together by a pop joint 2407. In some examples, the upper portion 2401 may be hingedly mounted or abutting a lower surface of a storage compartment 2406 that may be mounted to an aircraft cabin ceiling or overhead bin structure. In some examples, the storage compartment 2406 may have a lower surface that is configured to magnetically couple to a forward surface of the upper portion 2401 during a crash event. In addition, the lower portion 2408 may be pivotably coupled to a telescoping base member 2409. For example, a bottom end of the lower portion 2408 can be raised within the telescoping base member 2409 during articulation of the lower portion between a normal operating position 2408a and a forward emergency position 2408b.

In a normal operating position 2400a of the divider 2400, the upper and lower portions 2401a/2408a may be positioned at an angle that allows a seatback 2402 for seat 2404 to move from a TTOL position 2402a to a reclined position 2402b during normal operations without interfering with the divider 2400a. The forward rotation of the divider 2400 to position 2400b during a crash event may permit the seats 2403/2404 to be positioned more closely to one another, thereby saving space and, in certain cabin configurations, permitting the installation of an additional row of seats forward or aft of the seats 2403/2404.

During a crash event when the seat 2404 is expected to be in the TTOL position, the inertial forces on divider 2400 may overcome the locking force of the pop joint 2407 and the pull of gravity on upper portion 2408 and the telescoping portion of member 2409. The upper portion 2401 and lower portion 2408 articulate to the forward emergency positions 2401b/2408b and may be held in place by a mechanical or magnetic latch on the underside of compartment 2406 that magnetically couples to the upper portion 2401 in position 2401b. Additionally, the bottom end of the lower portion 2408 may telescope outward from the telescoping base member 2409 during articulation of the lower portion 2408 to the forward emergency position 2408b. In the forward emergency position 2400b, the divider 2400 may not interfere with an expected path of travel of the head of the passenger seated in seat 2403, thereby meeting safety guidelines. The stowage compartment or monitor 2406 may be configured to permit the depicted travel of the upper portion 2401.

Turning to FIG. 25, an economy class seat 2503 separated from business class seat 2504 by a divider 2500 is illustrated. In certain embodiments, the divider 2500 may include a panel 2501 and a stationary panel member 2506 connected to the panel 2501 by a magnetic catch 2507. In some implementations, the magnetic catch 2507 may be set to release the panel 2501 from the stationary panel member 2506 at a load of 1, 2, 3, 4, 5, 6, 7, 8 or 9 G or values therebetween. In addition, the panel 2501 may be pivotably coupled to base member 2509 at pivot point 2510, which may optionally include a counterweight 2508 and a latch (not shown) configured to hold the panel 2501 in a forward emergency position after an occurrence of a crash event.

In a normal operating position 2500a of the divider 2500, the panel 2501a may be positioned at an angle that allows a seatback 2502 for seat 2504 to move from a TTOL position 2502a to a reclined position 2502b during normal operations without interfering with the divider 2500a. The forward rotation of the divider 2500 to position 2500b during a crash event may permit the seats 2503/2504 to be positioned more closely to one another, thereby saving space and, in certain cabin configurations, permitting the installation of an additional row of seats forward or aft of the seats 2503/2504.

During a crash event when the seat 2504 is expected to be in the TTOL position, the inertial forces on the panel 2501 may overcome the locking force of the magnetic catch and the panel 2501 may articulate to positions 2501b about the pivot point 2510 on the base member 2509. In some examples, a latch on the base member 2509 may hold a lower edge of the panel 2501 and optional counterweight 2508 in forward emergency position 2501b/2508b. In the forward emergency position 2501b, the panel 2501 may not interfere with the expected path of travel of the head of the passenger seated in seat 2503, thereby meeting safety guidelines.

Turning to FIG. 26, an economy class seat 2603 separated from business class seat 2604 by a divider 2600 is illustrated. In certain embodiments, the divider 2600 may include a panel 2601 connected to an aircraft cabin ceiling mount or overhead stowage bin by a catch mechanism 2606 (optionally like the one described in FIG. 16) which may be set to release the panel 2601 at a load of 1, 2, 3, 4, 5, 6, 7, 8 or 9 G or values therebetween when an inertial force is experienced during a crash event. In some examples, a lower portion of the panel 2601 may have a contoured shape that extends forwardly to utilize space 2608 behind seat 2604. In addition, the panel 2601 may be mounted to the floor by a base pivot point 2609 that allows the panel 2601 to articulate between a normal operating position 2601a and a forward emergency position 2601b.

In a normal operating position 2600a of the divider 2600, the panel 2601a may be positioned at an angle that allows a seatback 2602 for seat 2604 to move from a TTOL position 2602a to a reclined position 2602b during normal operations without interfering with the divider 2600a. The forward rotation of the divider 2600 to position 2600b during a crash event may permit the seats 2603/2604 to be positioned more closely to one another, thereby saving space and, in certain cabin configurations, permitting the installation of an additional row of seats forward or aft of the seats 2603/2604.

During a crash event when the seat 2604 is expected to be in the TTOL position, the inertial forces on divider 2601 may overcome the locking force of the catch mechanism 2606, and the panel 2601 articulates to forward emergency position 2601b at which point the travel of the panel 2601 is stopped by a webbing strap 2611 connected to the catch mechanism 2606 as discussed above (FIG. 23). In the forward emergency position 2601b, the panel 2601 may not interfere with an expected path of travel of the head of the passenger seated in seat 2603, thereby meeting safety guidelines.

Turning to FIGS. 27A-27B, an economy class seat 2703 separated from business class seat 2704 by a divider 2700 is illustrated. In certain embodiments, the divider 2700 may include a deformable panel 2701 connected to an aircraft cabin ceiling mount or overhead stowage bin by a telescoping slip joint 2706 (optionally like the one described in FIG. 17) that may be configured to bend or deform in a forward direction. Zoomed in structural details of the panel 2701 in a normal operating position 2701a prior to a crash event are shown at 2711a. For example, an interior of the panel 2701 may include cavities 2712a formed into the material of the panel 2701 that may permit the panel 2701 to readily deform or bend in a forward direction during a crash event as shown by the panel 2701b. For example, structural details of the interior of the panel 2701 after the crash event are shown at 2711b in FIG. 27B in which the cavities 2712b collapse under an inertial force caused by the crash event, which causes the panel 2701 to deform to the forward emergency position 2701b. In addition, the panel 2701 may be mounted to the floor by a base pivot point 2709 that allows the panel 2701 to articulate between a normal operating position 2701a and a forward emergency position 2701b as the panel 2701 deforms.

In a normal operating position 2700a of the divider 2700, the panel 2701a may be positioned at an angle that allows a seatback 2702 for seat 2704 to move from a TTOL position 2702a to a reclined position 2702b during normal operations without interfering with the divider 2700a. The forward rotation of the divider 2700 to position 2700b during a crash event may permit the seats 2703/2704 to be positioned more closely to one another, thereby saving space and, in certain cabin configurations, permitting the installation of an additional row of seats forward or aft of the seats 2703/2704.

During a crash event when the seat 2702 is expected to be in the TTOL position, the inertial forces on divider 2701 (represented by the parallel arrows) overcome the rigidity of the panel construction 2712a and the panel 2701 may articulates to position 2701b at which point the travel of the cross-sectional view of divider 2701 is as shown at reference 2711b. The cavities 2712b have partially collapsed to permit the divider 2701 to bend. In a preferred embodiment, the deformation may be permanent. In the forward emergency position 2701b, the panel 2701 may not interfere with the expected path of travel of the head of the passenger seated in seat 2703, thereby meeting safety guidelines.

Turning to FIGS. 28A-28B, an economy class seat 2803 separated from business class seat 2804 by a divider 2800 is illustrated. In certain embodiments, the divider 2800 may include stationary upper and lower portions 2806/2809 and an articulable middle portion 2808 that may be pivotably connected to the lower portion 2809 at pivot point 2807. In some examples, only the middle portion 2808 may be configured to articulate from a normal operating position 2808a to a forward emergency position 2808b above the pivot point 2807 during a crash event, which may limit an amount of divider mass that is articulating during the crash event. This implementation can be equipped with any number of the ancillary mechanisms of any of the foregoing embodiments. FIG. 28A also illustrates exemplary dimensions for the upper, middle, and lower portions 2806/2808/2809. In some examples, the seatback 2802 of the seat 2804 limits an amount of forward rotation of the middle portion 2808. Alternatively, the pivot point 2807 may be a rotary speed limiter that slows the speed of rotation of the middle portion 2808. FIG. 28B illustrates an alternate implementation of the divider 2800 in which the articulable middle portion is a cutout within the stationary upper portion 2801. For example, the middle portion can include panels 2808c/d that rotate forward from the upper portion 2801 in response to experienced inertial forces during a crash event.

In a normal operating position 2800a of the divider 2800, the divider 2800a may be positioned at an angle that allows a seatback 2802 for seat 2804 to move from a TTOL position 2802a to a reclined position 2802b during normal operations without interfering with the divider 2800a. The forward rotation of the divider 2800 to position 2800b during a crash event may permit the seats 2803/2804 to be positioned more closely to one another, thereby saving space and, in certain cabin configurations, permitting the installation of an additional row of seats forward or aft of the seats 2803/2804.

During a crash event when the seat 2804 is expected to be in the TTOL position, the inertial forces on the middle portion 2808 may overcome any locking or latching force and articulate to forward emergency position 2808b. In operating position 2808b the divider 2800 may not interfere with the expected path of travel of the head of the passenger seated in seat 2803, thereby meeting safety guidelines.

Figure 29:
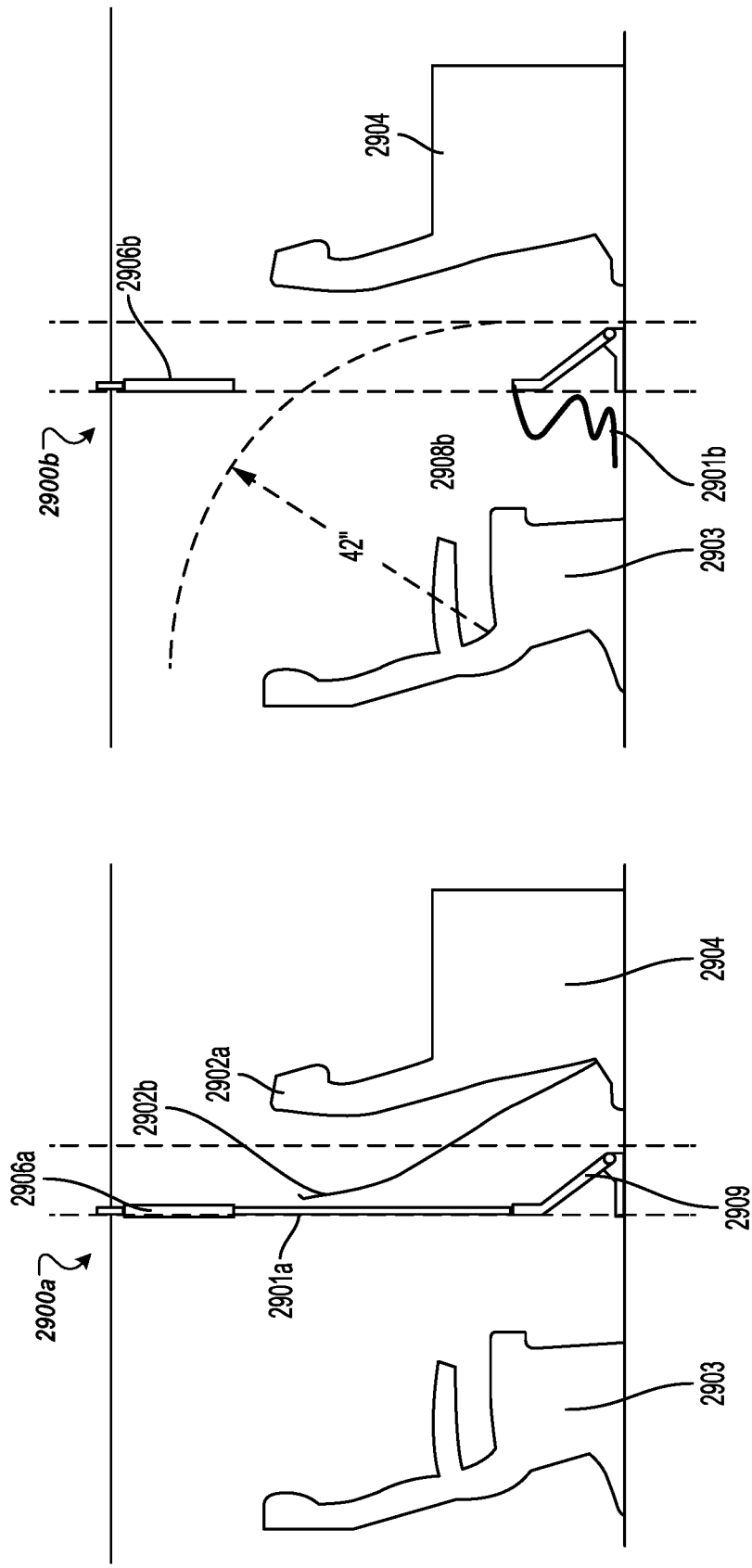
FIG. 29 illustrates a side view of passenger seats separated by a contoured class divider including a flexible middle portion made of fabric.

Turning to FIG. 29, an economy class seat 2903 separated from business class seat 2904 by a divider 2900 is illustrated. In certain embodiments, the divider 2900 may include an upper portion 2906 and lower portion 2909 that may be configured to remain substantially stationary during a crash. In some implementations, the upper portion may be connected to an aircraft cabin ceiling mount or an underside of an overhead storage bin. In some examples, the divider 2900 may also include a middle portion 2901 that may be made of flexible material such as fabric, which may eliminate articulation of the divider 2900 during the crash event. For example, the middle portion 2901 may be releasably connected to the upper portion 2906 at a top end by a hook or latch such that the middle portion 2901 separates from the upper portion 2906 during a crash event and collapses to the floor. This embodiment of the divider 2900 can be equipped with the ancillary mechanisms of any of the foregoing embodiments.

In a normal operating position 2900a of the divider 2900, the divider 2900a may be positioned at an angle that allows a seatback 2902 for seat 2904 to move from a TTOL position 2902a to a reclined position 2902b during normal operations without interfering with the divider 2900a. The forward rotation of the divider 2900 to position 2900b during a crash event may permit the seats 2903/2904 to be positioned more closely to one another, thereby saving space and, in certain cabin configurations, permitting the installation of an additional row of seats forward or aft of the seats 2903/2904.

During a crash event when the seat 2904 is expected to be in the TTOL position, the head of the passenger seated in seat 2903 may travel safely through the fabric of the middle portion 2901, optionally tearing the middle portion 2901 at weakened areas proximate the upper divider portion 2906 or lower portion 2909. The lower portion 2909 may be constructed of relatively flexible but rigid material to accommodate incidental contact with the passenger.

Figure 30:
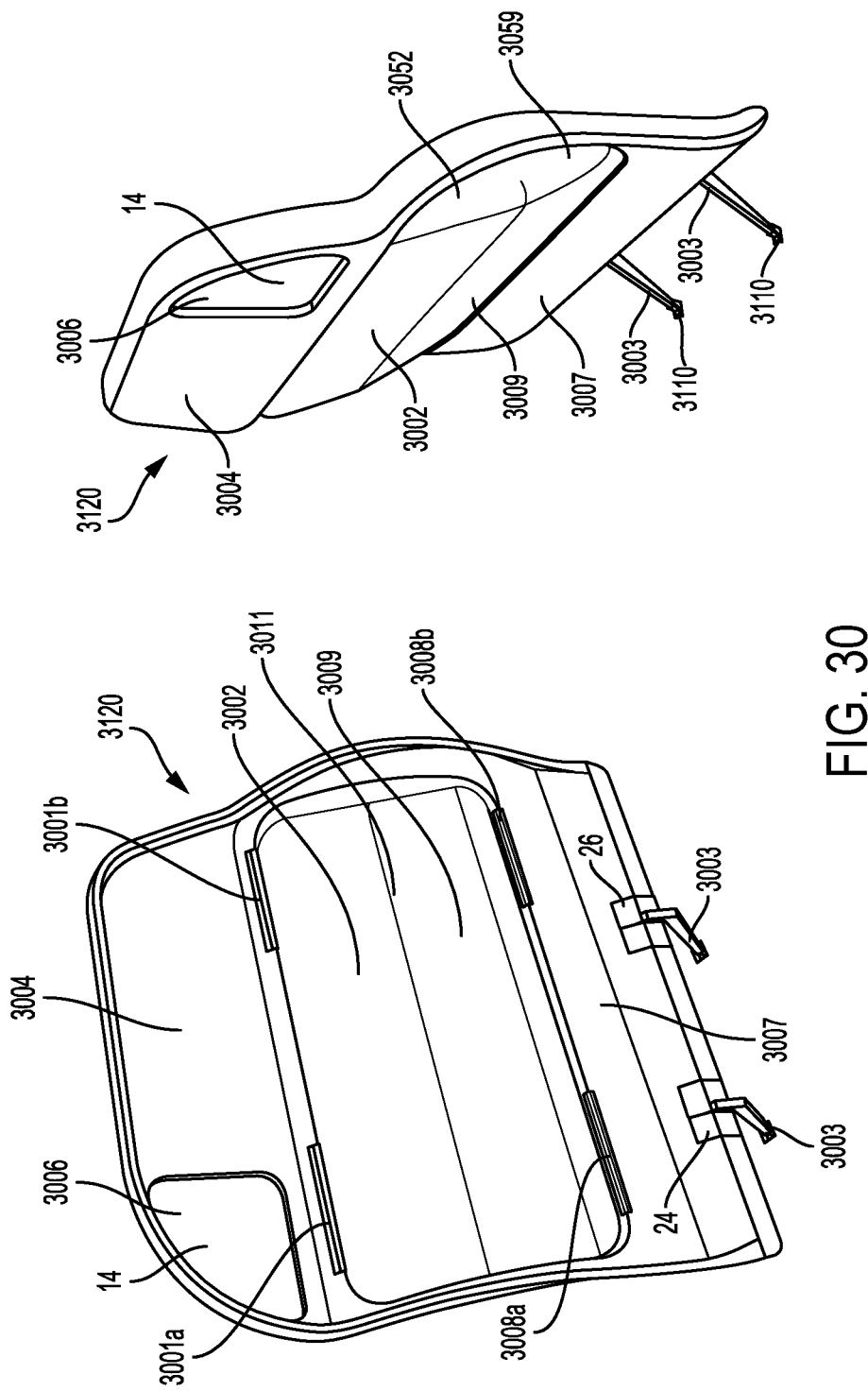
FIGS. 30-33 illustrate views of a contoured class divider with a reduced articulating mass.

FIGS. 30-42 illustrate aspects of alternative embodiments for the contoured class divider, which may also substantially reduce the mass of the articulating divider during a crash event. One such alternative is shown in FIGS. 30-33. As shown in FIG. 30, divider 3120 may include an upper panel portion 3004 and a lower panel portion 3007 coupled by additional outer frame portions. In some implementations, the upper portion 3004 may include a viewing window 3006 to preserve crew members' line of sight to the next cabin, which may be positioned at an upper corner of the upper portion 3004. The divider 3120 may be rigidly coupled at a lower end to the cabin floor by legs 3003 with floor mounts 3110 and may be optionally coupled at an upper end to the stowage bin structure by structures such as couplers 20, 42, 64, 66, 82 in FIGS. 1-6. In some implementations, an articulate portion of the divider 10 may include an upper shell member 3002 and a lower shell member 3009 that are disposed between the upper panel portion 3004 and lower panel portion 3007. A rear side of the upper shell member 3002 may include forwardly extending sides 3052 and may be coupled to the upper portion 3004 via hinges 3001a, 3001b. Similarly, a rear side of the lower shell member 3009 may include forwardly extending sides 3059 and may be coupled to the lower portion 3007 by hinges 3008a, 3008b. In the normal operating position shown in FIG. 30, a seat 3011 forward of the divider 3120 may fully recline.

During a crash event, the upper shell member 3002 may articulate forward at hinges 3001a, 3001b, and the lower shell member 3009 may also articulate forward at hinges 3008a, 3008b. As the upper and lower shell members 3002, 3009 articulate forward, the upper and lower shell members 3002, 3009 separate from one another at mating surface 3011, thereby creating a gap or opening in the divider 3120. In some examples, the upper and lower shell members 3002, 3009 are permitted to articulate forward due to an inertial release mechanism that will be discussed further below.

Figure 31:
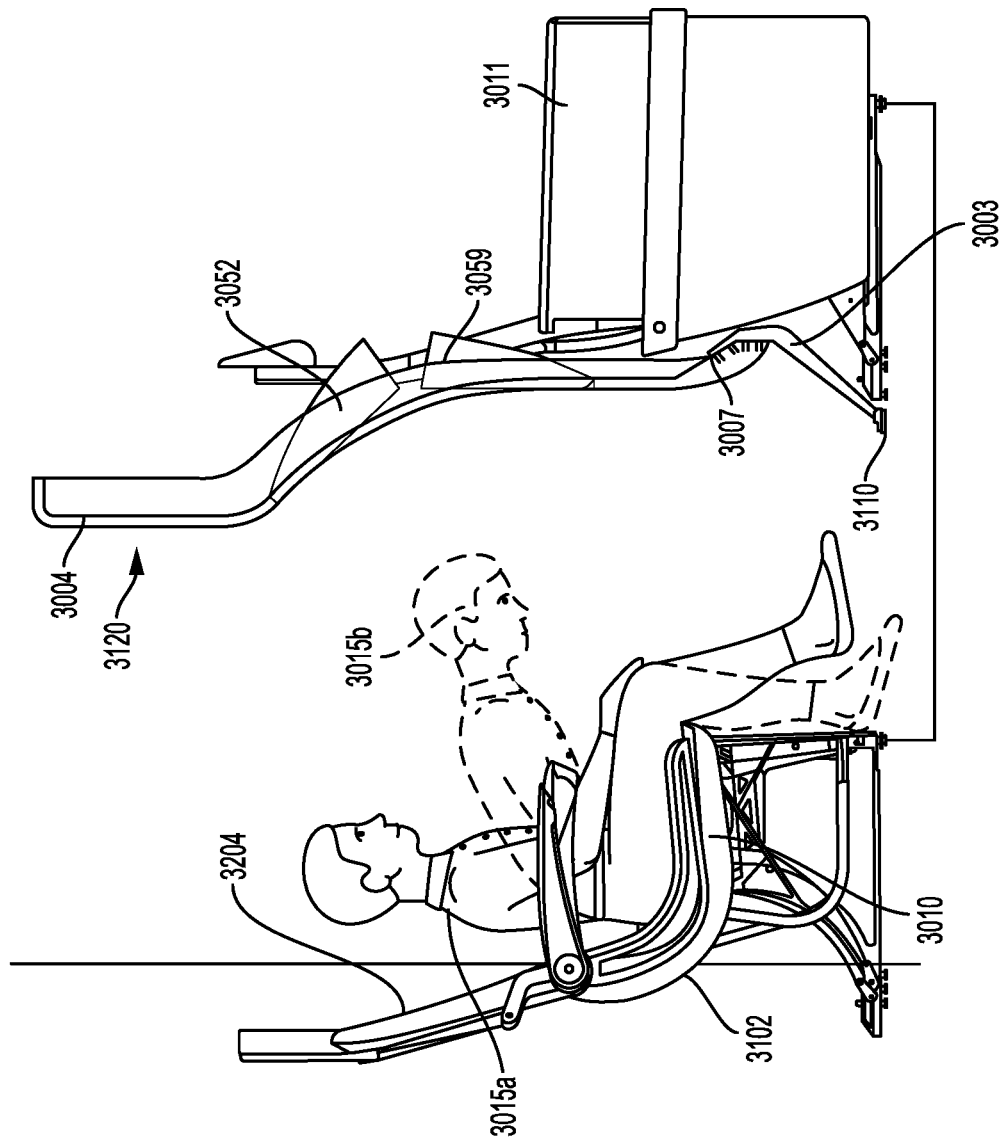

As shown in FIG. 31, passenger 3015 seated to the rear of a contoured class divider 3120 in seat 3010 having a seat back 3204 and seat bottom 3102 may assume a position 3015 during normal operations and a position 3015b during a crash event. Although not depicted to scale, without the forward articulation of the upper and lower shell members 3002, 3009 as shown, the upper and lower shell members 3002, 3009 may interfere with the head of passenger 3015b, which permits the seats 3010 and 3011 to be positioned more closely together, as discussed above.

Figure 32:
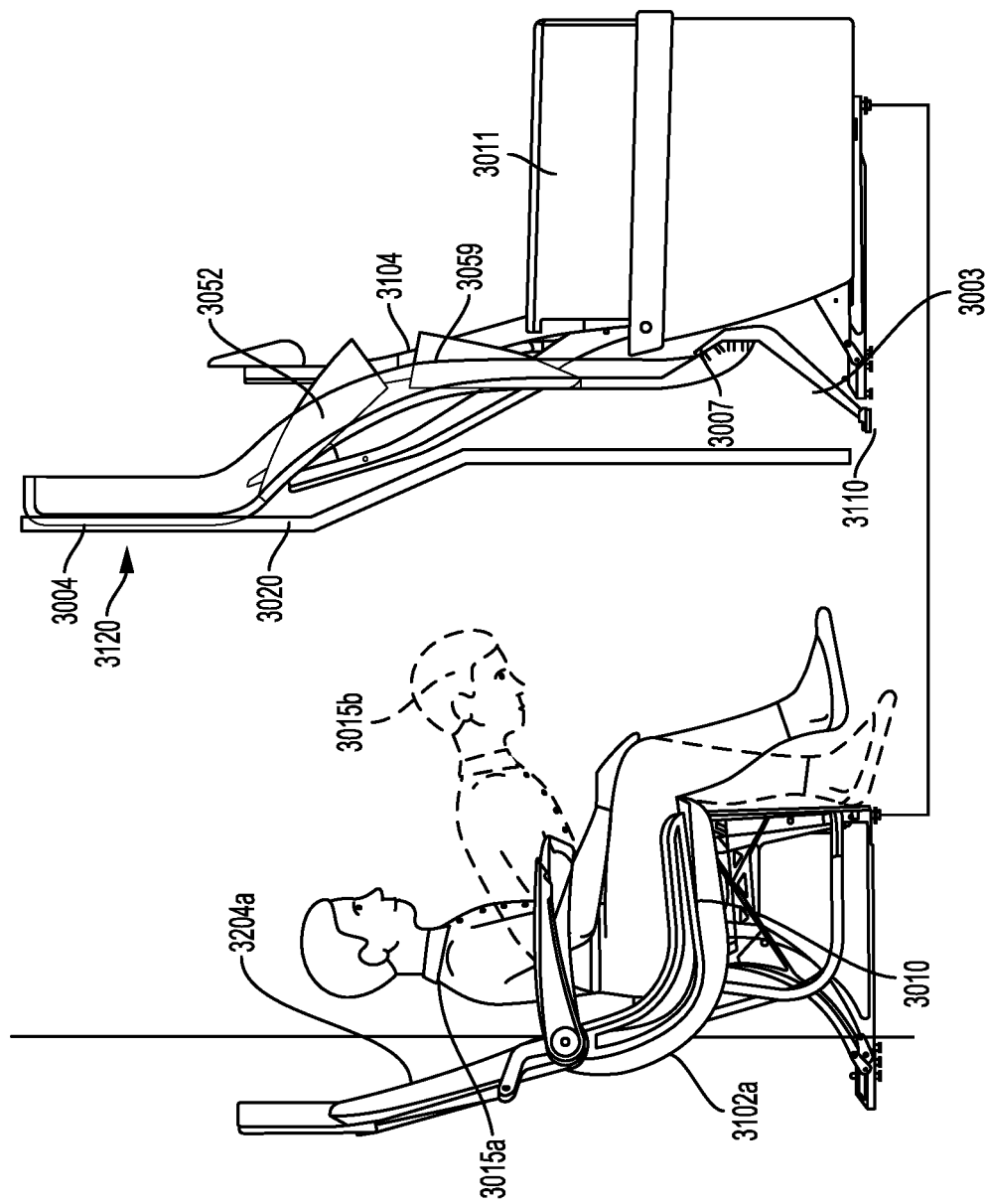

FIG. 32 shows the comparative positioning of the embodiments of FIG. 30 and FIG. 1 after a crash event. For example, partition 3020 reflects the position of the divider of FIG. 1 after a crash event, and divider 3120 illustrates the divider of FIG. 30. In order to accommodate the depicted recline of business class seat 3011 that is forward of the divider, the partition 3020 is positioned further after than divider 3120. As can be appreciated from FIG. 32, the embodiment of FIG. 30 provides several additional inches of clearance relative to even a fixed contoured divider. The embodiment of FIG. 30 provides 1, 2, 3, 4, 5, 6, 7 or 8 inches of additional clearance relative to a fixed divider (and values therebetween).

Figure 33:
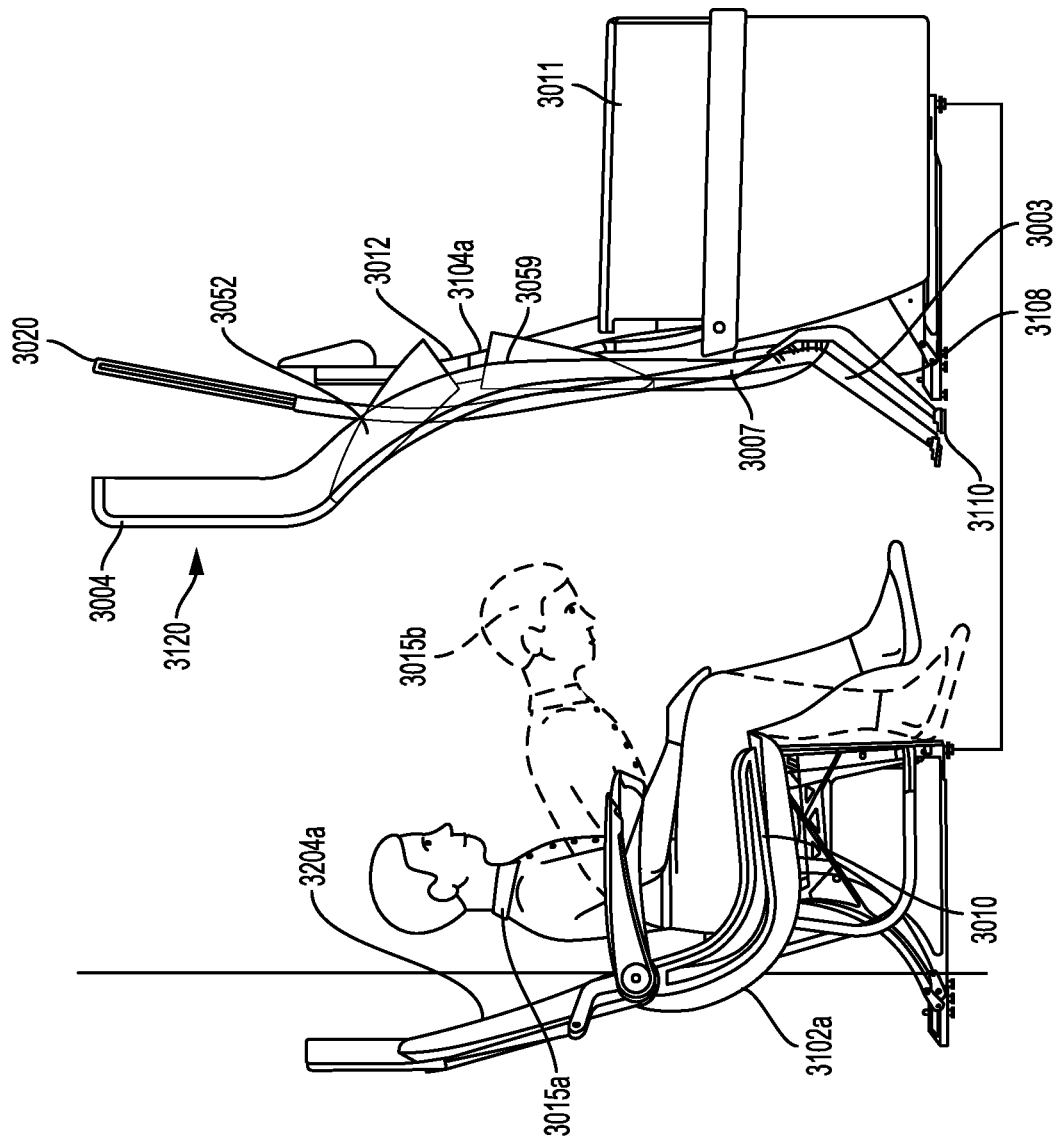

FIG. 33 shows the comparative positioning of the embodiments of FIG. 30 and FIG. 7F after a crash event. Partition 3020 in FIG. 33 reflects the position of the divider of FIG. 7F after a crash event, and divider 3120 illustrates the divider of FIG. 30. As can be appreciated from FIG. 33, the embodiments of FIGS. 7F and 30 provide comparable clearance. However, the embodiment of FIG. 33 may provide the advantage of substantially reducing the mass which articulates (and must be stopped in a controlled manner) during a crash event.

Figure 34:
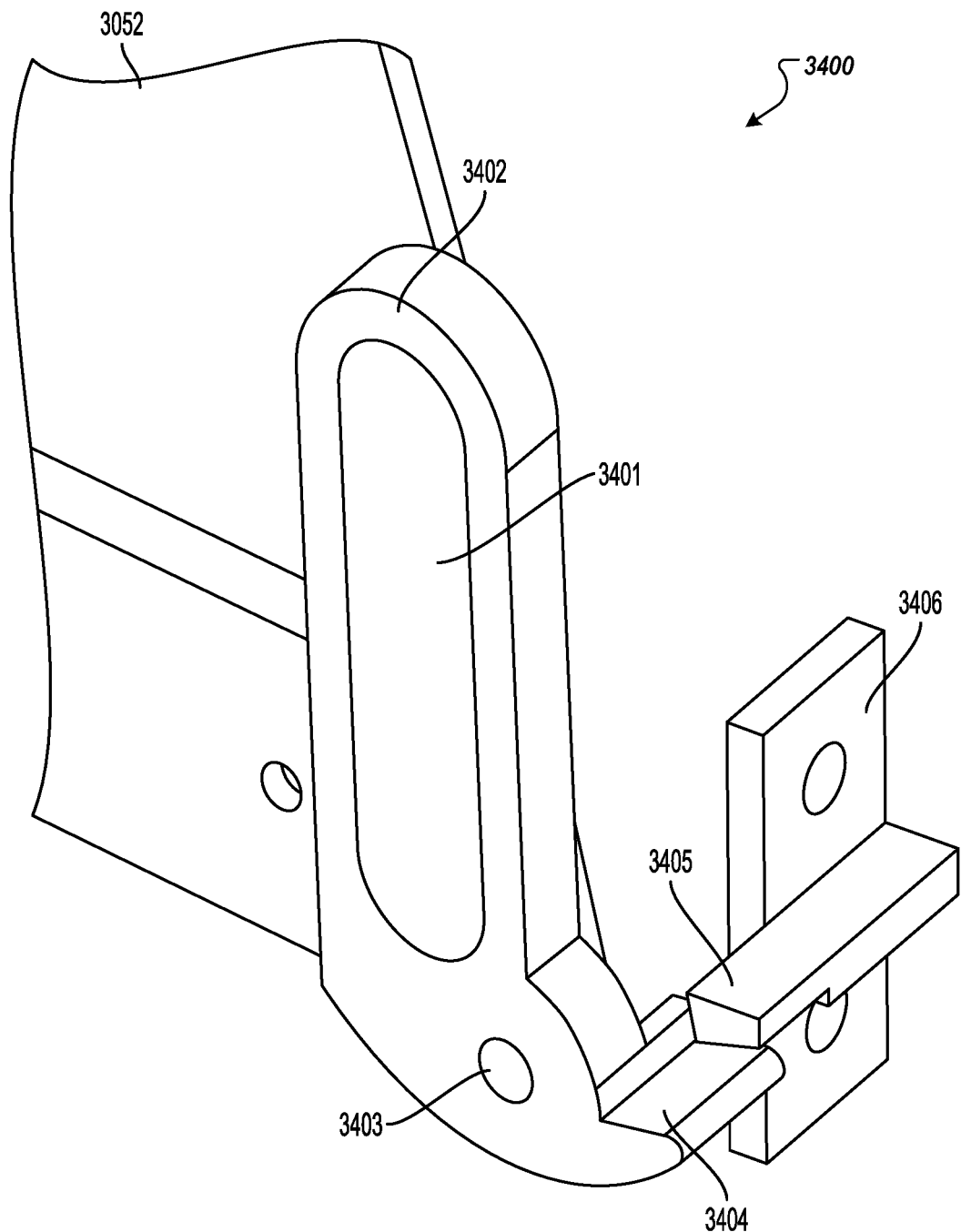
FIGS. 34-35 illustrate views of an inertial release mechanism for upper and lower shell members of a contoured class divider.
Figure 35:
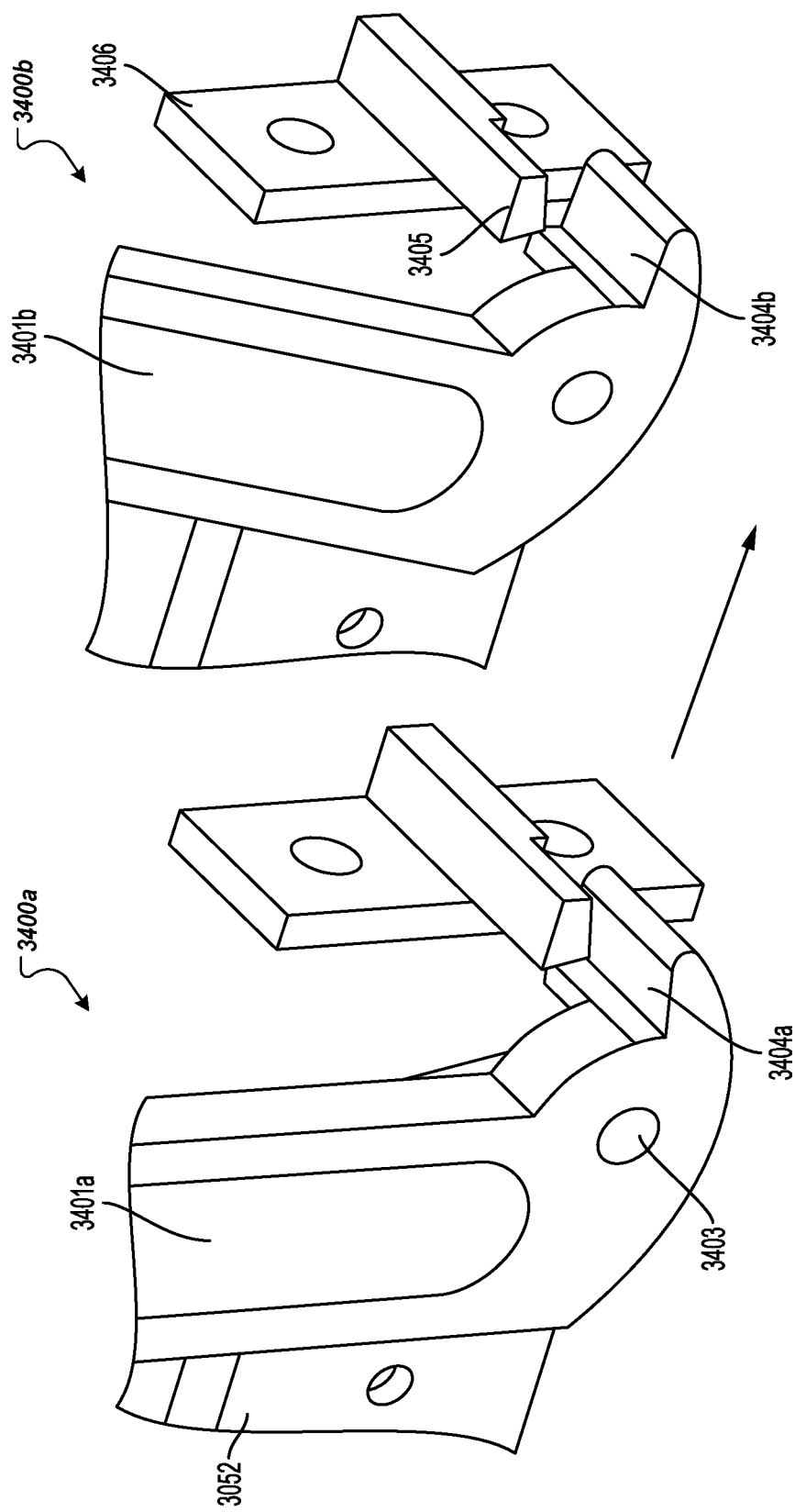

FIGS. 34-35 depict an embodiment of an inertial release mechanism 3400 that permits the upper and lower shell members 3002, 3009 to articulate from a normal operating position shown in FIG. 30 to a forward emergency position shown in FIG. 31 during a crash event. For purposes of illustration, the inertial release mechanism is shown as being mounted to the interior of the shell 3002 at the forwardly extending sidewall 3052, which may be hidden from view behind seat 3011. In some implementations, release element 3402 may include an inertial mass portion 3401 and a latch portion 3404 and may be pivotally attached to the forwardly extending sidewall 3052. In a normal operating position 3400a, the latch portion 3404 may be engaged with a stopper 3405, which may be rigidly mounted to plate 3406 that may be mounted to the other shell member 2009 at its associated sidewall 3059. Alternatively, plate 3406 can be mounted to a stationary portion of the divider bridging portions 3004 and 3007 or may be mounted to the fuselage or sidewall of the aircraft. The latch portion 3404 may locked into the position shown in FIG. 34 by application of an approximately 40 lb. force to an end of the release element 3402. In some implementations, relative positions of pivot 3403 and stopper 3405 may be selected such that the latch releases portion under a load of 1, 2, 3, 4, 5, 6, 7, 8 or 9 G (or values therebetween).

During a crash event, inertial mass portion 3401 may articulate forwardly to an emergency position 3400b and may cause release element 3402 to move to the emergency position 3401b/3404b. In this released condition, the latch portion 3404b may be clear of the stopper 3405 and permit one or both shell members 3002/3009 to articulate in a forward direction, thereby providing clearance for the expected travel of the aft-seated passenger's head during a crash event.

FIG. 36 illustrates an alternative release mechanism 3600 in a normal operating position 3600a and an emergency position 3600b for upper and lower shell members 3002, 3009 of a contoured class divider 3120. In this embodiment, shell member side walls (for instance, side walls 3052, 3059) may be held in place by a mass pulley release mechanism 3600. In some implementations, a spring-loaded pulley/spool 3605 may be mounted within a housing 3604 and may include cables attached to a stopper 3601 and weight 3602. During a crash event, the weight 3602 may articulate from normal operating position 3602a to emergency position 3602b, overcoming the spring force of the pulley and causing the pulley/spool 3605 to rotate in the clockwise direction. This clockwise rotation of the pulley/spool may cause the stopper 3601 to retract from normal operating position 3601a to emergency position 3601b within slot 3603. Thereafter, the side wall 3052 may be permitted to move forwardly, as described above. The mass pulley release mechanism 3600 may be mounted as described above in connection with the latch release mechanism 3400.

Figure 37:
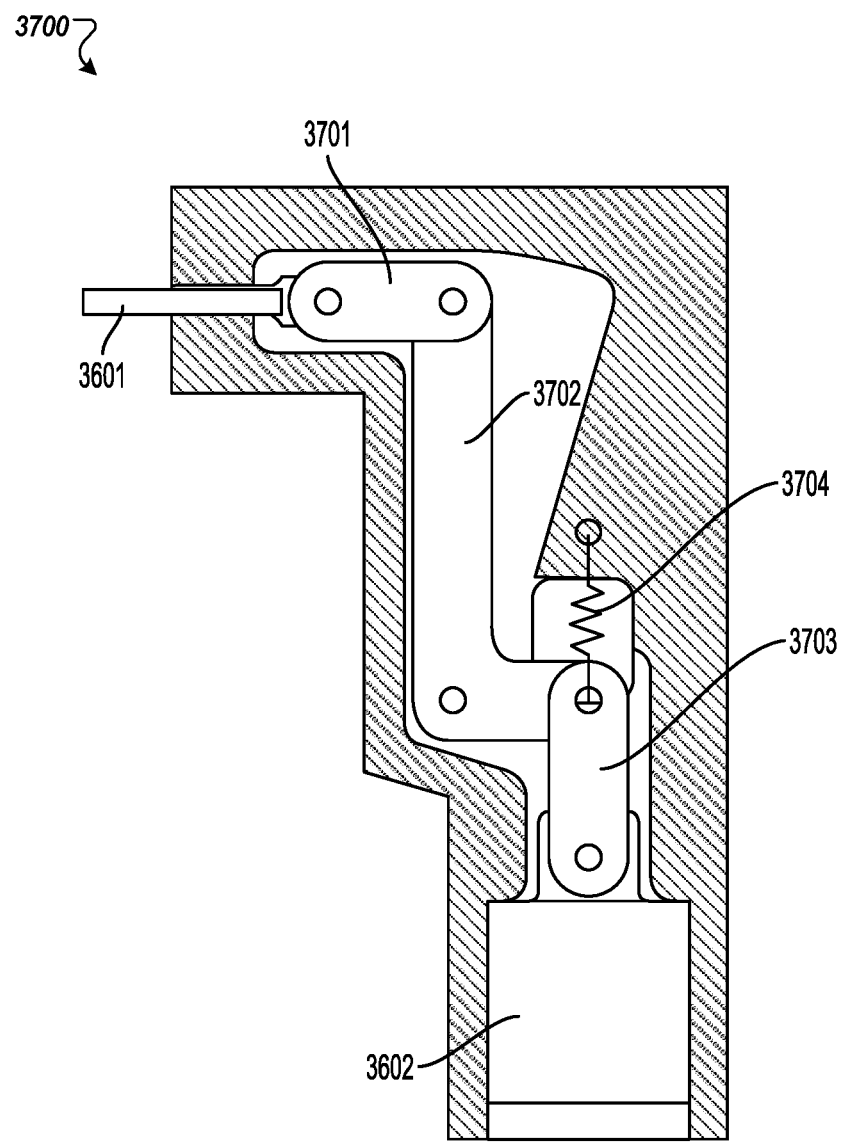
Figure 40:
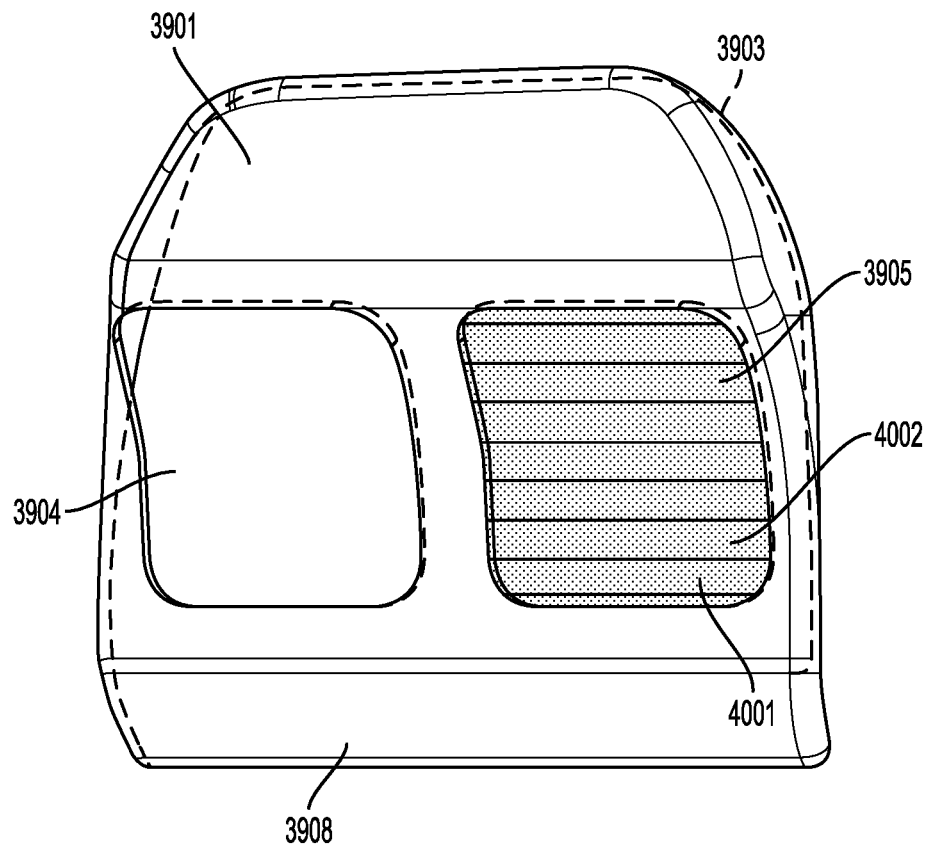

FIGS. 37-38 depict a mass linkage release mechanism 3700 for upper and lower shell members 3002, 3009 of a contoured class divider 3120. The operation of this mass linkage release mechanism 3700 may be similar to that described in connection with the mass pulley release mechanism 3600 in FIG. 36 except that linkages 3701-3703 may replace the pulley/spool 3605. In some implementations, spring 3704 may bias the mass linkage release mechanism 3700 into the normal operating position 3700a. During a crash event as shown in 3700b in FIG. 38, mass 3602 may articulate to position 3602b from position 3602a, which overcomes the force of spring 3704 and pulls linkage 3703 from position 3703a to position 3703b, which in turn causes linkage 3702 to pivot into position 3702b from position 3702a. The pivoting of the linkage 3702 to position 3702b, in turn, may cause linkage 3701 and stopper 3602 to move from positions 3602a/3701a into positions 3602b/3701b.

Figure 41:
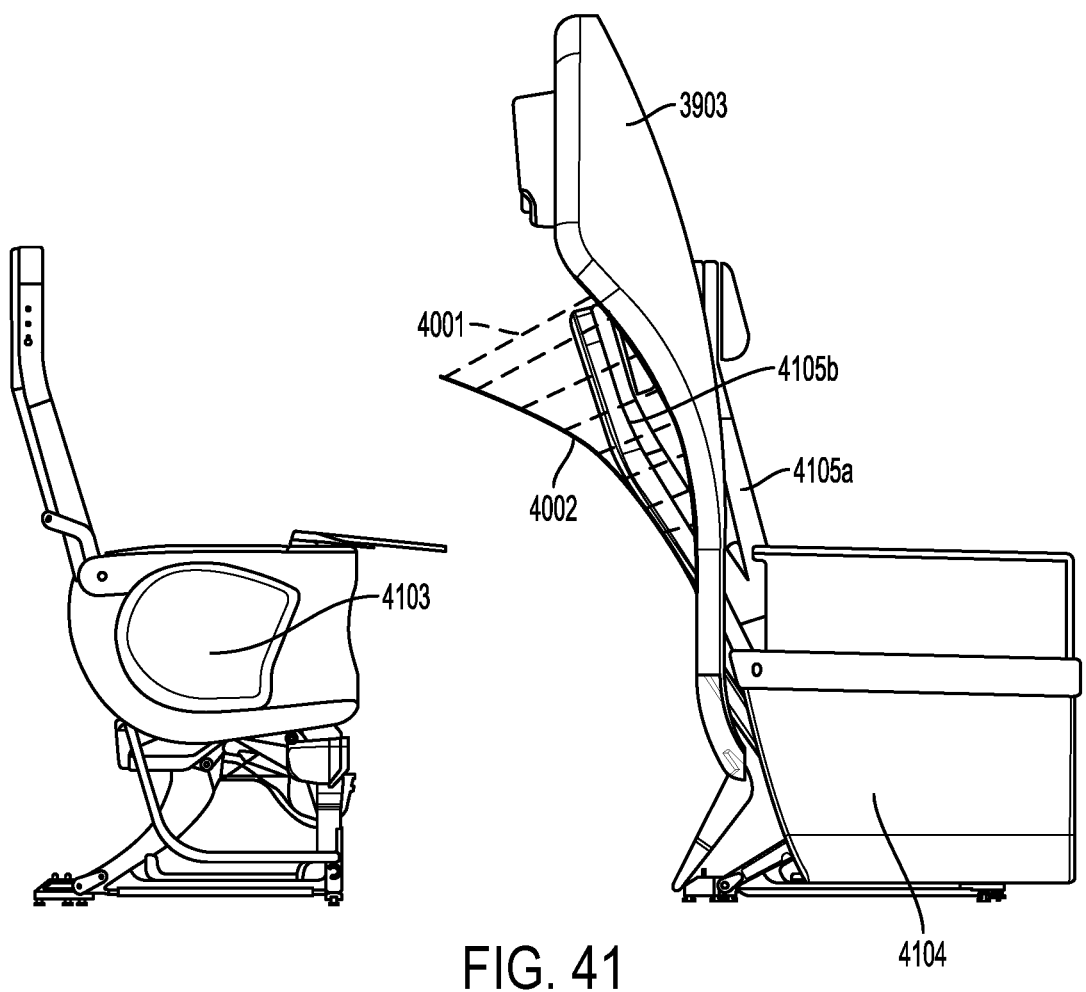
Figure 42:
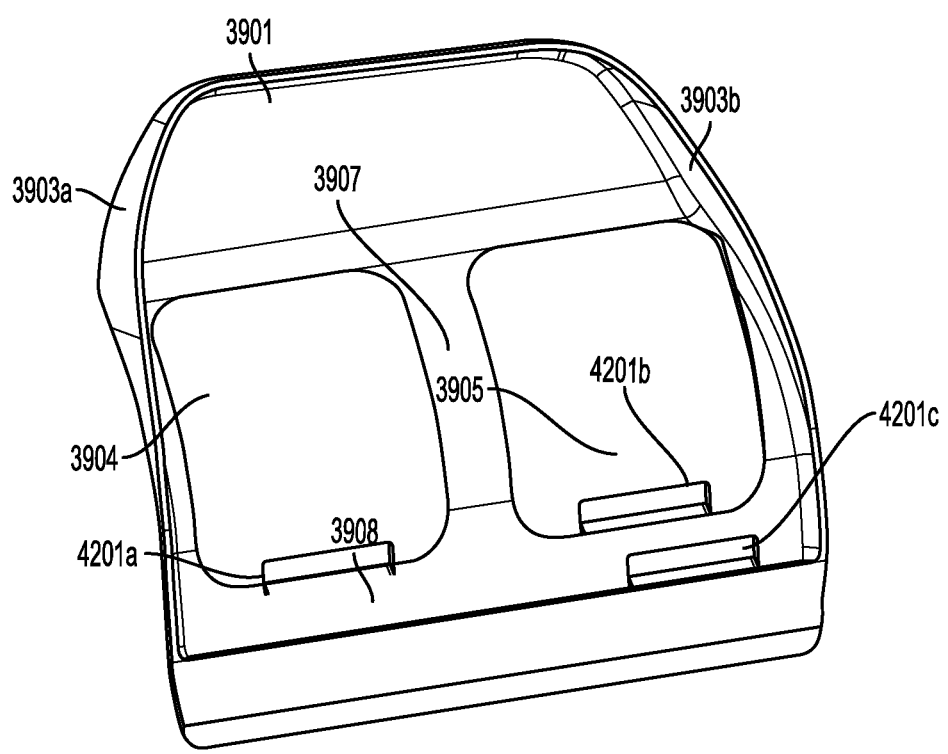

FIGS. 39-42 illustrate additional embodiments which further reduce the articulating mass of a contoured class divider 3903 during a crash event. In some implementations, the divider 3903 may be equipped with two window areas 3904/3905 between an upper divider region 3901 and a lower divider region 3908 that may be configured to accommodate the travel of the head of the aft-seated passenger through the window areas 3904/3905. Alternatively, FIG. 39 also shows an alternative example in which the two window areas 3904/3905 may be merged into a single window 3009. In some examples, the divider 3903 may optionally be equipped with an upper viewing window 3902. The divider 3903 may be mounted to legs (not shown) at fastening locations 3906a,b. Dual windows 3904/3905 or single window 3909 may be outfitted with flexible fabric panels 4001 (FIG. 40) having embedded elastic straps (illustrated as solid lateral lines) and covering solid panels 4002 that may be hingedly connected to an upper end of the lower divider region 3908 by hinges 4201. FIG. 42 depicts the normal operating position of such an embodiment. In FIG. 42, reference numbers 3904 and 3905 indicate rigid panel cut-outs that are hingedly attached to the lower divider region 3908. As shown in FIG. 41, this construction permits the full recline of a seatback 4105 of business class seat 4104 from position 4105a to position 4105b, during which the panels 4002 may be held in place by the elastic straps and flexible fabric 4001 that may extend as the seatback 4105 reclines. During a crash event when the seat 4104 is expected to be in the TTOL position 4105a, the panels 3904/3905 or 3909 may articulate forward such that the path of travel of the head of a passenger seated in seat 4103 to the rear of seat 4105 does not interfere with the divider 3903.

Alternatively, the window solid panels 4002 may be removed, in which case the flexible fabric and straps may conform to seatback 4105b when the seat 4104 is reclines. This may enhance the usable space of the aft-seated passenger in seat 4103 when the seat 4104 is reclined.

Various details related to embodiments of contoured class dividers maybe changed without departing from the scope of the disclosure. Furthermore, the foregoing description of the preferred embodiments of the contoured class divider and best mode for practicing the use of contoured class dividers as described herein are provided for the purpose of illustration only and not for the purpose of limitation.

What is claimed is:

1. A contoured class divider for separating regions of an aircraft cabin between at least one forward passenger seat and at least one aft passenger seat, the contoured class divider comprising:
a panel for positioning aft of the at least one forward passenger seat, the panel including one or more panel portions and having a contoured shape for receiving the back of the at least one forward passenger seat in at least a reclined position;
a lower support assembly for securing the panel to a floor of the aircraft cabin;
an upper assembly for securing the panel to an upper cabin structure, the upper cabin structure comprising a channel disposed on an underside of the upper cabin structure, the channel configured to slidably engage a coupling at an upper end of the panel such that the coupling translates within the channel from a first position to a second position during movement of the first panel portion from the aft position to the forward position;
wherein at least a first panel portion of the one or more panel portions is movable between an aft position and a forward position wherein,
in the aft position, a section of the first panel portion is disposed within an expected path of travel of a head of a passenger seated in the at least one aft passenger seat, and
in the forward position, the section of the first panel portion is outside the expected path of travel; and
wherein the coupling is configured to slide within the channel from the first position to the second position in response to a crash condition that includes forward deceleration of an emergency landing.

2. The contoured class divider of claim 1, wherein: the upper assembly is articulably coupled to the upper cabin structure; and the
upper cabin structure is an overhead bin.

3. The contoured class divider of claim 1, wherein the upper cabin structure comprises a rotary speed limiter configured to slow a speed of rotation of the one or more panel portions from the rearward position to the forward position such that a force of impact of the one or more panel portions on each seatback of the at least one forward passenger seat is reduced.

4. The contoured class divider of claim 1, further comprising a spring disposed within the channel, the spring coupled to the upper end of the panel at the coupling.

5. The contoured class divider of claim 1, further comprising a pyrotechnic pin puller coupled to an inertial release mechanism and configured to hold the coupling in the first position during normal operating and release the coupling in response to the crash condition, wherein the crash condition triggers the inertial release mechanism.

6. The contoured class divider of claim 5, further comprising a spring disposed within the channel, wherein the spring is a compression spring configured to slow a speed of travel of the coupling from the first position to the second position.

7. The contoured class divider of claim 1, wherein the upper cabin structure comprises an inertial release mechanism configured to release in response to the crash condition.

8. The contoured class divider of claim 1, wherein the upper cabin structure comprises a pneumatic actuator configured to cause forward translation of the first panel portion in response to the crash condition.

9. The contoured class divider of claim 1, wherein the one or more panel portions comprise:
an upper panel portion mounted to the upper cabin structure; and
a lower panel portion mounted to the lower support assembly;
wherein the upper panel portion is coupled to the lower panel portion using a coupler.

10. The contoured class divider of claim 1, wherein:
the one or more panel portions include a stationary panel portion fixedly mounted to an underside of the upper cabin structure; and
a contoured panel portion of the one or more panel portions;
wherein the stationary panel portion is coupled to the contoured panel portion by a magnetic catch, wherein the magnetic catch is configured to release the contoured panel portion from the stationary panel portion upon experiencing inertial forces.

11. The contoured class divider of claim 1, wherein a lower end of the panel is pivotably coupled to the lower support assembly such that the contoured panel portion is configured to articulate from the aft position to the forward position.

12. The contoured class divider of claim 1, further comprising a counterweight mounted to a lower end of the panel, the counterweight configured to maintain the panel in the forward position after articulation of the panel from the aft position to the forward position.

13. The contoured class divider of claim 1, further comprising a shock absorbing member mounted to the lower support assembly, the shock absorbing member configured to absorb an impact force caused by articulation of the panel from the aft position to the forward position.

14. A class divider for separating regions of an aircraft cabin between at least one forward passenger seat and at least one aft passenger seat, the class divider comprising:
a panel for positioning aft of the at least one forward passenger seat;
a lower support assembly for securing the panel to a floor of the aircraft cabin;
an upper assembly for securing the panel to an upper cabin structure, the upper assembly comprising a coupling at an upper end of the panel configured to translate from a first position to a second position within a channel disposed on an underside of the upper cabin structure during movement of the first panel portion from the aft position to the forward position;
an energy absorbing zone for mitigating head impact of a passenger seated in a passenger seat aft of the contoured class divider;
wherein a section of the panel is movable between an aft position and a forward position wherein,
in the aft position, the section of the panel is disposed within an expected path of travel of a head of a passenger seated in the at least one aft passenger seat, and
in the forward position,
a portion of the section of the panel remains disposed within the expected path of travel; and
wherein the coupling is configured to slide within the channel from the first position to the second position in response to a crash condition that includes forward deceleration of an emergency landing.

15. The class divider of claim 14, wherein the energy absorbing zone comprises a core with a plurality of perforations and a fabric covering the plurality of perforations.

16. The class divider of claim 14, wherein the energy absorbing zone comprises a deformable region configured to deform under an inertial force from the rearward position to the forward position, wherein the deformable region comprises a plurality of cavities disposed throughout, wherein the plurality of cavities are configured to collapse under the inertial force.

17. The class divider of claim 14, wherein the panel comprises a convex contour closely matching an aft-facing contour of a seatback of the at least one forward passenger seat.

18. The contoured class divider of claim 14, wherein the energy absorbing zone comprises a cushioning material
a plurality of flexible reversibly-jointed ribs disposed, wherein the plurality of flexible reversibly-jointed ribs are configured to move from a first position to a second position in response to an inertial force, wherein:
the energy absorbing zone has a convex contour in the first position and a reverse convex contour in the second position.

19. The contoured class divider of claim 18, further comprising a plurality of hinges configured to keep the plurality of ribs in the first position, wherein breaking the hinge in response to an inertial force will cause the ribs to move to the second position.

* * * * *